(12) United States Patent
Nagashima et al.

(10) Patent No.: US 11,067,978 B2
(45) Date of Patent: Jul. 20, 2021

(54) TERMINAL AND METHOD FOR CONTROLLING TERMINAL

(71) Applicant: CLARION CO., LTD., Saitama (JP)

(72) Inventors: Takanobu Nagashima, Saitama (JP); Yuki Matsushita, Saitama (JP); Kenta Yasutomo, Saitama (JP)

(73) Assignee: CLARION CO., LTD., Saitama (JP)

( * ) Notice: Subject to any disclaimer, the term of this patent is extended or adjusted under 35 U.S.C. 154(b) by 202 days.

(21) Appl. No.: 16/340,280

(22) PCT Filed: Dec. 15, 2017

(86) PCT No.: PCT/JP2017/045092
§ 371 (c)(1),
(2) Date: Apr. 8, 2019

(87) PCT Pub. No.: WO2018/116978
PCT Pub. Date: Jun. 28, 2018

(65) Prior Publication Data
US 2020/0041992 A1    Feb. 6, 2020

(30) Foreign Application Priority Data
Dec. 19, 2016   (JP) .............................. JP2016-245986

(51) Int. Cl.
*G05D 1/00* (2006.01)
*G05B 19/042* (2006.01)
(Continued)

(52) U.S. Cl.
CPC ......... *G05D 1/0016* (2013.01); *G05B 19/042* (2013.01); *G05D 1/0038* (2013.01);
(Continued)

(58) Field of Classification Search
CPC ........ B60W 2050/0064; G05D 1/0016; G05D 1/0011; G05D 1/0038; G06F 21/36;
(Continued)

(56) References Cited

U.S. PATENT DOCUMENTS

2009/0241072 A1\* 9/2009 Chaudhri ................ G06F 21/36
715/863
2014/0111454 A1    4/2014 Hosoi et al.
(Continued)

FOREIGN PATENT DOCUMENTS

GB          2534471 A    7/2016
JP        102346624 A    2/2012
(Continued)

OTHER PUBLICATIONS

Translation used for Applicant cited document, Japanese Patent Application Publication No. 2014-193662 to Kasai (Year: 2014).*
(Continued)

*Primary Examiner* — Kenneth J Malkowski
(74) *Attorney, Agent, or Firm* — IP Business Solutions, LLC

(57) ABSTRACT

The present invention enables a user to accurately perform operation when the user operates a touch panel of a terminal to control propulsion of a vehicle.
A terminal control unit 20 causes a touch panel 9 to display a vehicle control screen on which an operation button allowing touch operation is displayed, moves a position of the operation button following a movement of the position of the touch operation, and maintains a state where the touch operation is performed on the operation button when the position of the touch operation moves after the touch operation is performed on the operation button displayed on the vehicle control screen, transmits a propulsion instruction signal instructing propulsion of the vehicle to an information
(Continued)

processing device 4 provided in a vehicle while the touch operation is being performed on the operation button displayed on the vehicle control screen, and stops transmission of the propulsion instruction signal in response to ending of the touch operation on the operation button.

6 Claims, 22 Drawing Sheets

(51) Int. Cl.
*G06F 3/0484* (2013.01)
*G06F 3/0488* (2013.01)
*H04N 7/18* (2006.01)
*G06F 21/36* (2013.01)
*G06F 3/01* (2006.01)

(52) U.S. Cl.
CPC ........ *G06F 3/0488* (2013.01); *G06F 3/04842* (2013.01); *G06F 3/04847* (2013.01); *H04N 7/18* (2013.01); *G05B 2219/23044* (2013.01); *G05B 2219/2637* (2013.01); *G06F 3/017* (2013.01); *G06F 3/0484* (2013.01); *G06F 21/36* (2013.01)

(58) Field of Classification Search
CPC .. G06F 3/0488; G06F 3/04842; G06F 3/0484; G06F 3/017
See application file for complete search history.

(56) References Cited

U.S. PATENT DOCUMENTS

| 2015/0154728 | A1 | 6/2015 | Nara et al. |
| 2016/0188181 | A1* | 6/2016 | Smith ................. G06F 3/04883 715/765 |
| 2017/0161005 | A1 | 6/2017 | Nara et al. |

FOREIGN PATENT DOCUMENTS

| JP | 2012-076483 A | 4/2012 |
| JP | 2012253736 A | 12/2012 |
| JP | 2013254435 A | 12/2013 |
| JP | 2014065392 A | 4/2014 |
| JP | 2014-193662 A | 10/2014 |
| JP | 2014-197267 A | 10/2014 |
| JP | 2014196009 A | 10/2014 |
| JP | 2015-054530 A | 3/2015 |
| JP | 2015070350 A | 4/2015 |
| JP | 2016-074285 A1 | 5/2016 |
| JP | 2016-164726 A | 9/2016 |

OTHER PUBLICATIONS

International Search Report for corresponding International Patent Application No. PCT/JP2017/045092 dated Dec. 15, 2017.
Written Opinion for corresponding International Patent Application No. PCT/JP2017/023273 dated Dec. 15, 2017.
International Preliminary Report on Patentability of PCT Application No. PCT/JP2017/045092 dated Jul. 4, 2019.
Written Opinion of the International Searching Authority of PCT Application No. PCT/JP2017/045092 dated Feb. 27, 2018.
Extended European Search Report issued for the counterpart European Patent Application No. 17882294.6-1009.
Chinese Office Action mailed by Chinese Patent Office dated Mar. 1, 2021 in corresponding Chinese patent application No. 2017800719007.

* cited by examiner

TERMINAL AND METHOD FOR CONTROLLING TERMINAL

TECHNICAL FIELD

The present invention relates to a terminal and a method for controlling the terminal.

BACKGROUND ART

Conventionally, a system is known in which an information processing device (vehicle-side device 3) provided in a vehicle and a terminal (mobile terminal 4) are communicably connected (for example, see, Patent Literature 1).

Also, in recent years, terminals equipped with a touch panel such as smartphones and tablet terminals have been prevalent.

CITATION LIST

Patent Literature

Patent Literature 1

Japanese Patent Laid-Open No. 2015-54530

SUMMARY OF INVENTION

Technical Problem

Here, in a system in which an information processing device provided in a vehicle and a terminal equipped with a touch panel are communicably connected, when configuring a system in which a user can control propulsion of the vehicle by operating the touch panel, it is necessary to display an appropriate screen on the touch panel to ensure that the near can perform the operation accurately.

The present invention has been made in view of the above-described circumstances and it is an object thereof to ensure that a user can perform operation accurately when the user operates a touch panel of a terminal to control propulsion of a vehicle.

Solution to Problem

In order to achieve the above-described object, a terminal according to an aspect of the present invention includes a touch panel that displays an image and accepts a touch operation; and a terminal control unit that causes the touch panel to display a vehicle control screen on which an operation button allowing the touch operation is displayed, moves a position of the operation button following a movement of the position of the touch operation, and maintains a state where the touch operation is perforated on the operation button when the position of the touch operation moves after the touch operation is performed on the operation button displayed on the vehicle control screen; and transmits a propulsion instruction signal instructing propulsion of the vehicle to an information processing device provided in a vehicle while the touch operation is being performed on the operation button displayed on the vehicle control screen, and stops transmission of the propulsion instruction signal in response to ending of the touch operation on the operation button.

Also, in another aspect of the present invention, the terminal control unit displays the operation button continuously at a position of the operation button at the time when the touch operation is ended when the touch operation on she operation button displayed on the vehicle control screen is ended.

Also, in yet another aspect of the present invention, the terminal control unit displays the operation button at a predetermined position on the vehicle control screen when the touch operation on the operation button displayed on the vehicle control screen is ended.

Also, in yet another aspect of the present invention, the terminal control unit causes the touch panel to display a lock screen on which a slide bar and a slide button are displayed, the slide button being positioned at one end of the slide oar, moving along the slide bar in accordance with a swipe operation, and moving to the one end of the slide bar in response to ending of the swipe operation, and changes a screen to be displayed on the touch panel from the lock screen to the vehicle control screen when the slide button is positioned at another end of the slide bar by the swipe operation for a predetermined period of time and changes the slide button petitioned at the other end of the slide bar to the operation button so as to cause the slide button to function as the operation button.

Also, in yet another aspect of the present invention, the terminal control unit changes an image indicative of the operation button between when the operation button is being operated and when the operation button is not operated.

Also, yet another aspect of the present invention, further includes a housing and a housing state detection unit that detects a state of the housing, wherein the terminal control unit acquires imaging data that in based on a result of imaging of a camera provided in the vehicle while the vehicle control screen is being displayed, causes the touch panel to display the acquired image based on the imaging data, and displays the operation button in a superposed manner on the image based on the imaging data; and changes an image to be displayed on the touch panel in accordance with a state of the housing detected by the housing state detection unit and maintains display of the operation button even when an image to be displayed on the touch panel is changed.

Also, in yet another aspect of the present invention, the terminal control unit causes the touch panel to display an overhead image which is an image of a bird's eye view of the vehicle as the image based on the imaging data when it is detected by the housing state detection unit that an orientation of the housing is placed in a first orientation, and causes the touch panel to display an outside-of-vehicle image which is an image of an outside of the vehicle imaged by the camera as the image based on the imaging data when it is detected by the housing state detection unit that the orientation of the housing is placed in a second orientation that is different than the first orientation.

Also, yet another aspect of the present invention is a method of controlling a terminal that includes a touch panel that displays an image and accepts a touch operation, the method including displaying, on the touch panel, a vehicle control screen on which an operation button allowing the touch operation is displayed and moving a position of the operation button following a movement of the position of the touch operation, and maintaining a state where the touch operation is performed on the operation button when the position of the touch operation moves after the touch operation is performed on the operation button displayed on the vehicle control screen; and transmitting a propulsion instruction signal instructing propulsion of the vehicle to an information processing device provided in the vehicle white the touch operation is being performed on the operation button displayed on the vehicle control screen and stopping transmission of the propulsion instruction signal in response to ending of the touch operation on the operation button.

Note that the content of Japanese Patent Application No. 2016-245986 filed on Dec. 13, 2016 is incorporated in this specification in its entirety.

Advantageous Effect of Invention

According to the aspects of the present invention, a user can perform the operation accurately when the user operates a touch panel of a terminal to control propulsive of a vehicle.

DESCRIPTION OF EMBODIMENTS

Hereinafter, embodiments of the present invention will be described with reference to the drawings.

Figure 1:
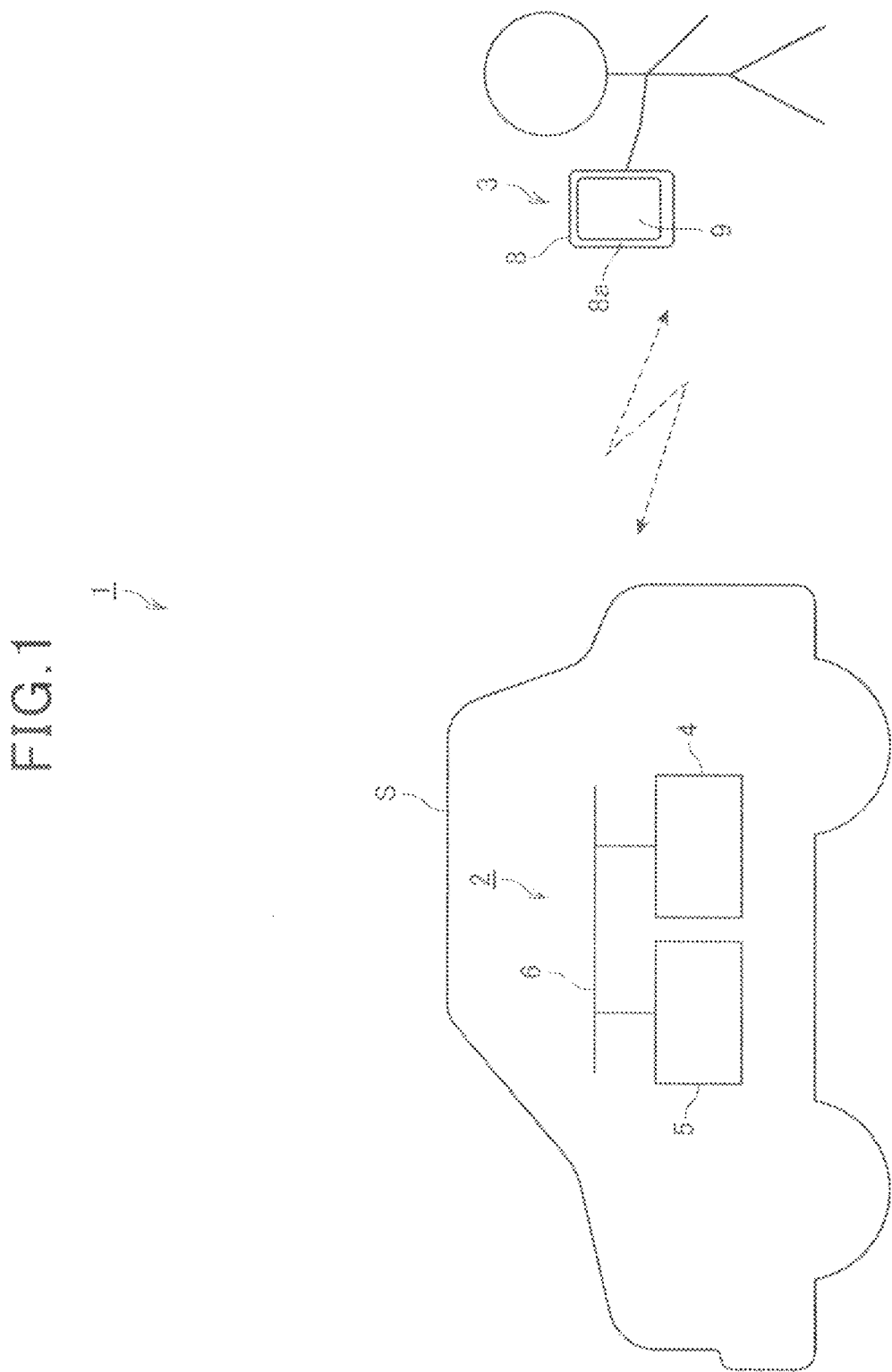
FIG. 1 is a diagram that illustrates an outline of an information processing system 1 according to the present embodiment.

FIG. 1 is a diagram that illustrates an outline at an information processing system 1 according to this embodiment.

As illustrated in FIG. 1, the information processing system 1 includes a vehicle system 2 provided in a vehicle S and a mobile terminal 3 possessed by a user.

The vehicle system 2 includes an information processing device 4 and a vehicle drive control device 5. The information processing device 4 and the vehicle drive control device 5 are capable of performing communication via a bus 6.

The mobile terminal 3 is a tablet mobile phone (so-called smartphone) carried by a user. The information processing device 4 of the vehicle system 2 and the mobile terminal 3 are capable of performing communication by wireless communication. The mobile terminal 3 includes a housing 8. The housing 8 is a plate-like member having a rectangular front face 8a, and a touch panel 9 (display panel) is provided in a wide area of the from race 8a. Note that a rectangular shape does not mean a perfect rectangular shape but also includes, for example, a substantially rectangular shape four apexes of which are rounded. Although the following explanations will be provided on the assumption that the mobile terminal 3 is a tablet mobile phone, the mobile terminal 3 is not limited to a smartphone but may be a tablet computer or the like.

The user is a person having authority to control the vehicle S such as an owner of the vehicle S, etc.

The vehicle S is an automatically operated four-wheeled vehicle. In particular, the vehicle S according to this embodiment has the following functions associated with operating an engine switch to turn on/off an engine and locking/unlocking of a door. Specifically, the vehicle S has the functions of operating the engine switch to turn on/off the engine and locking/unlocking the door by an operation performed on a dedicated remote controller. Since existing technology is used in these functions, detailed explanation of these functions is not provided. After getting off from the vehicle S, the user can operate the engine switch to turn on/off the engine and lock/unlock the door of the vehicle S by operating the dedicated remote controller outside the vehicle.

The information processing system 1 is a system that enables what will be described hereinbelow. Specifically, the information processing system 1 makes it possible for the user to wove the vehicle S, which is stopped, to another position and park it there by operating the mobile terminal 3 without delving the vehicle S. For example, when the vehicle S should be parked in a parking position in a parking space, a garage, etc., the information processing system 1 makes it possible for the user to move, to the parking position, the vehicle S which is stopped at a before-parking position near the parking position and park it there by operating the mobile terminal 3 without driving the vehicle S.

Also, for example, when the vehicle S stopped at the parking position should make an exit therefrom, the information processing system 1 makes it possible for the user to move the vehicle S, which is stopped in the parking position, to an after-exit stop position near the parking position and stop it there by operating the mobile terminal 3 without driving the vehicle S. Accordingly, the user can perform parking and exiting of the vehicle S by using the information processing system 1 in a state where the user is not on board the vehicle S.

As a result, in relation to the parking, when another vehicle is already parked in a parking position adjacent to a parking position parking in which is desired and the vehicle S should be parked at the parking position parking in which is desired, the user can park the vehicle S at the parking position in the following manner in a state where it is difficult to open and close the door of the vehicle S because the vehicle S and the other vehicle adjacent to it are close to each other. Specifically, the user can get off the vehicle S before parking the vehicle S in the parking position and stop the vehicle S in the parking position by using the information processing system 1. By virtue of this, there is no need to open and close the door of the vehicle S after the vehicle S is stopped in the parking position, and the user can stop the vehicle S smoothly.

Likewise, in relation to the editing, when a situation exists where another vehicle is already parked in a parking position adjacent to a parking position in which the vehicle S is parked and it is difficult to open and close this door of the vehicle S to get on the vehicle S, the user can make the vehicle S exit smoothly without getting on the vehicle S using the information processing system 1 and then get on the vehicle S.

In the following explanations, the stopped vehicle S moving to another position and than stopping at the other position by the information processing system 1 without involving driving of the vehicle S by the user will be hereinafter expressed as "automatic vehicle movement."

Figure 2:
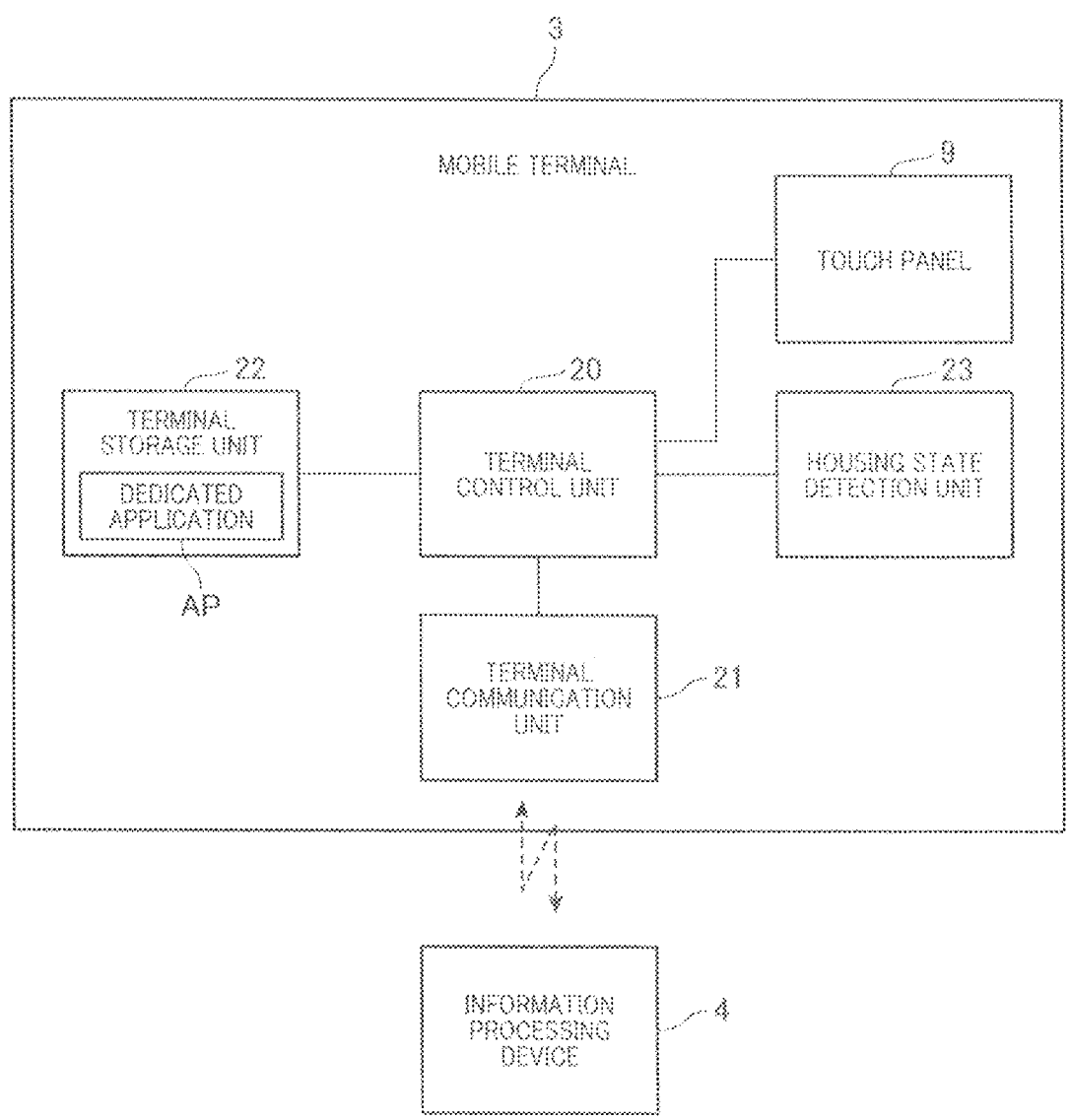
FIG. 2 is a block diagram that illustrates a functional configuration of a mobile terminal.

FIG. 2 is a block diagram that illustrates the functional configuration of the mobile terminal 3.

As illustrated in FIG. 2, the mobile terminal 3 includes a terminal control unit 20, a terminal communication unit 21, a touch panel 9, a terminal storage unit 22, und a housing state detection unit 23.

The terminal control unit 20 includes a CPU, ROM, RAM, an ASIC, a signal processing circuit, etc., and controls individual units of the mobile terminal 3. In the terminal control unit 20, for example, the CPU reads a program stored in the ROM onto the RAM to perform processing; for sample, performs processing by a function implemented in the ASIC; and performs processing by cooperation of hardware and software, for example, by performing the processing by performing signal processing by the signal processing circuit.

The terminal communication unit 21 wirelessly communicates with an external device (including the information processing device 4) according to the Wi-Fi (registered trademark) standards under the control of the terminal control unit 20.

Note that, in this embodiment, the communication protocol used for the wireless communication performed between the mobile terminal 3 and the information processing device 4 is Wi-Fi, but the communication protocol used for wireless communication performed between these devices may be any protocol other than Wi-Fi. For example, the communication protocol may be Bluetooth (registered trademark).

The touch panel 9 includes a display panel such as a liquid crystal panel and an organic EL panel and displays an image on the display panel under the control of the terminal control unit 20. Also, the touch panel 9 includes a touch sensor disposed to overlap the display panel, and the touch sensor detects an operation by a user on the touch panel 9 and outputs a signal corresponding to the operation that has been detected to the terminal control unit 20. The terminal control unit 20 performs processing that corresponds to the operation on the touch panel 9 by the user on the basis of the input from the touch panel 9.

The terminal storage unit 22 includes a non-volatile memory such as EEPROM and rewritably stores in a non-volatile manner various pieces of data.

The terminal storage unit 22 stores a dedicated application AP. The dedicated application AP is an application used when a user performs automatic vehicle movement using the information processing system 1 as will be described later. The dedicated application AP is, for example, an application that a company that manufactures and sells the information processing device 4 provides. A user uses a predetermined application download system and, in advance, downloads the dedicated application AP to the mobile terminal 3.

The housing state detection unit 23 includes an acceleration sensor, a gyro sensor, and a tilt sensor provided in the housing 8 and, on the basis of detected values of these sensors, detects a state of the housing 8. The housing state detection unit 23 outputs information indicative of the state of the housing 8 that has been detected to the terminal control unit 20. Note that the sensor used when the housing state detection unit 23 detects the state of the housing 8 is not limited to the acceleration sensor, the gyro sensor, or the tilt sensor. Also, a method when the housing state detection unit 23 detects the state of the housing 8 may be any method.

The housing state detection unit 23 defects, as the state of the housing 8, at least, (1) the fact that the orientation at the housing 8 has been placed in the "portrait orientation;" (2) the fact that the orientation of the housing 8 has been placed in the "landscape orientation;" (3) the fact that the housing 8 has made the "rightward motion" when the orientation of the housing 8 is in the "landscape orientation;" and (4) the fact that the housing 8 has made the "leftward motion" when the orientation of the housing is in the "landscape orientation."

Figure 3A:
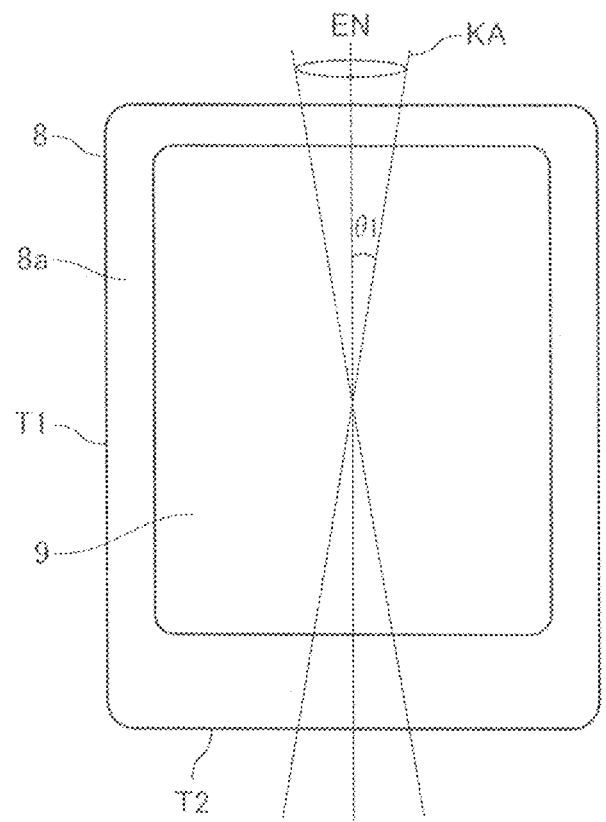
FIG. 3A is a diagram used in an explanation of a portrait orientation.

FIG. 3A is a diagram used in an explanation of the "portrait orientation."

Here, as described above, the housing 8 is a plate-like member having a rectangular front face 8a. Also, as illustrated in FIG. 3A, the shape of the touch panel 9 is rectangular with a long side along a long side T1 of the housing 8 and a short side along a short side T2 of the housing 8.

Since the front face 8a has a rectangular shape, an outer periphery of the front face 8a is defined by the long side T1 and the short side T2. Based on this, hereinafter, a virtual line that extends along the long side T1 of the housing 8 is expressed as a "virtual long-side straight line" with a reference sign "KA" assigned thereto. Also, a virtual line extending in the vertical direction is expressed as a "virtual vertical straight line" with reference sign "EN" assigned thereto. Also, a virtual line, that in orthogonal to the virtual vertical straight line EN is expressed as a "virtual orthogonal straight line" with a reference sign "TN" assigned thereto.

As illustrated in FIG. 3A, the "portrait orientation" is a state where the angle of the virtual long-side straight line KA with reference to the virtual vertical straight line EN in a three-dimensional space falls within the range of angle $\theta1$. The value of the angle $\theta1$ is defined as appropriate on the basis of the viewpoint of the margin when the user intentionally places the orientation of the mobile terminal 3 in the "portrait orientation." When the orientation of the mobile terminal 3 is in the "portrait orientation," then a state is entered where the direction of the long side T1 of the housing 8 is in the vertical direction, and a state is entered where the direction of the long side of the touch panel 9 is in the vertical direction.

The "portrait orientation" corresponds to a "first orientation."

Figure 3B:
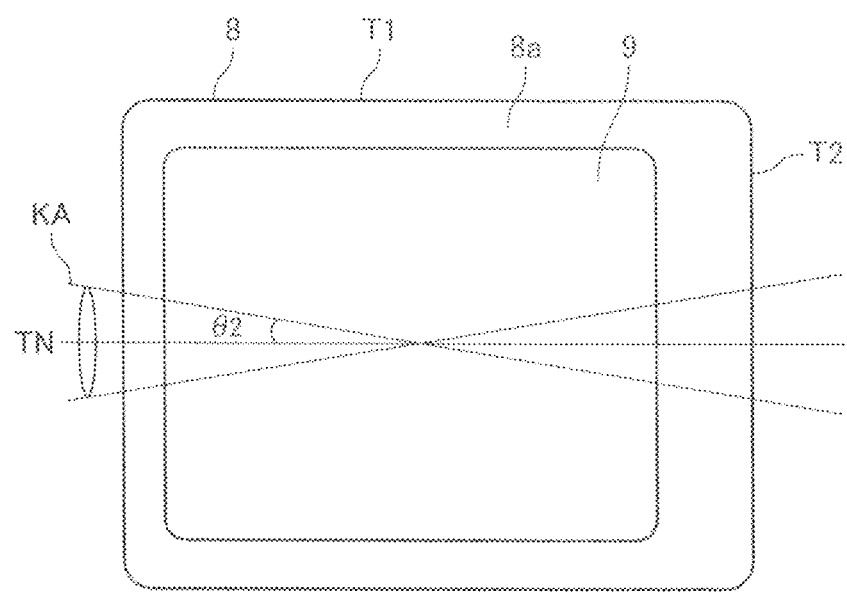
FIG. 3B is a diagram used in an explanation of a landscape orientation.

FIG. 3B is a diagram used in an explanation of the "landscape orientation."

As illustrated in FIG. 3B, the "landscape orientation" is a state where the angle of the virtual long-side straight line KA with reference to the virtual orthogonal straight line TN in the three-dimensional space falls within the range of angle θ2. The angle θ2 is defined as appropriate on the basis of the viewpoint of the margin when the user intentionally places the orientation of the mobile terminal 3 in the "landscape orientation." When the orientation of the mobile terminal 3 is in the "landscape orientation," then a state is entered where the direction of the long side T1 of the housing 8 is in the direction orthogonal to the vertical direction and a state is entered where the direction of the long side of the touch panel 9 is in the direction orthogonal to the vertical direction.

The "landscape orientation" corresponds to a "second orientation."

Figure 4A:
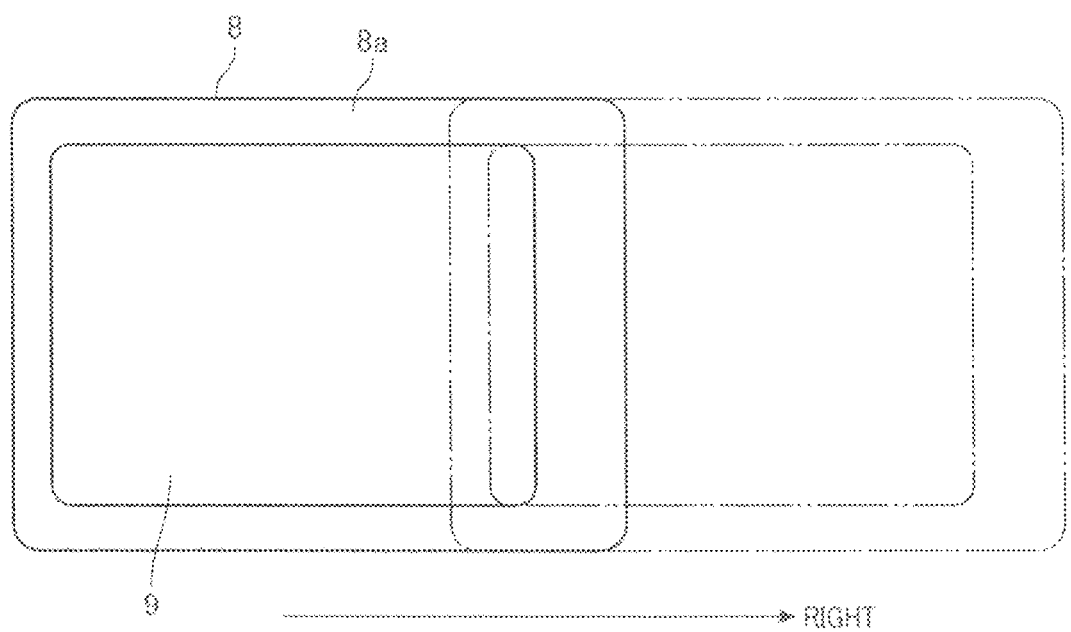
FIG. 4A is diagram used in an explanation of a rightward motion.

FIG. 4A is a diagram used in an explanation of the "rightward motion."

As illustrated in FIG. 4A, the "rightward motion" is a motion by which the housing 8 moves in the rightward direction when the housing 8 is viewed in its plan view, by a distance exceeding a distance K1 (for example, three centimeters), and within a time frame GG1 (for example, 0.5 seconds) in the state where the orientation of the housing 8 is in the "landscape orientation." The rightward direction does not need to fully conform to the direction orthogonal to the vertical direction, and a certain margin is taken into account. When a user who grasps the housing 8 and views the touch panel 9 slightly moves the housing 8 in the rightward direction when viewed from the user, then the housing 8 makes the "rightward motion." The distance K1 and the time frame GG1 are defined as appropriate on the basis of the viewpoint that they are used as the thresholds for determining the fact that the user intentionally causes the housing 8 to make the "rightward motion."

The "rightward motion" corresponds to "a first motion in which the state of the housing 8 changes in a first mode."

Figure 4B:
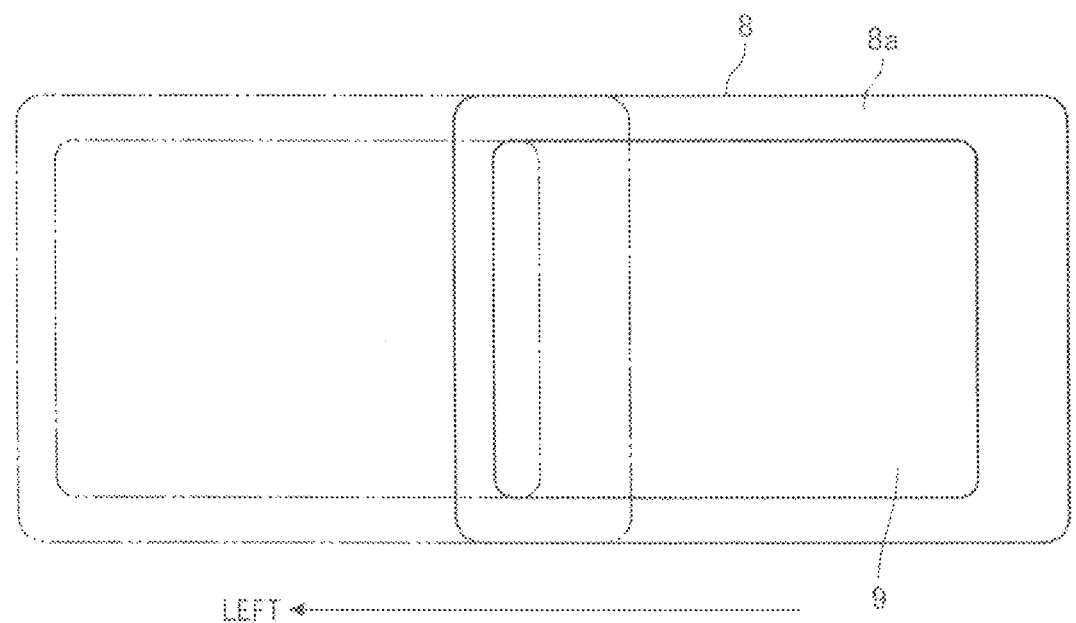
FIG. 4B is a diagram used in an explanation of a leftward motion.

FIG. 4B is a diagram used in an explanation of the "leftward motion."

As illustrated in FIG. 4B, the "leftward motion" is a motion by which the housing 8 moves in the leftward direction when the housing 8 is viewed in its plan view, by a distance exceeding a distance K2 (for example, 3 centimeters), and within a time frame GG2 (for example, 0.5 seconds) in the state where the orientation of the housing 8 is in the "landscape orientation." The leftward direction does not need to fully conform to the direction orthogonal to the vertical direction, and a certain margin is taken into account. When a user who grasps the housing 9 and views the touch panel 9 slightly moves the housing 8 in the leftward direction when viewed from the user, then the housing 8 makes the "leftward motion." The distance K2 and the time frame GG2 are defined as appropriate on the basis of the viewpoint that they are used as the thresholds for determining the fact that the user intentionally causes the housing 8 to make the "leftward motion."

The "leftward motion" corresponds to "a second motion in which the state of the housing 8 charges in a second mode."

Figure 5:
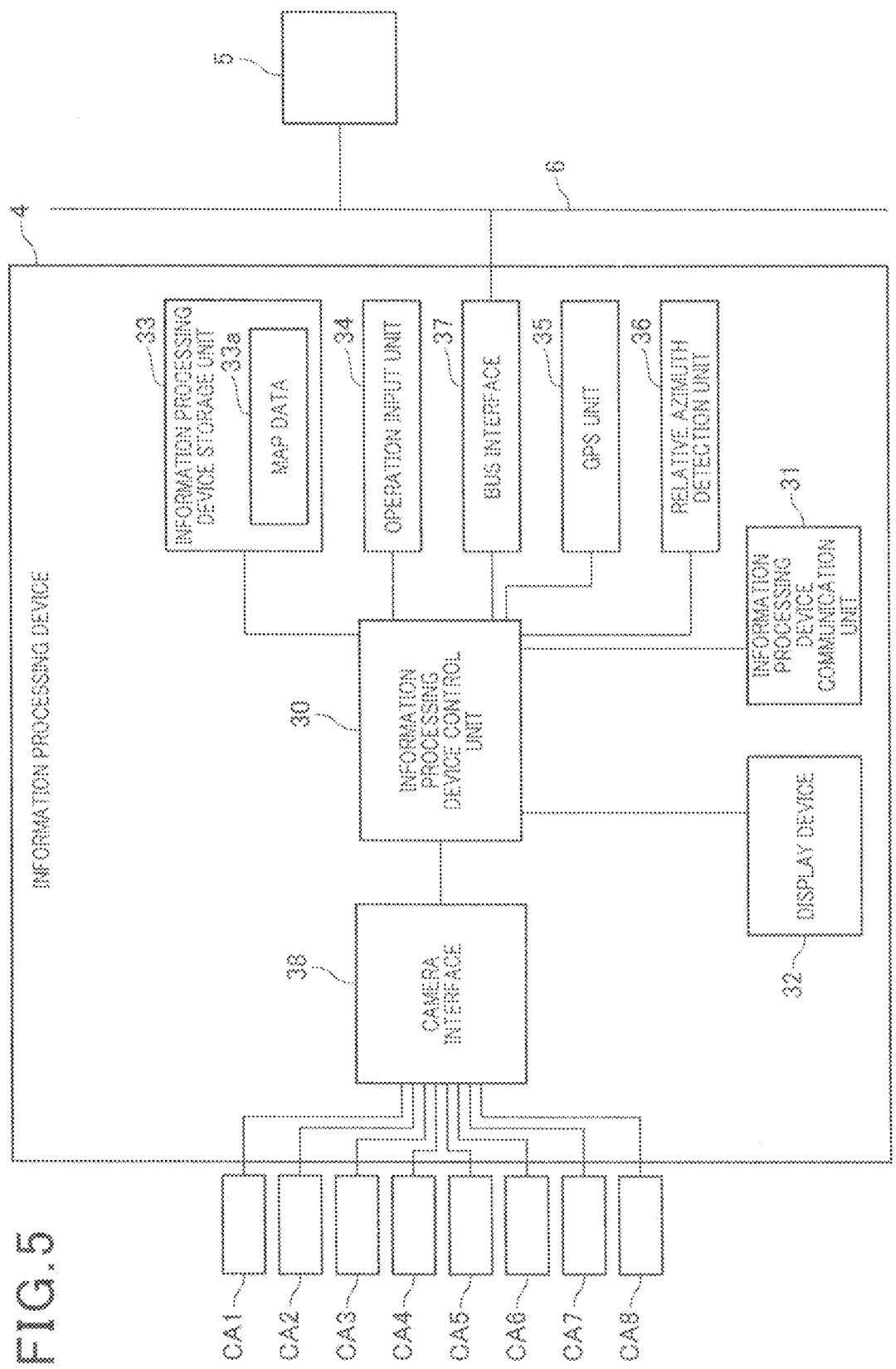
FIG. 5 is a block diagram that illustrates a functional configuration of an information processing device.

FIG. 5 is a block diagram that illustrates a functional configuration of the information processing device 4.

As illustrated in FIG. 5, the information processing device 4 includes an information processing device control unit 30, an information processing device communication unit 31, a display device 32, an information processing device storage unit 33, an operation input unit 34, a GPS unit 35, a relative azimuth detection unit 36, a bus interface 37, and a camera interface 38.

The information processing device control unit 30 includes a CPU, ROM, RAM, an ASIC, a signal processing circuit, etc., and controls individual units of the information processing device 4. In the information processing device control unit 30, for example, the CPU reads a program stored in the ROM onto the RAM to perform processing; for example, performs processing by a function implemented in the ASIC; and performs processing by cooperation of hardware and software, for example, by performing processing by performing signal processing by the signal processing circuit.

The information processing device communication unit 31 wirelessly communicates with an external device (including the mobile terminal 3) according to the Wi-Fi standards under the control of the information processing device control unit 30.

The display device 32 includes a display panel such as a liquid crystal panel and an organic EL panel, and displays an images on the display panel under the control of the information processing device control unit 30.

The information processing device storage unit 33 includes a non-volatile memory such as EEPROM and a hard disk, and stores various pieces of data rewritably in a non-volatile manner. The information processing device storage unit 33 stores map data 33a. The map data 33a stores information used in displaying a map on the display device 32 and information used in searching for a route (information on so-called link, information on so-called node, etc.). Also, the map data 33a stores, in relation to facilities in which the vehicle S can be parked such as a parking space, a detailed map of the inside of the facilities and information indicative of the structure of the facilities (hereinafter referred to as "parking map information").

The operation input unit 34 includes an operator such as a switch provided on the information processing device 4, detects an operation by the user on the operator, and outputs a signal corresponding to the operation that has been detected to the information processing device control unit 30. The information processing device control unit 30 performs, on the basis of the input from the operation input unit 34, processing corresponding to the operation by the user on the operator.

The GPS unit 35 receives a GPS radio wave from a GPS satellite via a not-shown GPS antenna and computes, from a GPS signal superimposed on the GPS radio waves, a current position of the vehicle S and a direction of travel at the vehicle S. The GPS unit 35 outputs information indicative of the current position of the vehicle S that has been computed and the information indicative of the direction of travel of the vehicle S that has been computed to the information processing device control unit 30.

The relative azimuth detection unit 36 includes a gyro sensor and an acceleration sensor. The gyro sensor is configured, for example, by a vibration gyroscope and detects a relative azimuth or the vehicle S (for example, the turning amount in the yaw axis direction). The acceleration sensor detects an acceleration acting upon the vehicle S (for example, an inclination of the vehicle with resect to the direction of travel). The relative azimuth detection unit 36 outputs the information indicative of the relative azimuth of the vehicle S that has been detected and the information indicative of the acceleration acting on the vehicle S that has been detected to the information processing device control unit 30.

The bus interface 37 includes a communication interface corresponding to the bus 6 and, under the control of the information processing device control unit 30, communicates with an external device (including vehicle drive control device 5) connected to the bus 6.

The camera interface 38 communicates with a camera provided in the vehicle S under the control of the information processing device control unit 30.

In the vehicle S, as cameras that images the outside of the vehicle, provided are a front imaging camera CA1, a front right-side imaging camera CA2, a lateral right-side imaging camera CA3, a rear right-side imaging camera CA4, a rear imaging camera CA5, a rear left-side imaging camera CA6, a lateral left-side imaging camera CA7, and a front left-side imaging camera CA8. Hereinafter, when the cameras that image the outside of the vehicle are not distinguished from each other, they are expressed as an "outside-of-vehicle imaging camera."

Figure 6:
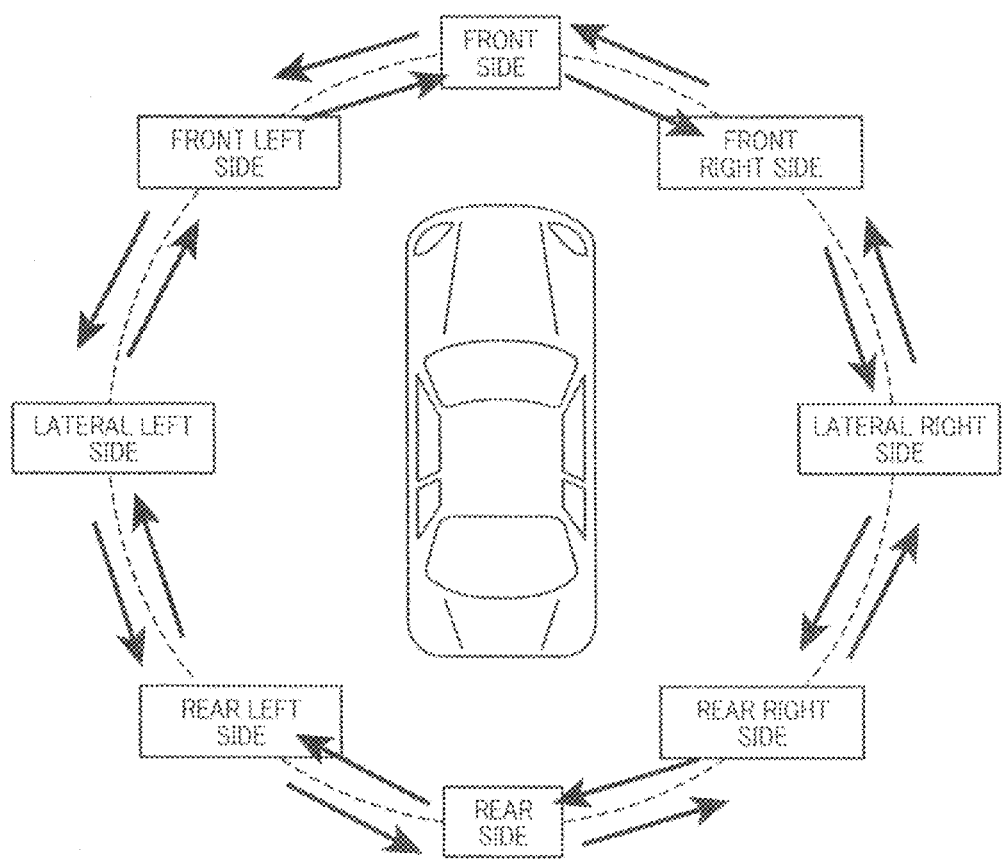
FIG. 6 is diagram used in an explanation of an imaging direction of an outside-of-vehicle imaging camera.

FIG. 6 is a diagram used in an explanation of the direction in which the outside-of-vehicle imaging camera performs imaging. Note that FIG. 6 will also be used in an explanation of the switching of the outside-of-vehicle image G2 which will be described later.

The front imaging camera CA1 is a camera that images the front side of the vehicle S (see FIG. 6).

The front right-side imaging camera CA2 is a camera that images the front right side of the vehicle S (see FIG. 6).

The lateral right-side imaging camera CA3 is a camera that images the lateral right side of the vehicle S (see FIG. 6).

The rear right-side imaging camera CA4 is a camera that images the rear right side of the vehicle S (see FIG. 6).

The rear imaging camera CA5 is a camera that images the rear side of the vehicle S (see FIG. 6).

The rear left-side imaging camera CA6 is a camera that images the rear left side of the vehicle S (see FIG. 6).

The lateral left-side imaging camera CA7 is a camera that images the lateral left side of the vehicle S (see FIG. 6).

The front left-side imaging camera CA8 is a camera that images the front left side of the vehicle S (see FIG. 6).

Each of the outside-of-vehicle imaging cameras performs imaging at a predetermined cycle, generates captured image data on the basis of a result of the imaging, and outputs the captured image data that has been generated to the information processing device control unit 30 via the camera interface 38.

Note that the modes of the outside-of-vehicle imaging cameras provided in the vehicle S are not limited to the modes according to this embodiment. As an example, a configuration is possible in which the outside-of-vehicle imaging cameras are provided in the vehicle S in the following manner. Specifically, in the vehicle S, as the outside-of-vehicle imaging cameras, four cameras, i.e., the front imaging camera CA1, the lateral right-side imaging camera CA3, the rear imaging camera CA5, and the lateral left-side imaging camera CA7 are provided; the lateral right, side and the front right side of the vehicle S are imaged by the lateral right-side imaging camera CA3; the rear side, the rear right side, and the rear left side, of the vehicle S are imaged by the rear imaging camera CA5; and the lateral left side and the front left side of the vehicle S are imaged by the lateral left-side imaging camera.

Also, among the above-described outside-of-vehicle imaging cameras, the front imaging camera CA1, the lateral right-side imaging camera CA3, the rear imaging camera CA5, and the lateral left-side imaging camera CA7 are used as cameras for use in generation of overhead image data (which will be described later. Hereinafter, when the cameras for use in generation of the overhead image data are not distinguished from each other, they are referred to as an "overhead camera." Each of the overhead cameras are a wide angle camera and provided at an appropriate position in the vehicle S in terms of use in the generation of the overhead image data.

Figure 7:
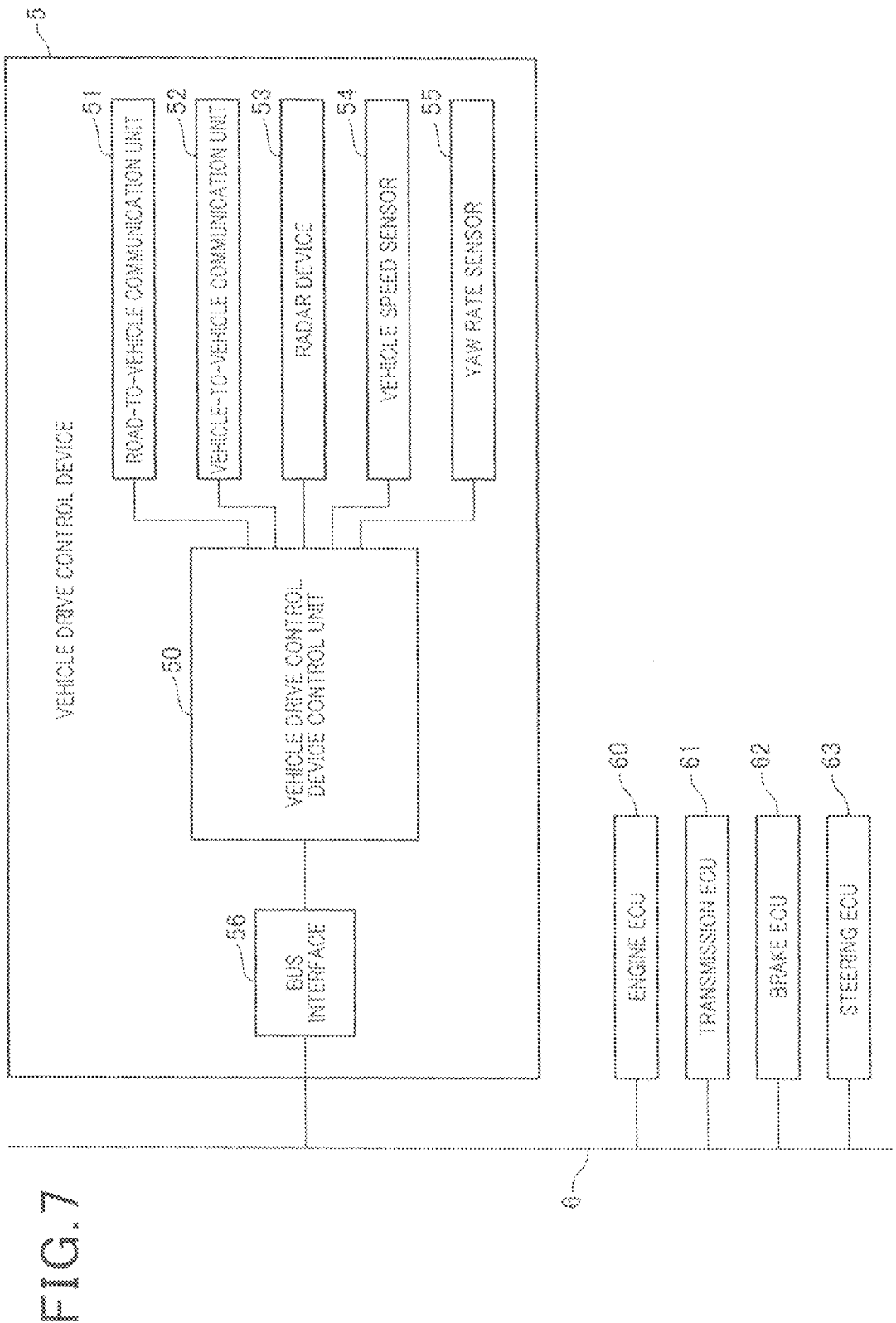
FIG. 7 is a diagram that illustrates a functional configuration of a vehicle drive control device.

FIG. 7 is a block diagram that illustrates a functional configuration of the vehicle drive control device 5.

As illustrated in FIG. 7, the vehicle drive control device 5 includes a vehicle drive control device control unit 50, a road-to-vehicle communication unit 51, a vehicle-to-vehicle communication unit 52, a radar device 53, a vehicle speed sensor 54, a yaw rate sensor 55, and a bus interface 56.

The vehicle drive control device control unit 50 includes a CPU, ROM, RAM, an ASIC, a signal processing circuit, etc., and controls individual units of the vehicle drive control device 5. In the vehicle drive control device control unit 50, for example, the CPU reads a program stored in the ROM onto the RAM to perform processing; for example, performs processing by a function implemented in the ASIC; and performs processing by cooperation of hardware and software, for example, by performing the processing by performing signal processing by the signal processing circuit.

The road-to-vehicle communication unit 51 receives, from a roadside machine installed on a road, etc., a light beacon, a radio beacon, and information transmitted by narrow-band wireless communication such as dedicated short rang communication (DSRC). The information transmitted from the roadside machine to the road-to-vehicle communication unit 51 includes, for example, information on another vehicle, information on a pedestrian, etc. The road-to-vehicle communication unit 51 outputs the information that has been received from the roadside machine to the vehicle drive control device control unit 50.

The vehicle-to-vehicle communication unit 52 transmits and receives information with another vehicle residing around the vehicle S by wireless communication with each ether. The information transmitted and received by the vehicle-to-vehicle communication unit 52 includes, for example, identification information for identifying the vehicle S and the other vehicle, information indicative of the positions of the vehicle S and the other vehicle, the information indicative or the speeds of the vehicle S and the other vehicle, information indicative of the direction of travel of the vehicle S and the direction of travel of the other vehicle, information indicative of points in time at which the vehicle S and the other vehicle stop, and the like. The vehicle-to-vehicle communication unit 52 outputs the received information to the vehicle drive control device control unit 50.

The radar device 53 emits, for example, a radio wave of a millimeter wave radar, a laser radar, etc., a sound wave of a ultrasonic radar, etc., and the like to the outside of the vehicle. The radar device 53 detects objects existing around the vehicle S by receiving a reflected wave that is reflected from the objects existing around the vehicle S (for example, another vehicle and a person). The radar device 53 outputs the information on the objects that have been detected to the vehicle drive control device control unit 50.

The vehicle speed sensor 54 detects a speed of the vehicle S (hereinafter referred to a "vehicle speed") and outputs the information on the vehicle speed that has been detected to the vehicle drive control device control unit 50.

The yaw rate sensor 55 detects a yaw rate acting upon the vehicle S and outputs the information on the yaw rate that has been detected to the vehicle drive control device control unit 50.

The bus interface 56 includes a communication interface corresponding to the bus 6 and communicates with an external device (including the information processing device 4) connected to the bus 6 under the control of the vehicle drive control device control unit 50.

As illustrated in FIG. 7, to the bus 6, as ECUs, an engine ECU 60, a transmission ECU 61, a brake ECU 62, and a steering ECU 63 are connected. The vehicle drive control device control unit 50 of the vehicle drive control device 5 outputs a control signal to the individual ECUs via the bus 6 and controls the individual ECUs.

The engine ECU 60 controls a throttle actuator that opens and closes an electronic throttle valve provided in an intake pipe of the engine and adjusts the number of revolutions of the engine on the basis of the control signal input from the vehicle drive control device control unit 50.

The transmission ECU 61 controls, on the basis of the control signal input from the vehicle drive control device control unit 50, a hydraulic control device that adjusts the hydraulic pressure of hydraulic oil supplied to the transmission, thereby adjusts the hydraulic pressure of the hydraulic oil supplied to the transmission, changes the gear ratio of the transmission, and changes the rotation speed and torque transmitted from the engine. In particular, the transmission ECU 61 changes the state of the gear of the vehicle S among Parking (P), Reverse (R), Drive (D), Neutral (N), and Low (L) on the basis of the control signal input from the vehicle drive control device control unit 50.

The brake ECU 62 controls a brake device provided on a wheel of the vehicle S and performs braking of the vehicle S on the basis of the control signal input from the vehicle drive control device control unit 50.

The steering ECU 63 controls a steering device provided in the vehicle S and performs steering at the vehicle S on the basis of the control signal input from the vehicle drive control device control unit 50.

The vehicle drive control device 5 is capable of causing the vehicle S to automatically move from the stop position in which the vehicle S is stopped to the target position that is an objective position to which the vehicle S having moved from the stop position should be stopped and stop there on the basis of automatic driving route information and without involving driving of the vehicle S by the user. As will be described later, the information processing device 4 outputs the automatic driving route information to the vehicle drive control device 5 in the automatic vehicle movement.

Figure 8:
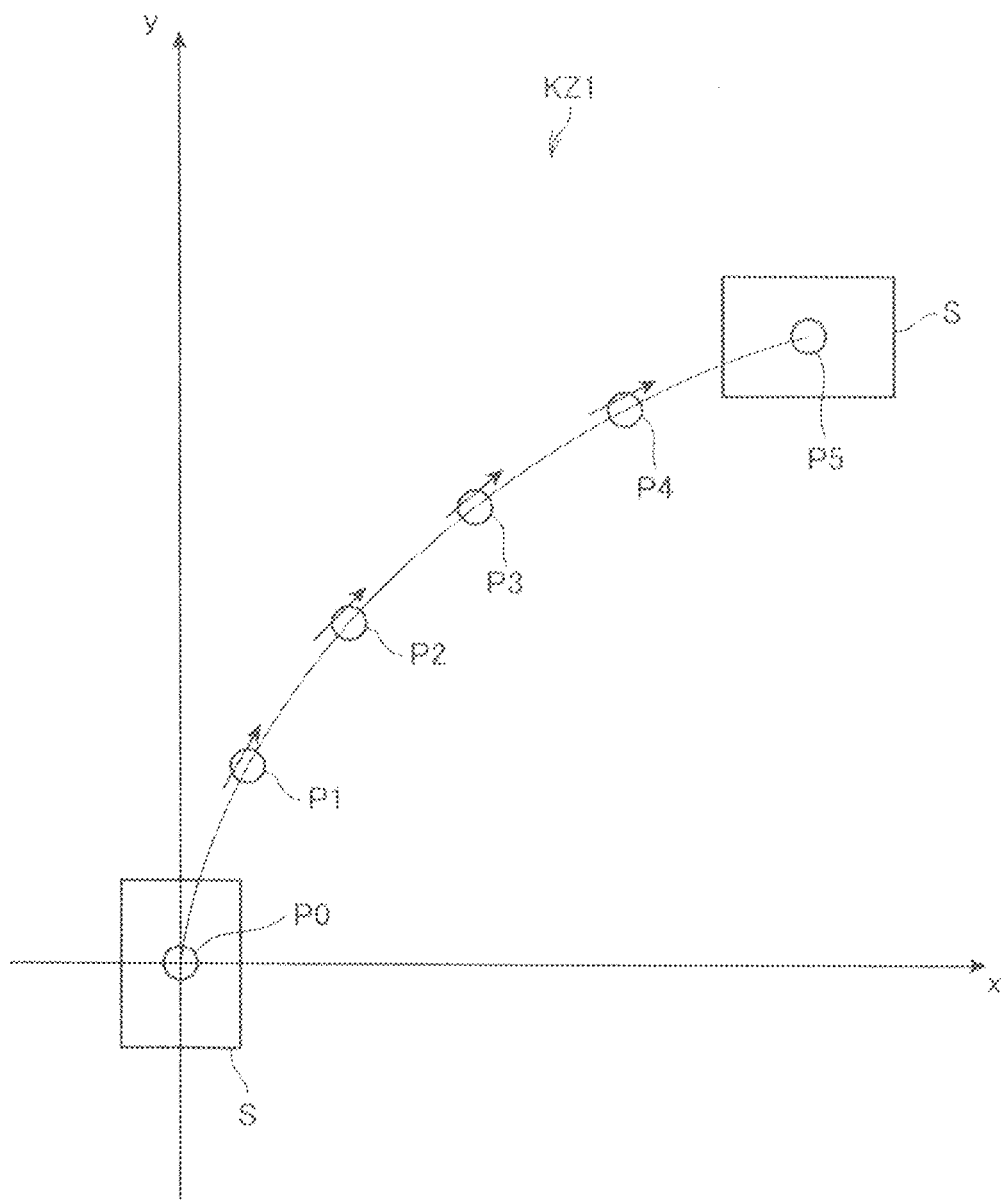
FIG. 8 is a diagram used in an explanation at automatic driving route information.

FIG. 8 is a diagram used in an explanation of automatic driving route information.

The automatic driving route information includes path information indicative of a path of the vehicle S from the stop position to the target position in a virtual coordinate system where origin is defined by the vehicle S stopping at the stop position, the y-axis is defined by the front-rear direction of the vehicle S, and the x-axis is defined by the right-left direction of the vehicle S. The path information includes pieces of information indicative of the respective coordinates of the points representing the path of the vehicle S in the virtual coordinate system and pieces of information indicative of directions of the vehicle S at the respective points in the virtual coordinate system.

FIG. 8 illustrates a virtual coordinate system KZ1 which is an example of the virtual coordinate system and an example of the path of the vehicle S in the virtual coordinate system KZ1, which are illustrated in a simplified manner so that they are suitable for explanations. In the case of the path illustrated by way of example in FIG. 8, the path information includes pieces of information indicative of the coordinates of a point P0 (which is the origin and corresponds to the stop position), a point P1, a point P2, a point P3, a point P4, and a point P5 (which is a point that corresponds to the target position) and pieces of information indicative of the directions of the vehicle S in the virtual coordinate system KZ1 at the respective points.

The vehicle drive control device control unit 50 of the vehicle drive control device 5 outputs control signals to the engine ECU 60, the transmission ECU 61, the brake ECU 62, and the steering ECU 63 on the basis of the automatic driving route information and the inputs from the vehicle-to-vehicle communication unit 52, the radar device 53, the vehicle speed sensor 54, and the yaw rate sensor 55, and causes the vehicle S stopped at the stop position to move to the target position along the path corresponding to the path information that the automatic driving, route information includes so as to be stopped at the target position.

In the foregoing, the explanations have been given on the method for the vehicle drive control device 5 to automatically move the vehicle S from the stop position to the target position on the basis of the automatic driving route a information. Meanwhile, the method for the vehicle drive control device 5 to move the vehicle S from the stop position to the target position is not limited to the above-described method and any method may be possible. Also, the sensor, ECU, device, etc., used by the vehicle drive control device 5 when the vehicle S is automatically made to move from the stop position to the target position are not limited to the sensor, ECU, device, etc., according to this embodiment. Also, the content of the automatic driving route information may be any one as long as it is information used by the vehicle drive control device 5 to automatically move the vehicle S from the stop position to the target position.

Next, the operations of the individual devices of the information processing system 1 when the automatic vehicle movement is performed will be described by way of example based on a case where the vehicle S should be parked and a case where the vehicle S should make an exit. As described above, to park means causing the vehicle S stopped at the before-parking position near the parking position to move to the parking position and stop there. Also, to make an exit means causing the vehicle S that is stopped in the parking position to move to the after-exit stop position near the parking position and stop there.

<Case Where the vehicle S Should be Parked>

First, explanations ore provided on a case where the vehicle S should be parked.

Figure 9:
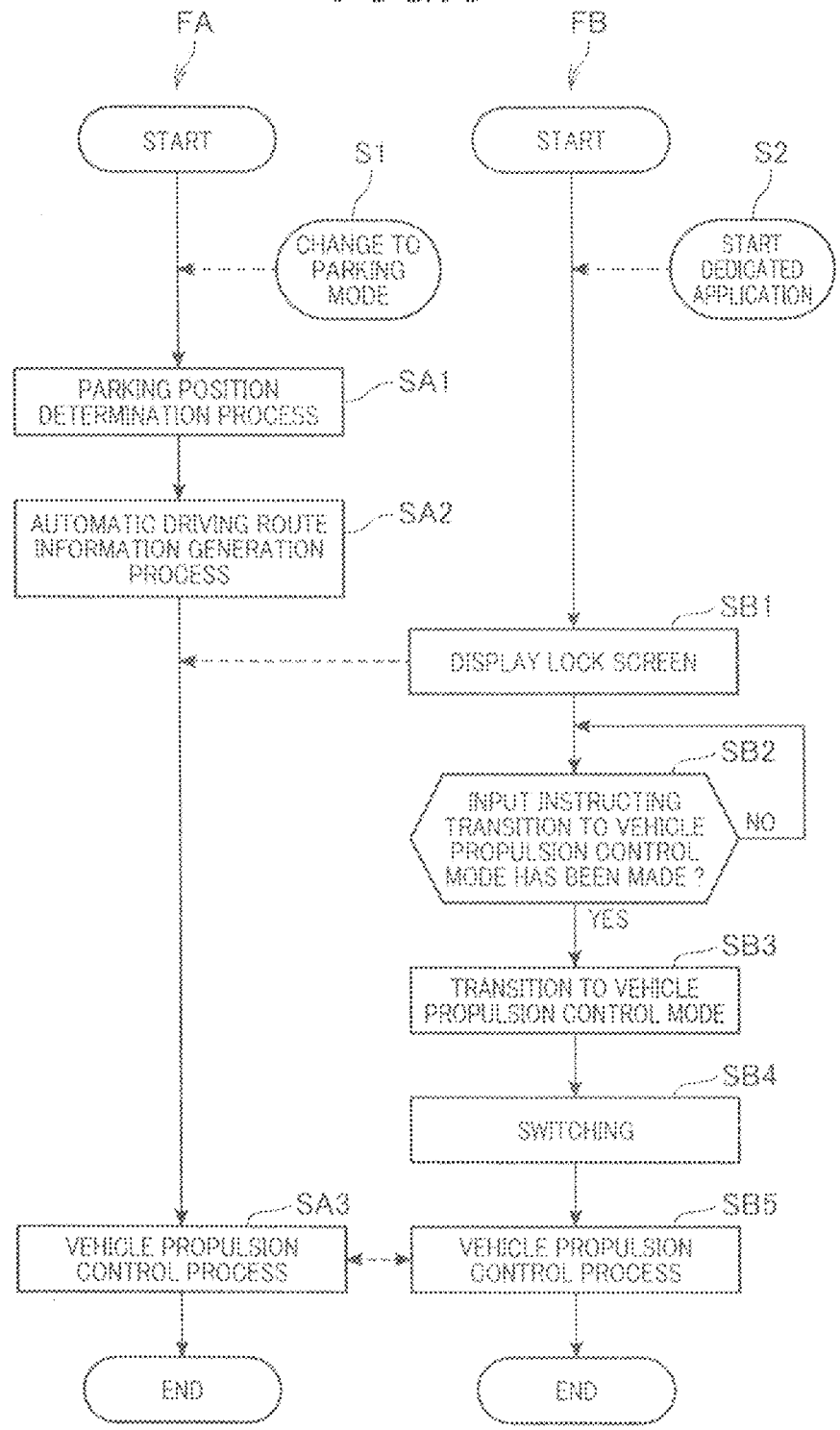
FIG. 9 is a flowchart that illustrates an operation of individual devices of the information processing system.

The flowchart FA of FIG. 9 is a flowchart illustrating the operation of the information processing device 4 and the flowchart FB is a flowchart that illustrates the operation of the mobile terminal 3.

Hereinafter, the operations of the information processing device 4 and the mobile terminal 3 will be described by way of example based on a case where the vehicle S should be parked in a parking position corresponding to one parking area of the parking space in which a plurality of parking areas are provided.

When parking should be performed by the automatic vehicle movement, the user stops the vehicle S in the before-parking position near the parking position.

Figure 10:
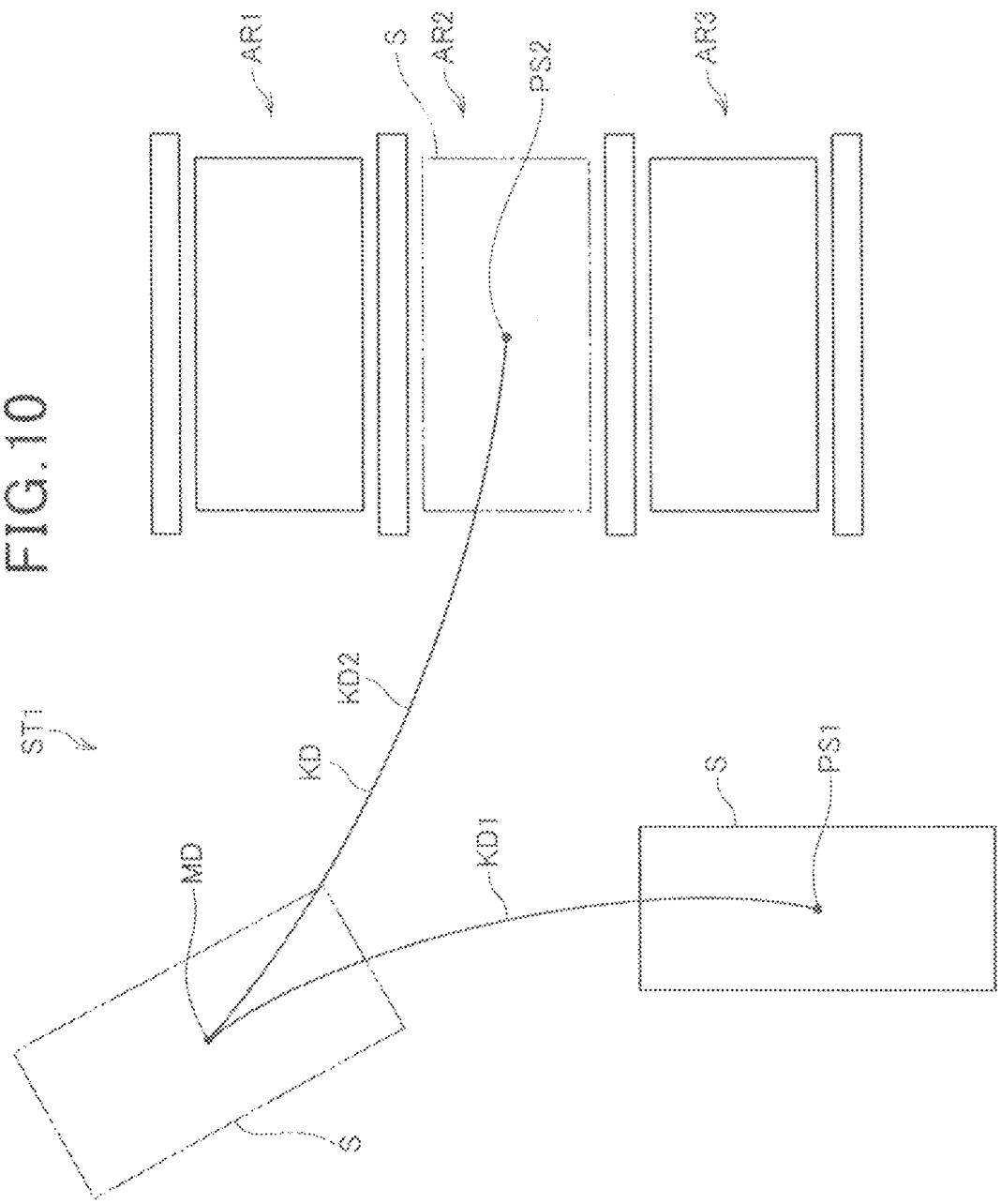
FIG. 10 is a diagram that illustrates an example of a parking space.

FIG. 10 is a diagram that illustrates a parking space ST1 which is an example of the parking space, a before-parking position PS1 which is an example of the before-parking position in the parking space ST1, and a parking position PS2 which is an example of the parking position in the parking space ST1.

The parking space ST1 has three parking area, i.e., a parking area AR1, a parking area AR2, and a parking area AR3 as parking areas in which a vehicle can be parked. At the parking area AR1 and the parking area AR3, other vehicles different than the vehicle S are already parked. In such a case, for example, the user determines the parking position PS2 of the parking area AR2 as the position in which parking of the vehicle S is desired, and cause the vehicle S to be stopped at the before-parking position PS1 near the parking position PS2.

As illustrated in the flowchart FA of FIG. 9, after having caused the vehicle S to be stopped at the before-parking position, the user operates the operation input unit 34 of the information processing device 4 and changes the operation mode of the information processing device 4 to the parking mode (step S1).

When the operation mode has been changed to the parking mode by the user, the information processing device control unit 30 of the information processing device 4 performs a parking position determination process (step SA1).

The parking position determination process is a process of identifying the parking area in which the vehicle S can be parked and deciding on the parking position.

In the parking position determination process of step SA1, the information processing device control unit 30 identifies the current position of the vehicle S (before-parking position) on the basis of the information input from the GPS unit 35, the information input from the relative azimuth detection unit 36, and the information included in the map data 33a. The method of identifying the currant position of the vehicle S may be any method and any pieces of information other than those mentioned above may be used. For example, when the current position of the vehicle S is identified, information based on signals of positioning satellite systems such as GLONASS, Galileo, Beidou, and QZSS (Michibiki) may be used.

Subsequently, the information processing device control unit 30 identifies the parking area that exists near the current position of the vehicle S and allows parking of the vehicle S on the basis of the captured image data input from each of the cameras provided in the vehicle S, the information of the map data 33a, and the like. In a case where the map data 33a has the parking map information regarding the parking space to which the current position of the vehicle S pertains, the information processing device control unit 30 uses the parking map information to identify the parking area. The method of identifying the parking area existing near the current position of the vehicle S may be any method.

Subsequently, the information processing device control unit 30 determines, as the parking position, the position corresponding to the parking area that has been identified.

After determined the parking position in step SA1, the information processing device control unit 30 performs an automatic driving route information generation process (step SA2).

The automatic driving route information generation process is a process of generating the automatic driving route information that includes the path information indicative of the path from the current position in which the vehicle S is stopped (before-parking position) to the parking position that has been determined in step SA1.

In the automatic driving route information generation process of step SA2, the information processing device control unit 30 computes the path of the vehicle S from the current position of the vehicle S to the parking position on the basis of the captured image data input from each of the cameras provided in the vehicle S, the pieces of information of the map 33a, and the like.

As illustrated in FIG. 10, when the vehicle S stopped at the before-parking position PS1 should be moved to the parking position PS2, the information processing device control unit 30 computes, for example, a path KD as the path of the vehicle S from the before-parking position to the parking position. The path KD illustrated by way of example in FIG. 10 has a path KD1 from the before-parking position PS1 to a position MD on the path KD, and a path KD2 from the position MD to the parking position PS2. The path KD1 is a path on which the vehicle S "moves forward" while turning to the left from the before-parking position PS1 toward the direction of travel and then temporarily stops at the position MD. The path KD2 is a path on which the vehicle S "moves backward" while turning to the left from the position MD toward the direction of travel and then stops in the parking position PS2.

Subsequently, the information processing device control unit 30 defines a virtual coordinate system whose origin is the current position of the vehicle S and deploys the line segments corresponding to the path of the vehicle S onto the virtual coordinate system that has been defined, generates the path information on the basis of the line segments that have bean deployed, and generates the automatic driving route information that includes the path information.

Meanwhile, after having changed the operation mode of the information processing device 4 to the parking mode in step S1, the user gets off the vehicle S in a state where the user carries the mobile terminal 3 and thus gets out of the vehicle S. Note that the user does not always have to get off the vehicle S but, in this embodiment, for the sake of explanation, the description will be provided on the assumption that the user gets off the vehicle S.

After having got out of the vehicle, the user operates the touch panel 9 of the mobile terminal 3 and starts up the dedicated application AP (step S2). Note that the user places the orientation of the housing 8 of the mobile terminal 3 in the "portrait orientation" when starting up the dedicated application AP.

The terminal control unit 20 of the mobile terminal 3 performs the processing of the flowchart FB by the function of the dedicated application AP that has been started up by the user in step S2.

In response to the dedicated application AP having been started up, the terminal control unit 20 displays a lock screen GM1 (see FIG. 11) on the touch panel 9 (step SB1).

Note in the following description that the entity that performs the process of displaying the screen on the touch panel 9, the process of changing the content of the screen in accordance with the operation by the user and other events, and the process of changing the screen displayed on the touch panel 9 from one screen to another screen is the terminal control unit 20 even when specific explanations are not given.

After having displayed the lock screen GM1, the terminal control unit 20 monitors whether or not any input that instructs transition to the vehicle propulsion control mode has been made on the lock screen GM1 (step SB2).

Hereinafter, the content of the lock screen GM1 and the process at step SB2 will be described in detail.

Figure 11:
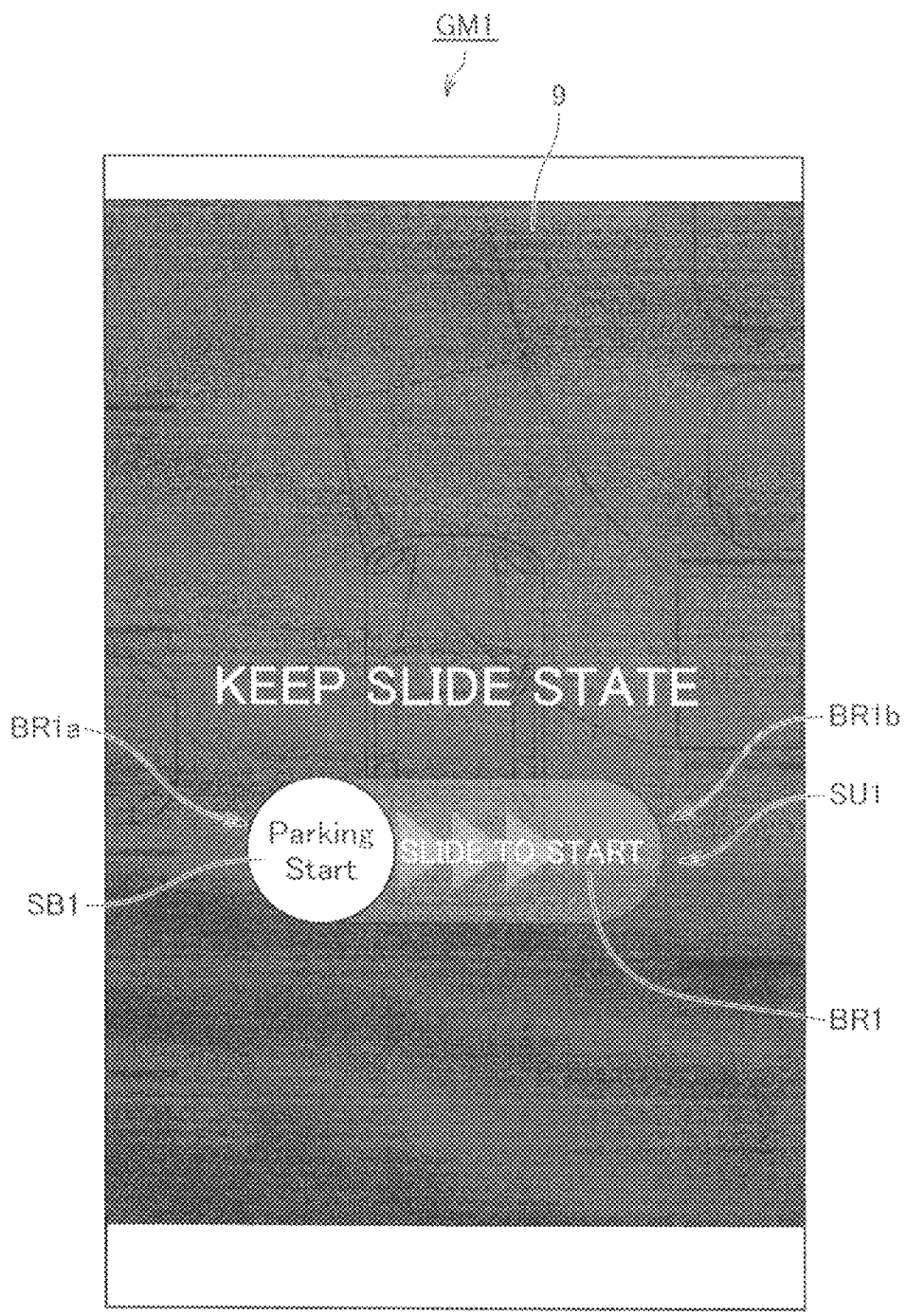
FIG. 11 is a diagram that illustrates a lock screen.

FIG. 11 is a diagram that illustrates the lock screen GM1.

The lock screen GM1 is a screen for accepting an input of the instruction to make a transition of the operation mode of the mobile terminal 3 to the vehicle propulsion control mode (which will be described later). In a case where an input of the instruction to make a transition of the operation mode has been made in the following manner on the lock screen GM1, the terminal control unit 20 causes the operation mode to make a transition to the vehicle propulsion control mode and changes the screen displayed on the touch panel 9 from the lock screen GM1 to a vehicle control screen GM2 (which will be described later). As will be described later, while the operation mode is in the vehicle propulsion control mode, the user makes an operation on the touch panel 9 and can thereby control the propulsion of the vehicle S.

As illustrated in FIG. 11, a slide unit SU1 is displayed on the lock screen GM1. The slide unit SU1 has a slide bar BR1 and a slide button SB1.

The slide bar BR1 is a strip-like object extending in the right-left direction which explicitly indicates the range in which the slide button SB1 is movable and regulates the movement of the slide button SB1.

The slide button SB1 is a button on which the user can make a touch operation (the touch-operable button will be hereinafter expressed as a "touch operation button") and is adapted to be moved along the slide bar BR1 in accordance with a swipe operation of the user. As illustrated in FIG. 11, when a touch operation is not performed by the user, a state is maintained where the slide button SB1 is positioned at the left end BR1a (one end) at the slide bar BR1. The slide button SB1 is movable in the range from the left end BR1a of the slide bar BR1 to the right end BR1 (the other end) thereof.

On the lock screen GM1, a message that briefly describes the operation that the user should perform when the user enters the instruction on the transition to the vehicle propulsion control mode is displayed above the slide unit SU1.

Figure 12:
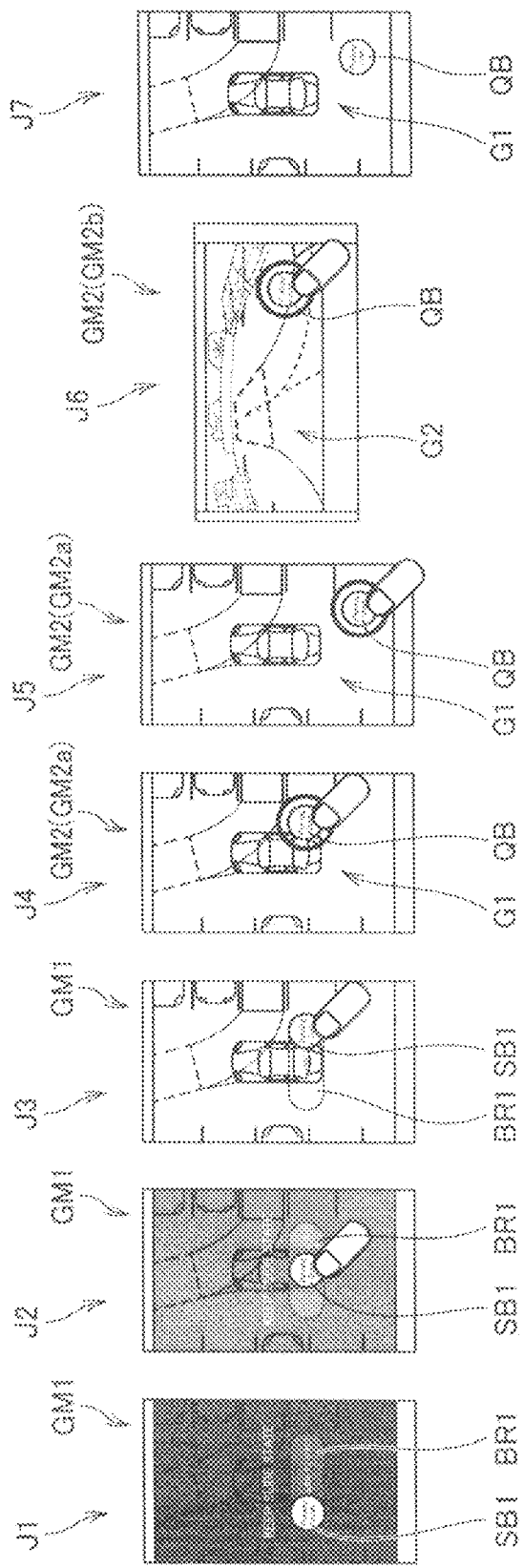
FIG. 12 is a diagram used in an explanation of a screen displayed on a touch panel.

FIG. 12 is a diagram used in an explanation of the screen displayed on the touch panel 9. In FIG. 12, a portion of the finger of the user operating the screen is illustrated along with the screen displayed on the touch panel 9.

The state J1 of FIG. 12 indicates the lock screen GM1 in a state where the user is not performing the touch operation. In a case where the instruction on the transition to the vehicle propulsion control mode should be entered, the user makes a touch operation on the slide button SB1 using his/her finger positioned at the left end BR1a of the slide bar BR1 on the lock screen GM1 in the state J1. Subsequently, the user performs the swipe operation and causes the slide button SB1 to be moved rightward along the slide bar BR1. The swipe operation means an operation of moving the position with which a finger is in contact with while maintaining the state where the finger is in contact with the touch panel 9. In response to the swipe operation, the terminal control unit 20 follows the position with which the finger is in contact and moves the slide button SB1 along the slide bar BR1. The state J2 of FIG. 12 illustrates the lock screen GM1 in a state where the slide button SB1 is positioned at the central portion of the slide bar BR1 by the swipe operation.

Here, a vehicle control screen GM2 (specifically, the overhead image display screen GM2a which will be described later) is displayed as the background on the lock screen GM1. When the lock screen GM1 is in the state J1, the terminal control unit 20 masks the overhead image display screen GM2a displayed as the background by a dark black mask image that covers the entire background. In addition, the terminal control unit 20 makes the color of the mask image lighter when the separation distance between the left end BR1a of the slide bar BR1 and the slide button SB1 becomes longer. As a result, in response to the swipe operation by the user, if the slide button SB1 is moved more rightward, then the overhead image display screen GM2a displayed as the background becomes clearer. The user sees how the overhead image display screen GM2a displayed as the background becomes clearer in response to the swipe operation or the a slide button SB1 and the user can thereby recognize intuitively that the input to the lock screen GM1 is properly performed.

The user who performs the swipe operation moves the slide button SB1 to the right end BR1b of the slide bar BR1 and maintains the state where the slide button SB1 is positioned at the right end BR1b for a predetermined period of time (for example, three seconds). As a result, the input of the instruction on the transition to the vehicle propulsion control mode is completed and the operation mode makes a transition to the vehicle propulsion control mode. The state J3 of FIG. 12 indicates the lock screen GM1 in a state where the slide button SB1 is positioned at the right end BR1b of the slide bar BR1. When the state J3 continues for a predetermined period of time, the input of the instruction on the transition to the vehicle propulsion control mode is completed. As will be clearly appreciated from comparison of the state J1, the state J2, and the state J3 of FIG. 12, the background overhead image display screen GM2a becomes clearer when the slide button SB1 is positioned more rightward.

Note that, when the swipe operation is ended before the input of the instruction on the transition to the vehicle propulsion control mode is completed, the terminal control unit 20 moves the slide button SB1 to the left end BR1a of the slide bar BR1 in response to the ending of the swipe operation.

In step SB2, the terminal control unit 20 monitors, on the basis of the input from the touch panel 9, whether or not the slide button SB1 has been positioned at the right end BR1b of the slide bar BR1 for the predetermined period of time. In addition, when the slide button SB1 has been positioned at the right end BR1b of the slide bar BR1 for the predetermined period of time, the terminal control unit 20 determines that the input of the instruction on the transition to the vehicle propulsion control mode has been made.

As has been described in the foregoing, in this embodiment, the input of the instruction on the transition to the vehicle propulsion control mode is completed only after the slide button SB1 is portioned at the right and BR1b of the slide bar BR1 for the predetermined period of time. By virtue of this feature, a finger of the user is prevented from accidentally touching the touch panel 9 causing completion of the input of the instruction on transition to the vehicle propulsion control mode against the intention of the user.

When it has been determined in step SB2 that the input of the instruction on the transition to the vehicle propulsion control mode was made (YES in step SB2), the terminal control unit 20 causes the operation mode to make a transition to the vehicle propulsion control mode (step SB3).

In response to the transition of the operation mode, the terminal control unit 20 changes the screen displayed on the touch panel 9 from the lock screen GM1 to the vehicle control screen GM2 (step SB4).

The state J4 of FIG. 12 indicates the vehicle control screen GM2 immediately the screen displayed on the touch panel 9 was changed from the lock screen GM1 to the vehicle control screen GM2. Note that the orientation of the housing 8 of the mobile terminal 3 is in the "portrait orientation" immediately after the screen was changed to the vehicle control GM2.

As will be described later, on the touch panel 9, as the vehicle control screen GM2, either screen of the overhead image display screen GM2a or the outside-of-vehicle image display screen GM2b is displayed depending on the orientation of the housing 8. The orientation of the housing 8 is in the "portrait orientation" immediately after the screen was changed to the vehicle control screen GM2, and the overhead image display screen GM2a is displayed on the touch panel 9 as the vehicle control screen GM2.

As illustrated in the state J4 of FIG. 12, the terminal control unit 20 causes the slide button SB1 on the lock screen GM1 to change into a propulsion control button QB (operation button) which is a touch operation button in response to the switching of the screens in the course of the transition of the operation mode, and displays the propulsion control button QB on the vehicle control screen GM2. Specifically, in accordance with the switching of the screens, instead of additionally displaying the propulsion control button QB as the button different than the slide button SB1, the terminal control unit 20 causes the slide button SB1 positioned at the right end BR1b of the slide bar BR1 to function as the propulsion control button QB in response to the change of the screen without changing the position. Accordingly, immediately after the screen has changed, the propulsion control button QB is positioned at the right end BR1b of the slide bar BR1 on the lock screen GM1, and the propulsion control button QB is in the state where it has been subjected to the touch operation by the user.

As illustrated in the flowcharts FA and FB of FIG. 9, after the operation mode of the mobile terminal 3 has made a transition to the vehicle propulsion control mode, the information processing device control unit 30 of the information processing device 4 and the terminal control unit 20 of the mobile terminal 3 perform the vehicle propulsion control processing in cooperation (steps SA3 and SB5). Hereinafter, explanations will provided with regard to the vehicle propulsion control processing, by way of separate processes, i.e., a process associated with the control of the propulsion of the vehicle S and a process associated with the display on the touch panel 9.

Note that, when the dedicated application AP is started, the terminal control unit 20 establishes the communication channel between the mobile terminal 3 and the information processing device 4 in accordance with the standards of Wi-Fi and establishes a state where communication can be performed between the mobile terminal 3 and the information processing device 4. Information necessary for establishing the communication channel (for example, a pass word, etc., necessary for the information processing device 4 to authenticate the mobile terminal 3) is registered in advance.

<Processes Associated with Control of the Propulsion of the Vehicle S>

First, the processes associated with the control of the propulsion of the vehicle S in the vehicle propulsion control processing will be described.

In the vehicle propulsion control processing, the terminal control unit 20 of the mobile terminal 3 controls the terminal communication unit 21 while a touch operation is being performed on the propulsion control button QB displayed on the vehicle control screen GM2 and transmits a propulsion instruction signal to the information processing device 4. Meanwhile, the terminal control unit 20 stops the transmission of the propulsion instruction signal in response to the ending of the touch operation on the propulsion control button QB. Specifically, the terminal control unit 20 does not transmit the propulsion instruction signal to the information processing device 4 while a touch operation is not performed on the propulsion control button QB.

As will be described later, the screen displayed as the vehicle control screen GM2 changes depending on the orientation of the housing 8 of the mobile terminal 3 and the position of the propulsion control button QB on the vehicle control screen GM2 moves in accordance with the operation of the user. However, the terminal control unit 20 transmits the propulsion instruction signal to the information processing device 4 regardless of switching of the screens displayed on the vehicle control screen GM2 and regardless of the position of the propulsion control button QB while the touch operation is being performed on the propulsion control button QB, and does not transmit the propulsion instruction signal to the information processing device 4 while the touch operation is not performed.

In the vehicle propulsion control processing, the information processing device control unit 30 of the information processing device 4 outputs, to the vehicle drive control device 5, the automatic driving route information generated by the automatic driving route information generation process in step SA2. Further, the information processing device control unit 20 outputs a drive instruction signal to the vehicle drive control device 5 while the information processing device control unit 30 is receiving the propulsion instruction signal from the mobile terminal 3. Meanwhile, the information processing device control unit 30 does not output the drive instruction signal to the vehicle drive control device 5 while the information processing device control unit 30 in not receiving the propulsion instruction signal from the mobile terminal 3.

The vehicle drive control device 5 performs the following processing on the basis of the drive instruction signal input from the information processing device 4. Specifically, the vehicle drive control device control unit 50 of the vehicle drive control device 5 causes the vehicle S to move along the path indicated by the path information on the basis of the path information included in the automatic driving route information while the drive instruction signal is being input from the information processing device 4. Meanwhile, when a state where the drive instruction signal is being input is exited and a state is entered where it is not being input, the vehicle drive control device control unit 50 controls the vehicle S and stops the movement of the vehicle S.

In addition, when the state where the drive instruction signal is not being input is exited and a state is entered where it is being input, the vehicle drive control device control unit 50 starts the vehicle S and causes the vehicle S to move along the path indicated by the path information. By way of example with reference to FIG. 10, after having started the vehicle S positioned at the before-parking position PS1, the vehicle drive control device control unit 50 causes the vehicle S to move along the path KD while the drive instruction signal is being input. In addition, when the state is entered where the drive instruction signal is not input while the vehicle S is positioned at the position PS3, the vehicle drive control device control unit 50 brakes the vehicle S and stops the movement of the vehicle S. In this state, when the drive instruction signal is input again, the vehicle drive control device control unit 50 starts the vehicle S positioned at the position PS3 and causes the vehicle S to move along the path KD.

As a result of the above-described process being performed, the vehicle S moves along the path while the user is performing the touch operation on the propulsion control button QB on the vehicle control screen GM2, and the movement of the vehicle S is stopped while the user does not perform the touch operation on the propulsion control button QB. As a result, when the user wants to stop the movement of the vehicle S for a certain reason, the user can stop the movement of the vehicle S quickly by performing a simple task of ending the touch operation on the propulsion control button QB.

<Processing Associated with Display on the Touch Panel 9>

Next, the processing associated with display on the touch panel 9 in the vehicle propulsion control processing will be described.

In this embodiment, in relation to the processing associated with the display on the touch panel 9, two operation modes are provided, i.e., a first mode and a second mode. The user can switch the operation modes between the first and second modes by a predetermined method.

Hereinafter, the operations of the information processing device 4 and the mobile terminal 3 when the operation mode is in the first mode will be described and, subsequently, the operations of the information processing device 4 and the mobile terminal 3 when the operation mode is in the second mode will be described.

<First Mode>

Figure 13:
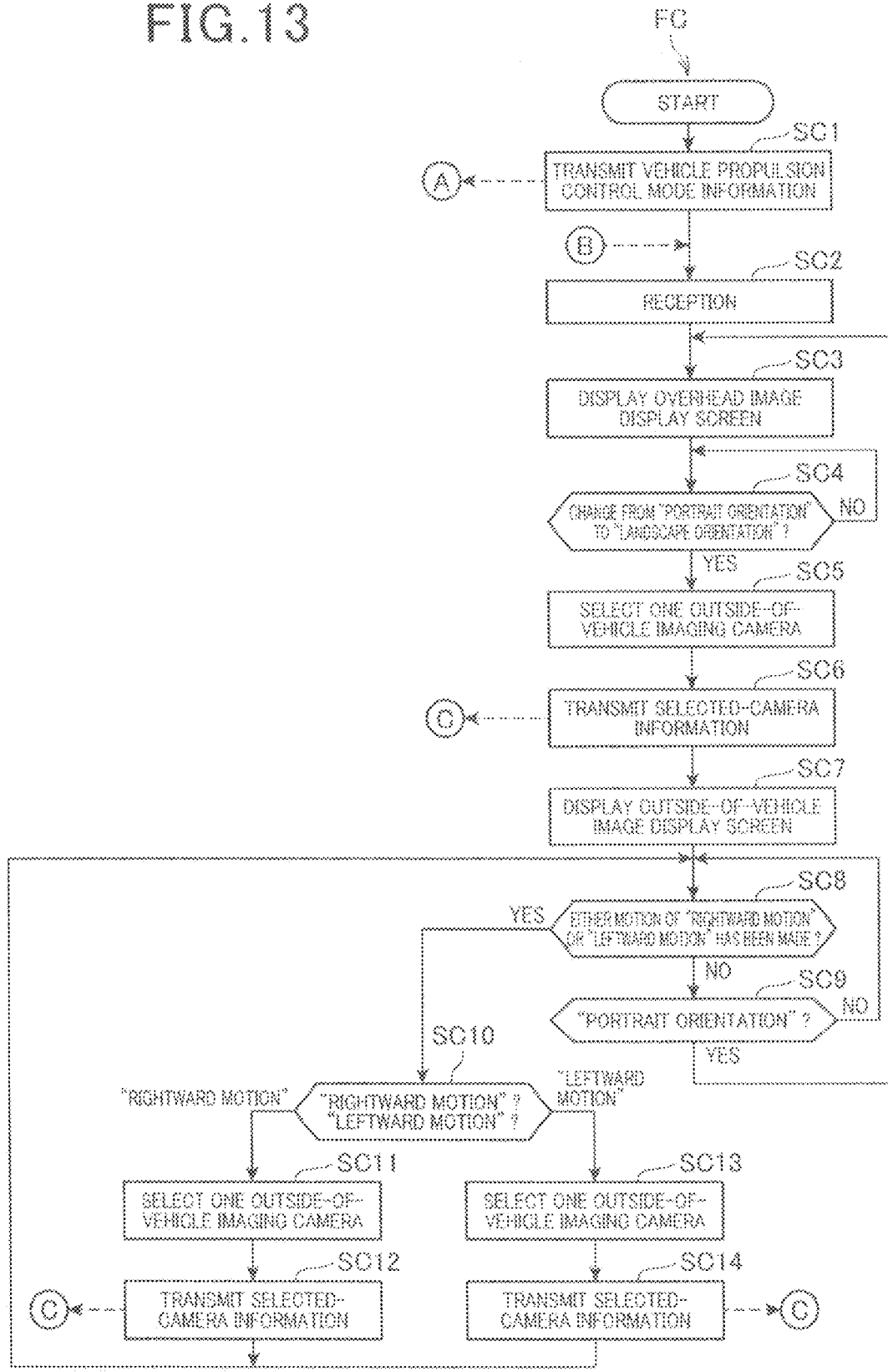
FIG. 13 is a flowchart that illustrates an operation of the mobile terminal.

The flowchart FC of FIG. 13 is a flowchart that illustrates the operation of this mobile terminal 3 when the operation mode is in the first mode. The flowchart FD of FIG. 14A and the flowchart FE of FIG. 14B are flowcharts that each illustrates the operation of the information processing device 4 when the operation mode is in the first mode.

As illustrated in the flowchart FC of FIG. 13, the terminal control unit 20 of the mobile terminal 3 controls the terminal communication unit 21 in response to the transition to the vehicle propulsion control mode and transmits, to the information processing device 4, vehicle propulsion control mode information indicative of the fact that transition has been made to the vehicle propulsion control mode (step SC1).

Figure 14A:
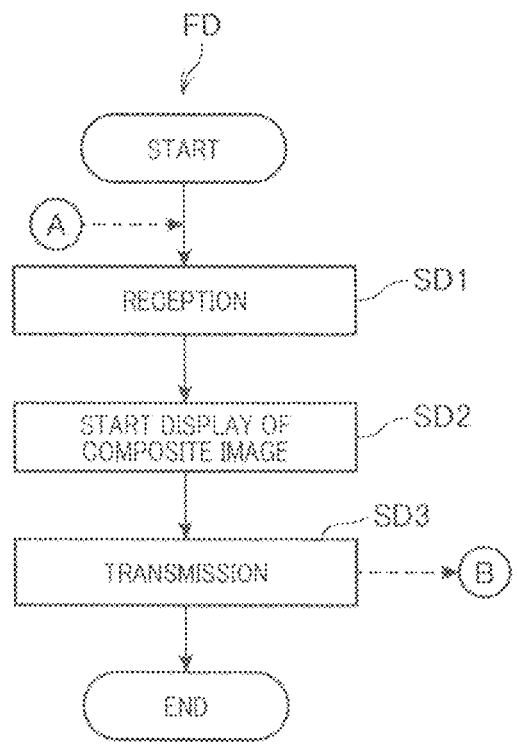
FIG. 14A is a flowchart that illustrates an operation of the information processing device.
Figure 14B:
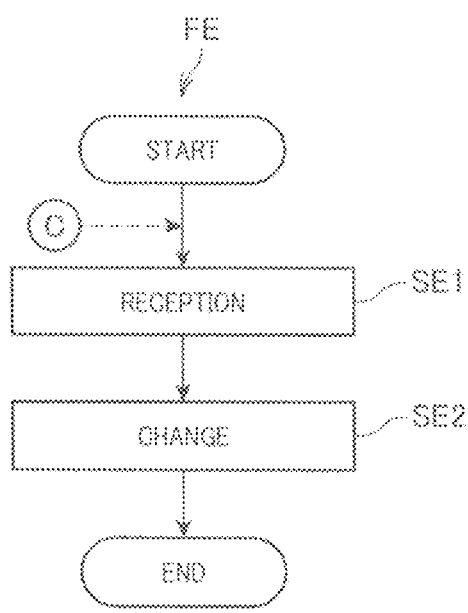
FIG. 14B is a flowchart that illustrates the operation of the information processing device.

As illustrated in the flowchart FD of FIG. 14A, the information processing device control unit 30 of the information processing device 4 receives the vehicle propulsion control mode information (step SD1).

The information processing device control unit 30 starts display of the composite image G on the display device 32 in response to the reception of the vehicle propulsion control mode information on the basis of the captured image data input from each of the cameras provided in the vehicle S (step SD2).

Figure 15:
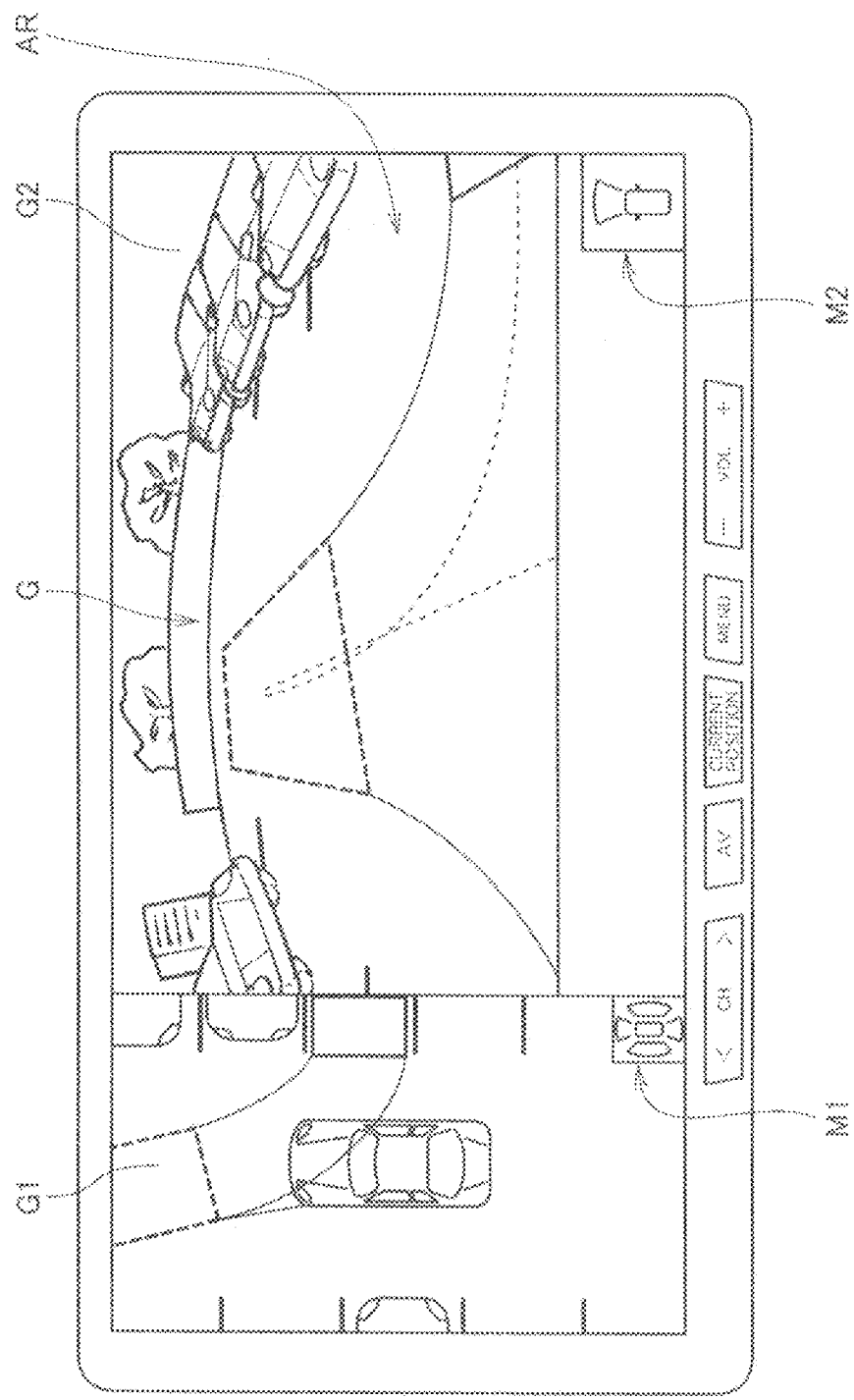
FIG. 15 is a diagram that illustrates a composite image.

FIG. 15 is a diagram in which the display device 32 on which the composite image G is displayed is viewed from the front.

As illustrated in FIG. 15, the shape of the display area AR in which display of an image in the display device 32 is possible is rectangular with a short side in an up-down direction and a long side in a right-left direction. Note that the up-down direction is a direction that corresponds to the vertical direction and the right-left direction is a direction that corresponds to the direction orthogonal to the vertical direction.

As illustrated in FIG. 15, the composite image G has an overhead image G1 and an outside-of-vehicle image G2.

The overhand image G1 is an image of a bird's eye view of the vehicle S. As illustrated in FIG. 15, the overhead image G1 is a rectangular image that has a long side in the up-down direction and a short side in the right-left direction and is displayed on the left portion of the display area AR. At the lower right portion of the overhead image G1, the mark M1 is displayed which explicitly indicates that the displayed image is the overhead image G1.

The outside-of-vehicle image G2 is an image based on a result of imaging of the outside of the vehicle by one outside-of-vehicle imaging camera out of the outside-of-vehicle imaging cameras. As illustrated in FIG. 15, the outside-of-vehicle image G2 is a rectangular image that has a short side in the up-down direction and a long side in the right-left direction. The outside-of-vehicle image G2 is displayed in the right portion of the display area AP in a state where the right side of the overhead image G1 and the left side of the outside-of-vehicle image G2 are overlapped with each other. At the lower right portion of the outside-of-vehicle image G2, the mark M2 is displayed. The mark M2 is a mark that explicitly indicates the outside-of-vehicle imaging camera which is the source of the output of the captured image data corresponding to the outside-of-vehicle image G2 displayed on the display device 32 among the outside-of-vehicle imaging cameras. For example, when the outside-of-vehicle imaging camera which is the source of the output of the captured image data corresponding to the outside-of-vehicle image G2 displayed on the display device 32 is the front imaging camera CA1, the mark M2 is a mark obtained by adding a decoration explicitly indicating that the front side of the vehicle S has been imaged to a symbol representing the vehicle S. The user can accurately recognize, by referring to the mark M2, which outside-of-vehicle imaging camera has provided the result of imaging that the outside-of-vehicle image G2 displayed on the display device 32 is based upon amongst the outside-of-vehicle imaging cameras.

At the time of display of the composite image, the information processing device control unit 30 acquires the captured image data input from each of the overhead cameras. Subsequently, image data of a bird's eye view of the vehicle S (hereinafter referred to as "overhead image data") is generated on the basis of the captured image data input from each of the overhead cameras. The image of the bird's eye view of the vehicle S is an image that indicates how the vehicle S as a whole and regions around the vehicle S are viewed from above. Note that, in this embodiment, the image data is bitmap data in which dots having information on color (for example, information indicative of the color components of each color of RGB as gradation values of a predetermined gradation) are arranged in a dot matrix at a predetermined resolution. The overhead image data is image data at a predetermined resolution with a size corresponding to the size of the overhead image G1 (the length in the up-down direction and the length in the right-left direction). The process of generating the overhead image data on the basis of the captured image data input from the overhead camera is performed properly by existing technology.

Each of the overhead cameras performs imaging in synchronization with each other and outputs the captured image data based on the result of the synchronized imaging to the information processing device control unit 30. Each of the overhead cameras performs the execution of the imaging and the output of the captured image data at a predetermined cycle (for example, 10 milliseconds). The information processing device control unit 30 acquires the captured image data input from each of the overhead cameras at a cycle corresponding to the predetermined cycle and generates the overhead image data on the basis of the captured image data that has been acquired. At the time of the generation of the overhead image data, the information processing device control unit 30 adds image data corresponding to the mark M1 to an appropriate position and generates the overhead image data.

Also, each of the outside-of-vehicle imaging cameras performs the imaging at a predetermined cycle and outputs the captured image data based on this result of the imaging to the information processing device control unit 30. The information processing device control unit 30 selects one outside-of-vehicle imaging camera from among the outside-of-vehicle imaging cameras, acquires the captured image data input from the outside-of-vehicle imaging camera that has been selected, and generates the image data of the outside-of-vehicle image G2 (hereinafter referred to as "outside-of-vehicle image data") on the basis of the captured image data. The information processing device control unit 30 generates the outside-of-vehicle image data at a cycle corresponding to the predetermined cycle. At the time of the generation of the outside-of-vehicle image data, the information processing device control unit 30 adds image data corresponding to the mark M2 to an appropriate position and generates the outside-of-vehicle image data. The outside-of-vehicle image data is image data at a predetermined resolution with a size corresponding to the size of the outside-of-vehicle image G2 (the length in the up-down direction and the length in the right-left direction).

The information processing device control unit 30 performs the generation of the overhead image data based on the input from the overhead camera and the generation of the outside-of-vehicle image data based on the input from the outside-of-vehicle imaging camera in a synchronized manner at a predetermined cycle. The information processing device control unit 30 combines, at a predetermined cycle, the overhead image data that has been generated and the outside-of-vehicle image data that has been generated corresponding to the positional relationship between the overhead image G1 and the outside-of-vehicle image G2 and generates composite image data of the composite image G. The information processing device control unit 30 controls the display device 32 on the basis of the composite image data that has been generated and causes the display device 32 to display the composite image G based on the composite image data.

As a result, the composite image G obtained by combing the overhead image G1 and the outside-of-vehicle image G2 is displayed on the display device 32. The content of the overhead image G1 changes at any time on the basis of the result of the imaging by the overhead camera and the content of the outside-of-vehicle image G2 changes at any time on the basis of the result of the imaging by the outside-of-vehicle imaging camera that has been selected.

As described above, the information processing device control unit 30 generates the composite image data at the predetermined cycle and causes the display device 32 to display the composite image G.

In response to the display of the composite image G on the display device 32, the information processing device control unit 30 transmits the composite image data that has been generated to the mobile terminal 3 at the predetermined cycle (step SD3).

Note That, the first mode differs from the second mode which will be described later in that, in the first mode, the information processing device control unit 30 transmits the composite image data to the mobile terminal 3.

As illustrated in the flowchart FC, the terminal control unit 20 of the mobile terminal 3 starts reception of the composite image data that the information processing device 4 transmits (step SC2) and, on the basis of the composite image data that hay been received, causes the touch panel 9 to display the overhead image display screen GM2a (step SC3). Note that at the point in time at which the process at step SC3 is performed, the orientation of the housing of the mobile terminal 3 is in the "portrait orientation."

The overhead image display screen GM2a is, as illustrated in the state J3 of FIG. 12, a screen on which the overhead image G1 is displayed and the propulsion control button QB is displayed in a superposed manner upon the overhead image G1.

In step SC3, the terminal control unit 20 performs the following process and causes the touch panel 9 to display the overhead image display screen GM2a. Specifically, the terminal control unit 20 extracts the overhead image data from the composite image data for each of the pieces of composite image data received at the predetermined cycle. An area of the overhead image data in the composite image data is defined in advance and the terminal control unit 20 separates from the composite image data the data pertaining to the area of the overhead image data in the composite image data and thereby extracts the overhead image data. Subsequently, the terminal control unit 20 subjects the extracted overhead image data to necessary image processing (a process of adjusting the resolution, a process of adjusting the size, etc.) and causes the touch panel 9 to display the overhead image display screen GM2a on the basis of the overhead image data that has been subjected to the image processing.

The content of the overhead image G1 displayed on the overhead image display screen GM2a changes at any time on the basis of the result of the imaging by the overhead camera in synchronization with the overhead image G1 displayed on the display device 32 of the information processing device 4.

Here, as described above, the overhead image G1 is a rectangular image having the long side in the up-down direction (the direction that corresponds to the vertical direction) and the short side in the right-left direction (the direction that corresponds to the direction orthogonal to the vertical direction). Also, when the orientation of the housing 8 of the mobile terminal 3 is in the "portrait orientation," the touch panel 9 is placed in a state where the direction of the long side is in the vertical direction and the direction of the short side is in the direction orthogonal to the vertical direction. Accordingly, when the orientation of the housing 8 is in the "portrait orientation," by displaying the overhead image G1 on the touch panel 9, it is possible to take advantage of the feature that the overhead image G1 has its long side in the up-down direction and its short side in the right-left direction and display the overhead image G1 using the entire display area of the touch panel 9 without unnecessarily reducing the overhead image G1. As a result, the overhead image G1 can be easily seen by the user and the convenience for the user is improved.

After having displayed the overhead image display screen GM2a, the terminal control unit 20 monitors whether the orientation of the housing 8 of the mobile terminal 3 has changed from the "portrait orientation" to the "landscape orientation" on the basis of the input from the housing state detection unit 23 (step SC4).

In the case where it has been detected that the orientation of the housing 8 of the mobile terminal 3 has changed from the "portrait orientation" to the "landscape orientation" (YES in step SC4), the terminal control unit 20 selects one outside-of-vehicle imaging camera from among the outside-of-vehicle imaging camera in accordance with a predetermined order of priority corresponding to the state of the vehicle S (step SC5).

For example, the order of priority is an order of priority according to which the outside-of-vehicle imaging camera that can image the direction of travel of the vehicle S will occupy a higher place. In this case, when the vehicle S is "moving forward" to the front side, the front imaging camera CA1 will occupy the highest place in the order of priority and, when the vehicle S is "moving forward" toward the front right side, the front right-side imaging camera CA2 will occupy the highest place in the order of priority, and, when the vehicle S is "moving backward" to the rear side, the rear imaging camera CA5 will occupy the highest place in the order of priority. Here, when the vehicle S is performing the automatic vehicle movement, it is expected that the user in many cases wants to recognize the state of the direction of travel of the vehicle S.

Also, for example, the order of priority is an order of priority according to which a camera that can image the object close to the vehicle S will occupy a higher place. The object close to the vehicle S is, for example, a vehicle that has already been parked at the parking area adjacent to the parking area in which parking should be made by the automatic vehicle movement and, for example, a person other than the user. In a case where the object exists at a position close to the vehicle S, it is expected that the user in many cases wants to recognize the object and recognize the positional relationship between the object and the vehicle S.

Note that the terminal control unit 20 communicates with the information processing device 4 as appropriate and acquires information necessary for selecting the outside-of-vehicle imaging camera according to a predetermined order of priority in step SC5.

After having selected the one outside-of-vehicle imaging camera in step SC5, the terminal control unit 20 transmits selected-camera information indicative of the outside-of-vehicle imaging camera that has been selected (for example, the identification information for identifying the outside-of-vehicle imaging camera that has been selected) to the information processing device 4 (step SC6).

As illustrated in the flowchart FE of FIG. 14B, the information processing device control unit 30 of the information processing device 4 receives the selected-camera information (step SE1).

Subsequently, the information processing device control unit 30 changes the outside-of-vehicle image G2 that should be displayed on the display device 32 to the image based on the result of the imaging by the outside-of-vehicle imaging camera indicated by the selected-camera information received in step SE1 (step SE2).

In step SE2, the information processing device control unit 30 combines that overheard image data and the outside-of-vehicle image data based on the result of the imaging by the outside-of-vehicle imaging camera indicated by the selected-camera information to generate the composite image data, and displays the composite image G on the basis of the composite image data that has been generated.

Before and after the processing at step SE2, the information processing device control unit 30 performs continuously the transmission of the composite image data corresponding to the composite image G to be displayed on the display device 32. As a result, after the process at step SE2, a state is entered where the composite image data that the information processing device 4 transmits to the mobile terminal 3 includes the outside-of-vehicle image data based on the result of the imaging by the outside-of-vehicle imaging camera that has been selected in step SC5.

As illustrated in the flowchart FC of FIG. 13, after having transmitted the selected-camera information in step SC6, the terminal control unit 20 of the mobile terminal 3 causes the touch panel 9 to display the outside-of-vehicle image display screen GM2*b* on the basis of the composite image data received from the information processing device 4 (step SC7).

Note that, in step SC7, the composite image data used in the display of the outside-of-vehicle image display screen GM2*b* is the composite image data that includes the outside-of-vehicle image data based on the result of the imaging by the outside-of-vehicle imaging camera that has been selected in step SC5.

The state J6 of FIG. 12 illustrates the outside-of-vehicle image display screen GM2*b* The outside-of-vehicle vehicle image display screen GM2*b* is, as illustrated by the state J6 of FIG. 12, a screen on which the outside-of-vehicle image G2 is displayed and the propulsion control button QB is displayed in a superposed manner on the outside-of-vehicle image G2.

In step SC7, the terminal control unit 20 extracts the outside-of-vehicle image data from the composite image data for each of the pieces of composite image data received at the predetermined cycle. The area of the outside-of-vehicle image data in the composite image data is defined in advance and the terminal control unit 20 separates the data pertaining to the area at the outside-of-vehicle image data in the composite image data from the composite image data and thereby extracts the outside-of-vehicle image data. Subsequently, the terminal control unit 20 subjects the outside-of-vehicle image data that has been extracted to necessary image processing (a process of adjusting the resolution, a process adjusting the size, etc.) and causes the touch panel 9 to display the outside-of-vehicle image display screen GM2*b* on the basis of the outside-of-vehicle image data that has been subjected to the image processing.

The content of the outside-of-vehicle image G2 displayed on the outside-of-vehicle image display screen GM2*b* changes at any time on the basis of the result of the imaging by the outside-of-vehicle imaging camera that has been selected in step SC5 in synchronization with the outside-of-vehicle image G2 displayed on the display device 32 of the information processing device 4.

As has been described in the foregoing, in this embodiment, when the orientation of the housing 8 of the mobile terminal 3 has changed from the "portrait orientation" to the "landscape orientation," the outside-of-vehicle image display screen GM2*b* is displayed on the touch panel 9 in place of the overhead image display screen GM2*a*. As a result, when the user wants to view the outside-of-vehicle image G2 in place of the overhead image G1, the user can cause the outside-of-vehicle image display screen GM2*b* to be displayed by simple task of changing the orientation of the housing 8 of the mobile terminal 3 and can view the outside-of-vehicle image G2. In particular, the operation of changing the orientation of the housing 8 of the mobile terminal 3 is an operation that can be performed accurately in a simple manner even when the user grasps the mobile terminal 3 by one hand, and the convenience for the user is high.

In particular, in this embodiment, the outside-of-vehicle image display screen GM2b displayed in response to the orientation of the housing 8 of the mobile terminal 3 having changed from the "portrait orientation" to the "landscape orientation" is a screen based on the result of the imaging by the outside-of-vehicle imaging camera that been selected in accordance with the predetermined order of priority corresponding to the state of the vehicle S. As a result, the outside-of-vehicle image G2 displayed on the outside-of-vehicle image display screen GM2b is likely to be the image based on the result of imaging by the outside-of-vehicle imaging camera desired by the user, and the convenience for the user is high.

Also, as described above, outside-of-vehicle image G2 is a rectangular image having the long side in the right-left direction (the direction that corresponds to the direction orthogonal to the vertical direction) and the short side in the up-down direction (the direction that corresponds to the vertical direction). Also, when the orientation of the housing 8 of the mobile terminal 3 is in the "landscape orientation," the touch panel 9 is placed in a state where the direction of the long side is in the direction orthogonal to the vertical direction and the direction of the short side is in the vertical direction. Accordingly, when the orientation of the housing 8 is in the "landscape orientation," by displaying the outside-of-vehicle image G2 on the touch panel 9, it is possible to take advantage of the feature that the outside-of-vehicle image G2 has its long side in the right-left direction and its short side in the up-down direction and display the outside-of-vehicle image G2 using the entire display area of the touch panel 9 without unnecessarily reducing the outside-of-vehicle image G2. As a result, the outside-of-vehicle image G2 can be easily seen by the user and the convenience for the user is improved.

After having displayed the outside-of-vehicle image display screen GM2b in step SC7, the terminal control unit 20 monitors whether the housing 8 makes either motion of the "rightward motion" or the "leftward motion" (step SC8) and monitors whether or not the orientation of the housing 8 has been placed in the "portrait orientation" (step SC9).

When the housing 8 does not make any motion of the "rightward motion" and the "leftward motion" (NO in step SC8) and the orientation of the housing 8 has been placed in the "portrait orientation" (YES in step SC9), the terminal control unit 20 makes the processing procedure proceed to step SC3. As described above, in step SC3, the terminal control unit 20 causes the touch panel 9 to display the overhead image display screen GM2a on the basis of the composite image data received from the information processing device 4.

As described above, in this embodiment, when the orientation of the housing 8 of the mobile terminal 3 has changed from the "landscape orientation" to the "portrait orientation," the overhead image display screen GM2a is displayed on the touch panel 9 in place of the outside-of-vehicle image display screen GM2b. As a result, when the user wants to view the overhead image G1 in place of the outside-of-vehicle image G2, the user can make the overhead image display screen GM2a displayed by performing the simple task of changing the orientation of the housing 8 of the mobile terminal 3 and can view the overhead image G1. In particular, the operation of changing the orientation of the housing 8 of the mobile terminal 3 is an operation that can be accurately performed in a simple manner even when the user is grasping the mobile terminal 3 by one hand, and the convenience for the user is high.

In particular, it is expected that the overhead image G1 is an image that the user is most frequently views while the automatic vehicle movement is being performed. In addition, according to this embodiment, the user can view the overhead image G1 at any appropriate point in time by placing the orientation of the housing 8 of the mobile terminal 3 in the "portrait orientation" and the convenience for the user is high.

Meanwhile, when the orientation of the housing 8 is not placed in the "portrait orientation" (NO in step SC9) and the housing 8 has made either motion of the "rightward motion" or the "leftward motion" (YES in step SC8), the terminal control unit 20 makes the processing procedure proceed to step SC10. Specifically, the terminal control unit 20 makes the processing procedure proceed to step SC10 when the housing 8 has made the "rightward motion" or the "leftward motion" while the orientation of the housing 8 is in the "landscape orientation."

In step SC10, the terminal control unit 20 determines whether the motion of the housing 8 was the "rightward motion" or the "leftward motion."

In the case where the motion of the housing 8 was the "rightward motion" (step SC10: "rightward motion"), the terminal control unit 20 selects one outside-of-vehicle imaging camera from among the outside-of-vehicle imaging cameras in accordance with the first order according to the direction in which the outside-of-vehicle imaging camera performs imaging (step SC11).

As illustrated in FIG. 6, the first order is given as "the front side"→"the front right side"→"the lateral right side"→"the rear right side"→"the rear side"→"the rear left side"→"the lateral left side"→"the front left side"→"the front side." Specifically, the first order is the order according to which the direction in which the outside-of-vehicle imaging camera performs imaging changes clockwise.

In step SC11, the terminal control unit 20 selects, according to the first order, the outside-of-vehicle imaging camera that performs imaging in the direction defined by the order that in next to the direction in which the outside-of-vehicle imaging camera selected prior to the process it step SC11 being performed performs imaging. For example, when the front imaging camera CA1 is selected prior to the process at step SC11 being performed, the terminal control unit 20 selects the front; right-side imaging camera CA2 in accordance with the first order in step SC11. Also, for example, when the rear imaging camera CA5 is selected prior to the process at step SC11 being performed, the terminal control unit 20 selects the rear left-side imaging camera CA6 in accordance with the first order in step SC11.

After having selected the outside-of-vehicle imaging camera in step SC11, the terminal control unit 20 transmits the selected-camera information indicative of the outside-of-vehicle imaging camera that has been selected to the information processing device 4 (step SC12). After the process at step SC12, the terminal control unit 20 makes the processing procedure go back to step SC8.

In response to the transmission of the selected-camera information in step SC12, the information processing device 4 performs the processing of the flowchart FE of FIG. 14B and changes the outside-of-vehicle image G2 displayed on the display device 32 to the image based on the result of the imaging by the outside-of-vehicle imaging camera indicated by the selected-camera information. In response to this, the combined image data transmitted from the information processing device 4 to the mobile terminal 3 will include the outside-of-vehicle image data based on the result of the imaging by the outside-of-vehicle imaging camera indicated by the selected-camera information. As a result, the outside-of-vehicle image G2 displayed on the outside-of-vehicle image display screen GM2b of the touch panel 9 of the mobile terminal 3 will be the image based on the result of the imaging by the outside-of-vehicle imaging camera that has bean selected in step SC11.

As described above, in this embodiment, the user can change the outside-of-vehicle image G2 displayed on the outside-of-vehicle image display screen GM2b by performing a simple task of causing the housing 8 to make a "rightward motion" and the convenience for the user in high. In particular, when the housing 8 has made the "rightward motion," the direction of imaging corresponding to the outside-of-vehicle image G2 displayed on the outside-of-vehicle image display screen GM2b changes clockwise in accordance with the first order. In addition, the "rightward direction" in which the housing 8 moves in the "rightward motion" and the "clockwise" change are linked with each other and, after having caused the housing 8 to make the "rightward motion," the user can intuitively recognize the direction in which the imaging is performed by the outside-of-vehicle imaging camera providing the result of imaging on which the outside-of-vehicle image G2 displayed on the touch panel 9 is based, so that the convenience for the user is high.

Meanwhile, when it has been determined in step SC10 that the motion of the housing 8 was the "leftward motion" (step SC10: "leftward motion"), the terminal control unit 20 performs the following process.

When the motion of the housing 8 was the "leftward motion" (step SC10: "leftward motion"), the terminal control unit 20 selects one outside-of-vehicle imaging camera from among the outside-of-vehicle imaging cameras in accordance with the second order corresponding to the direction in which the outside-of-vehicle imaging camera performs imaging (step SC13).

As illustrated in FIG. 6, the second order is given as "the front side"→"the front left side"→"the lateral left side"→"the rear left side"→"the rear side"→"the rear right side"→"the lateral right side"→"the front right side"→"the front side." Specifically, the second order is the order according to which the direction in which the outside-of-vehicle imaging camera performs imaging changes counter-clockwise.

In step SC13, the terminal control unit 20 selects the outside-of-vehicle imaging camera that performs imaging in the direction of the next place in the order that is next to the direction in which the outside-of-vehicle imaging camera selected prior to the process in step SC13 being performed performs the imaging in accordance with the second order. For example, when the front imaging camera CA1 is selected prior to the process of step SC13 being performed, the terminal control unit 20 selects the front left-side imaging camera CA8 in accordance with the second order in step SC13. Also, for example, when the rear imaging camera CA5 is selected prior to the process of step SC13 being performed, the terminal control unit 20 selects the rear right-side imaging camera CA4 in accordance with the second order in step SC13.

After having selected the outside-of-vehicle imaging camera in step SC13, the terminal control unit 20 transmits the selected-camera information indicative of the outside-of-vehicle imaging camera that has been selected to the information processing devices 4 (step SC14). After the process of step SC14, the terminal control unit 20 makes the processing procedure go back to step SC8.

In response to the transmission of the selected-camera information in step SC14, the information processing device 4 performs the processing of the flowchart FE of FIG. 14B and changes the outside-of-vehicle image G2 displayed on the display device 32 to the image based on the result of the imaging by the outside-of-vehicle imaging camera indicated by the selected-camera information. In response to this, the combined image data transmitted from the information processing device 4 to the mobile terminal 3 will include the outside-of-vehicle image data based on the result of the imaging by the outside-of-vehicle imaging camera indicated by the selected-camera information. As a result, the outside-of-vehicle image G2 displayed on the outside-of-vehicle image display screen GM2b of the touch panel 9 of the mobile terminal 3 will be the image based on the result of the imaging by the outside-of-vehicle imaging camera that has been selected in step SC11.

As described above, in this embodiment, the user can change the outside-of-vehicle image G2 displayed on the outside-of-vehicle image display screen GM2b by performing a simple task of causing the housing 8 to make the "leftward motion" and the convenience for the user is high. In particular, when the housing 8 has made the "leftward motion," the direction of imaging corresponding to the outside-of-vehicle image G2 displayed on the outside-of-vehicle image display screen GM2b changes counterclockwise in accordance with the second order. In addition, the "leftward direction" in which the housing 8 moves in the "leftward motion" and the "counterclockwise" change are linked with each other and, after causing the housing 8 to make the "leftward motion," the user can recognize intuitively the direction in which the imaging is performed by the outside-of-vehicle imaging camera providing the result of imaging on which the outside-of-vehicle image G2 displayed on the touch panel 9 is based, and the convenience for the user is high.

The first mode has been described in the foregoing. In the first mode, in comparison with the second mode which will be described later, it is not necessary for the information processing device 4 to extract the overhead image data and the outside-of-vehicle image data from the composite image data, so that the load on the information processing device 4 is smaller.

<Second Mode>

Figure 16:
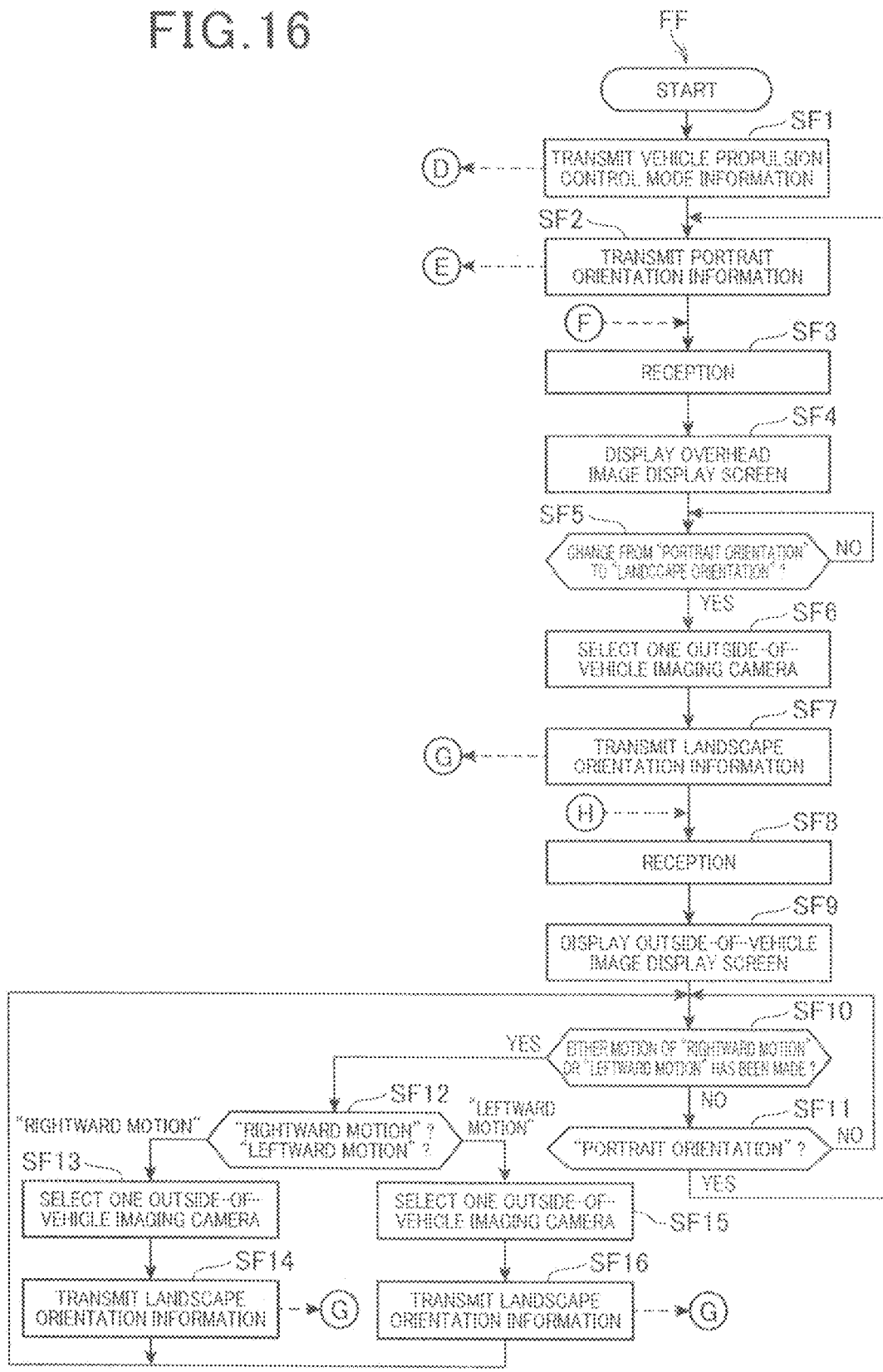
FIG. 16 is a flowchart that illustrates the operation of the mobile terminal.

The flowchart FF of FIG. 16 is a flowchart that illustrates the operation of the mobile terminal 3 when the operation mode is in the second mode. The flowchart FG of FIG. 17A, the flowchart FH of FIG. 17B, and the flowchart FI of FIG. 17C are flowcharts that each illustrates the operation of the information processing device 4 when the operation mode is in the second mode.

As illustrated in the flowchart FF of FIG. 16, the terminal control unit 20 of the mobile terminal 3 controls the terminal communication unit 21 in response to the transition to the vehicle propulsion control mode and transmits, to the information processing device 4, the vehicle propulsion control mode information indicative of the fact that the transition has been made to the vehicle propulsion control mode (step SF1).

Figure 17A:
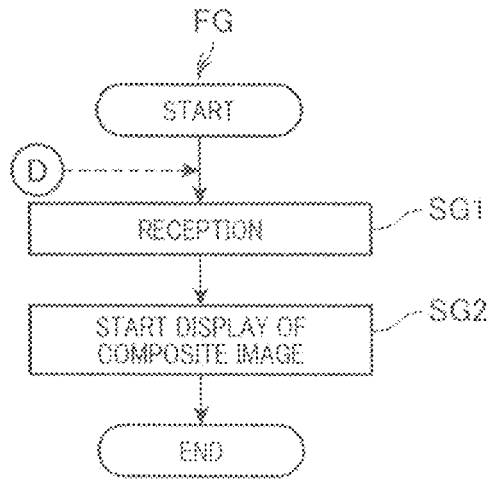
FIG. 17A is a flowchart that illustrates the operation of the information processing device.

As illustrated in the flowchart FG of FIG. 17A, the information processing device control unit 30 of the information processing device 4 receives the vehicle propulsion control mode information (step SG1).

The information processing device control unit 30, in response to the reception of the vehicle propulsion control mode information, starts display of the composite image G on the display device 32 on the basis of the captured image data input from each of the outside-of-vehicle imaging cameras and each of the overhead cameras (step SG2).

As illustrated in the flowchart FF of FIG. 16, the terminal control unit 20 of the mobile terminal 3 transmits, continuously with the transmission of the vehicle propulsion control mode information in step SF1, portrait orientation information indicative of the fact that the orientation of the housing 8 of the mobile terminal 3 is in the "portrait orientation" (step SF2). Note that at the point in time at which the process of step SC3 is performed, the orientation of the housing of the mobile terminal 3 is in the "portrait orientation."

Figure 17B:
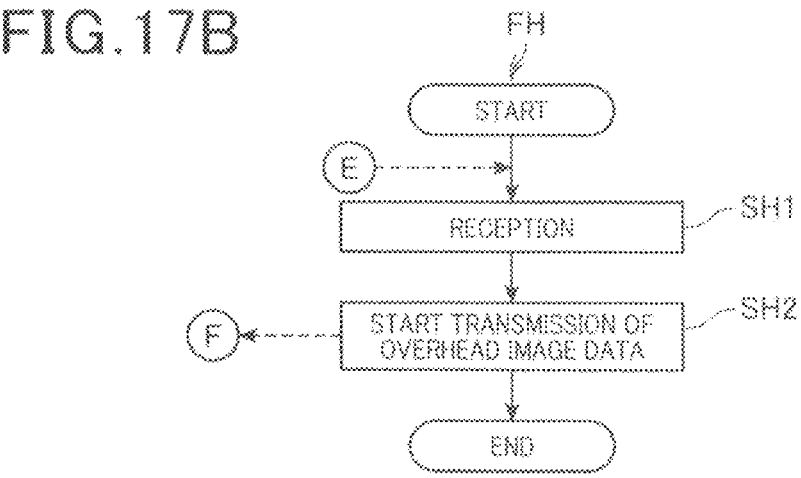
FIG. 17B is a flowchart that illustrates the operation of the information processing device.
Figure 17C:
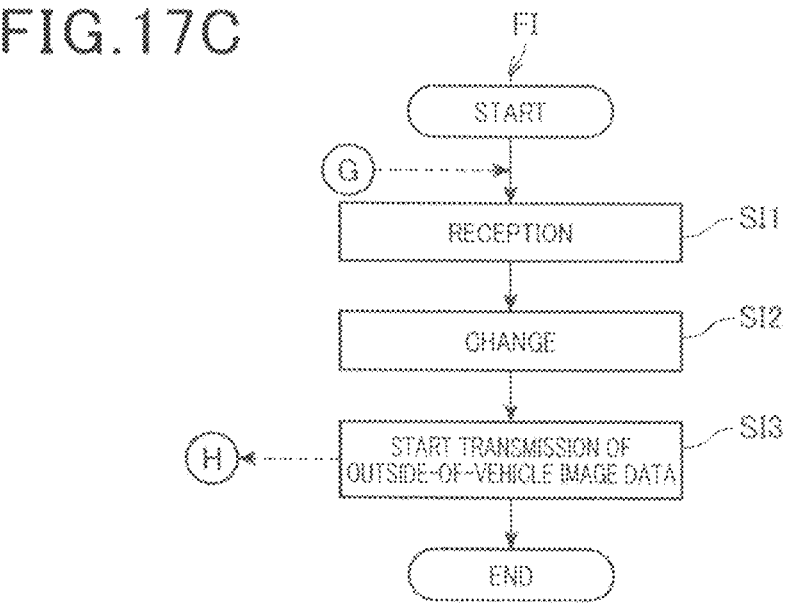
FIG. 17C is a flowchart that illustrates the operation of the information processing device.

As illustrated in the flowchart FH of FIG. 17B, the information processing device control unit 30 of the information processing device 4 receives the portrait orientation information (step SH1).

The information processing device control unit 30 starts transmission of the overhead image data to the mobile terminal 3 in response to the reception of the portrait orientation information (step SH2).

In step SH2, the information processing device control unit 30 extracts the overhead image data from the composite image data generated at the predetermined cycle. Subsequently, the information processing device control unit 30 subjects the extracted overhead image data to image processing in accordance with the resolution and the size of the touch panel 9 of the mobile terminal 3 and transmits the overhead image data that has been subjected to the image processing to the mobile terminal 3. The information processing device control unit 30 performs the transmission of the overhead image data at a cycle corresponding to the cycle in which the composite image data is generated.

Note that, when the outside-of-vehicle image data has been transmitted before the process at step SH2, the terminal, control unit 20 stops transmission of the outside-of-vehicle image data and then starts the transmission of the overhead image data.

As illustrated in the flowchart FF of FIG. 16, the terminal control unit 20 of the mobile terminal 3 starts reception of the overhead image data (step SF3).

Subsequently, terminal control unit 20 causes the touch panel 9 to display the overhead image display screen GM2a on which the overhead image G1 is displayed on the basis of the overhead image data reception of which was started in step SF3 (step SF4).

The content of the overhead image G1 displayed on the overhead image display screen GM2a changes at any time on the basis of the result of imaging of the overhead camera in synchronization with the overhead image G1 displayed on the display device 32 of the information processing device 4.

After hawing displayed the overhead image display screen GM2a, the terminal control unit 20 monitors, on the basis of the input from the housing state detection unit 23, whether or not the orientation of the housing 8 of the mobile terminal 3 has changed from the "portrait orientation" to the "landscape orientation" (step SF5).

In a case where it has been detected that the orientation of the housing 8 of the mobile terminal 3 changed from the "portrait orientation" to the "landscape orientation" (YES in step SF5), the terminal control unit 20 selects one outside-of-vehicle imaging camera from among the outside-of-vehicle imaging cameras in accordance with the predetermined order of priority corresponding to the state of the vehicle S (step SF6). The predetermined order of priority is, for example, the order of priority that has been illustrated by way of example in relation to the first mode.

Subsequently, the terminal control unit 20 transmits, to the information processing device 4, landscape orientation information including the information indicative of the fact that the orientation of the mobile terminal 3 is in the "landscape orientation" and the information indicative of the outside-of-vehicle imaging camera that has been selected in step SF6 (step SF7).

As illustrated in the flowchart FI of FIG. 17C, the information processing device control unit 30 of the information processing device 4 receives the landscape orientation information (step SI1).

In response to the reception of the landscape orientation information, the information processing device control unit 30 changes the outside-of-vehicle image G2 that the display device 32 is made to display to the image based on the result of the imaging by the outside-of-vehicle imaging camera indicated by the selected-camera information included in the landscape orientation information that has been received in step SI1 (step SI2).

Subsequently, the information processing device control unit 30 stops transmission of the overhead image data to the mobile terminal 3 and starts transmission of the outside-of-vehicle image data (step SI3).

In step SI3, the information processing device control unit 30 extracts the outside-of-vehicle image data from the composite image data generated at the predetermined cycle. Subsequently, the information processing device control unit 30 subjects the outside-of-vehicle image data that has been extracted to image processing according to the resolution and the size of the touch panel 9 of the mobile terminal 3 and transmits the outside-of-vehicle image data that has been subjected to the image processing to the mobile terminal 3. The information processing device control unit 30 performs the transmission at the outside-of-vehicle image data at a cycle corresponding to the cycle at which the composite image data is generated.

As illustrated in the flowchart FF of FIG. 16, the terminal control unit 20 of the mobile terminal 3 starts the reception of the outside-of-vehicle image data (step (SF8). Subsequently, the terminal control unit 20 causes the touch panel 9 to display outside-of-vehicle image display screen GM2b on which the outside-of-vehicle image G2 is displayed on the basis of the outside-of-vehicle image data the reception of which was started in step SF8 (step SF9).

The content of the outside-of-vehicle image G2 displayed on the outside-of-vehicle image display screen GM2b changes at any time on the basis of the result of imaging of the overhead camera in synchronization with the outside-of-vehicle image G2 displayed on the display device 32 of the information processing device 4.

As a result of the process at step SF9, in response to the orientation of the housing 8 of the mobile terminal 3 changing from the "portrait orientation" to the "landscape orientation," the outside-of-vehicle image display screen GM2b is displayed in place of the overhead image display screen GM2a. The effect resulting from this fact has been described in the explanation of the first mode.

After having displayed the outside-of-vehicle image display screen GM2b in step SF9, the terminal control unit 20 monitors whether the housing 8 has made either motion of the "rightward motion" or the "leftward motion" (step SF10) and monitors whether or not the orientation of the housing 8 has been placed in the "portrait orientation" (step SF11).

In the case where the housing 8 makes neither motion of the "rightward motion" nor the "leftward motion" (NO in step SF10) and the orientation of the housing 8 has been placed in the "portrait orientation" (YES in step SF11), the terminal control unit 20 makes the processing procedure proceed to step SF2. As a result, when the orientation of the housing 8 of the mobile terminal 3 has changed from the "landscape orientation" to the "portrait orientation," the overhead image display screen GM2a is displayed on the touch panel 9 in place of the outside-of-vehicle image display screen GM2b. The effect of this fact has been described in the explanation of the first mode.

Meanwhile, when the orientation of the housing 8 is not placed in the "portrait orientation" (NO in step SF11) and the housing 8 has made either of the "rightward motion" or the "leftward motion" (YES in step SF10), the terminal control unit 20 makes the processing procedure proceed to step SC10. That is, the terminal control unit 20 makes the processing procedure proceed to step SF12 when the housing 8 has made the "rightward motion" or the "leftward motion" when the orientation of the housing 8 is in the "landscape orientation."

In step SF12, the terminal control unit 20 determines whether the motion of the housing 8 was the "rightward motion" of the "leftward motion." In the case where the motion of the housing 8 was the "rightward motion" (step SF12: "rightward motion"), the terminal control unit 20 selects one outside-of-vehicle imaging camera from among the outside-of-vehicle imaging cameras in accordance with the first order corresponding to the direction in which the outside-of-vehicle imaging camera performs imaging (step SF13).

Subsequently, the terminal control unit 20 transmits, to the information processing device 4, the landscape orientation information including the information indicative of the fact that the orientation of the mobile terminal 3 is in the "landscape orientation" and the information indicative of the outside-of-vehicle imaging camera selected in step SF13 (step SF14). After the process at step SF14, the terminal control unit 20 makes the processing procedure proceed to step SF10.

In response to the transmission of the landscape orientation information in step SF14, the information processing device 4 performs the processing of the flowchart FI of FIG. 17C and changes the outside-of-vehicle image G2 to be displayed on the display device 32 to the image based on the result of the imaging by the outside-of-vehicle imaging camera indicated by the selected-camera information that the landscape orientation information includes. Further, the information processing device 4 starts transmission of the outside-of-vehicle image data based on the result of the imaging by the outside-of-vehicle imaging camera indicated by the selected-camera information to the mobile terminal 3. As a result, the outside-of-vehicle image G2 displayed on the outside-of-vehicle image display screen GM2b of the touch panel 9 of the mobile terminal 3 becomes the image based on the result of the imaging by the outside-of-vehicle imaging camera that has been selected in step SF13.

Meanwhile, in step SF12, when the motion of the housing 8 was the "leftward motion" ("leftward motion" in step SF12), the terminal control unit 20 selects one outside-of-vehicle imaging camera from among the outside-of-vehicle imaging cameras in accordance with the second order corresponding to the direction in which the outside-of-vehicle imaging camera performs imaging (step SF15).

Subsequently, the terminal control unit 20 transmits, to the information processing device 4, the landscape orientation information including the information indicative of the fact that the orientation of the mobile terminal 3 is in the "landscape orientation" and the information indicative of the outside-of-vehicle imaging camera selected in step SF15 (step SF16). After the process at step SF16, the terminal control unit 20 makes the processing procedure proceed to step SF10.

In response to the transmission of the landscape orientation information in step SF16, the information processing device 4 performs the processing of the flowchart FI of FIG. 17C and changes the outside-of-vehicle image G2 to be displayed on the display device 32 to the image based on the result of the imaging by the outside-of-vehicle imaging camera indicated by the selected-camera information that the landscape orientation information includes. Further, the information processing device 4 starts transmission of the outside-of-vehicle image data based on the result at the imaging by the outside-of-vehicle imaging camera indicated by the selected-camera information to the mobile terminal 3. As a result, the outside-of-vehicle image G2 displayed on the outside-of-vehicle image display screen GM2b of the touch panel 9 of the mobile terminal 3 becomes the image based on the result of the imaging by the outside-of-vehicle imaging camera that has been selected in step SF16.

The second mode has been described in the foregoing. In the second mode, in comparison with the above-described first mode, the data amount of the data that the information processing device 4 transmits to the mobile terminal 3 is smaller and the communication efficiency is higher.

Next, with regard to the process associated with the display on the touch panel 9 in the vehicle propulsion control processing, another process performed by the mobile terminal 3 will be described.

As described above, after the transition has been made to the vehicle propulsion control mode, the vehicle control screen GM2 (the overhead image display screen GM2a or the outside-of-vehicle image display screen GM2b) is displayed on the touch panel 9 of the mobile terminal 3. In addition, the propulsion control button QB is displayed on the vehicle control screen GM2. As described above, the propulsion control button QB is a button for controlling the propulsion of the vehicle S and the vehicle S is propelled along the path while the touch operation is being performed on the button, and the propulsion of the vehicle S is stopped while the touch operation is not performed on the button.

In addition, when the position of the touch operation is moved in a state where the touch panel 9 is placed in contact after the touch operation has been made on the propulsion control button QB displayed on the vehicle control screen GM2, the terminal control unit 20 moves the position of the propulsion control button QB following the movement of the position of the touch operation. As a result, the state where the touch operation is performed on the propulsion control button QB is maintained even when the position of the touch operation is moved in a state where the touch panel 9 is contacted after the touch operation has been made on the propulsion control button QB.

As described above, the state J4 of FIG. 12 illustrates the vehicle control screen GM2 immediately after the screen displayed on the touch panel 9 has changed from the lock screen GM1 to this vehicle control screen GM2. The state J5 of FIG. 12 illustrates the vehicle control screen GM2 after the position of the touch operation has been moved from the position of the touch operation of the state J4. As illustrated in the state J5 of FIG. 12, in response to the movement of the touch position, the position of the propulsion control button QB moves following the touch position, and the state where the touch operation is performed on the propulsion control button QB is maintained.

The state J6 of FIG. 12 illustrates how the orientation of the mobile terminal 3 is taken out of the state J5 and placed in the landscape orientation and the outside-of-vehicle image display screen GM2*b* is displayed on the touch panel 9 in place of the overhead image display screen GM2*a* displayed at the time of the state J5. At the time of transition from the state J5 to the state J6, it is assumed that the user maintains the state where the finger that performed the touch operation on the propulsion control button QB in the state J5 is in contact with the touch panel 9. As illustrated in the states J5 and J6, the terminal control unit 20 also maintains the state where the propulsion control button QB is displayed when having changed the screen to be displayed on the touch panel 9 from the overhead image display screen GM2*a* to the outside-of-vehicle image display screen GM2*b*, moves the position of the propulsion control button QB following the movement of the position of the touch operation, and maintains the state where the touch operation is performed on the propulsion control button QB.

At the time of display on the vehicle control screen GM2, the above-described processing is performed by the terminal control unit 20, so that the following effect is obtained.

Specifically, even when the position of the finger performing the touch operation is displaced after the user has performed the touch operation on the propulsion control button QB, the state where the touch operation is performed on the propulsion control button QB is maintained. As a result, the user does not need to continue the touch operation in a pinpoint manner on the particular position when operating the propulsion control button QB, and the convenience for the user is high. IN particular, as described above, in this embodiment, while the automatic vehicle movement is being performed, the user in some cases may change the orientation of the housing 8 of the mobile terminal 3. In addition, even when the position where the touch operation is performed is displaced in response to the change in the orientation of the housing 8, the state where the touch operation is performed on the propulsion control button QB is maintained and the convenience for the user is high. Note that, when the housing 8 is grasped by one hand and the touch panel 9 is operated by one hand, it is expected that the position where the touch operation is made is likely to be displaced, so that the above-described processing is more effective when the user grasps the housing 8 by one hand and operates the touch panel 9 by one hand.

Also, when the touch operation on the propulsion control button QB has been ended, the terminal control unit 20 continuously displays the propulsion control button QB on the position of the propulsion control button QB at the time of the ending of the touch operation. According to this feature, when the user performs the touch operation on the propulsion control button QB again, the user has only to perform the touch operation at the position at the time of ending of the touch operation and the convenience for the user is high.

Note that when the touch operation on the propulsion control button QB has been ended, the terminal control unit 20 may perform the following processing in place of the above-described processing. Specifically, when the touch operation on the propulsion control button QB has been ended, the propulsion control button QB may be displayed at a predetermined specific position. The predetermined specific position is, for example, a position that corresponds to the right end BR1*b* of the slide bar BR1 on the lock screen GM1. According to this feature, when the touch operation on the propulsion control button QB has been ended, the propulsion control button QB will be displayed at the same position, so that the user can readily locate the position of the propulsion control button QB and the convenience for the user is improved.

Also, the terminal control unit 20 changes the image indicative of the propulsion control button QB between when the touch operation is performed on the propulsion control button QB and when the touch operation is not made thereon.

The propulsion control button QB In the states J4 to J6 of FIG. 12 is in a state where the touch operation is made thereon, and the propulsion control notion QB in the state J7 of FIG. 12 is in a state where the touch operation is not made thereon.

As illustrated in the states J4 to J6, when the touch operation is performed on the propulsion control button QB, the image indicative of the propulsion control button QB is composed of a circular image and an annular image surrounding the circular image. The annular image may be an image whose appearance changes with the passage of time by animation. Meanwhile, as illustrated in the state J7, when the touch operation is not made on the propulsion control button QB, the image indicative of the propulsion control button QB is a circular image and does not include an annular image.

The user can accurately recognize in a simplified manner the fact that the touch operation is being performed on the propulsion control button QB and the fact that the touch operation is not being made thereon by viewing the image indicative of the propulsion control button QB.

Also, when the overhead image display screen GM2*a* is displayed as illustrated in the states J4 and J5 of FIG. 12, the terminal control unit 20 displays a mark indicative of the state of the gear of the vehicle S in a superposed manner on the image representing the vehicle S. In this embodiment, when the state of the gear of the vehicle S is in the parking (P), the terminal control unit 20 displays a mark representing the character "P" An a superposed manner on the image representing the vehicle S, displays a mark representing the character "R" in a superposed manner on the image representing the vehicle S in the case of the reverse (R), displays a mark representing character "D" in a superposed manner on the image representing the vehicle S in the case of the drive (D), displays a mark representing character "N" in a superposed manner on the image representing the vehicle S in the case of the neutral (N), and displays a mark representing character "L" in a superposed manner on the image representing the vehicle S in the case of the low (L). The terminal control unit 20 communicates with the information processing device 4 and recognizes the state of the gear of the vehicle S.

The user can accurately recognize the state of the gear of the vehicle S by referring to the mark displayed in a superposed manner on the image representing the vehicle S.

As illustrated in FIG. 9, by the automatic vehicle driving, the vehicle S moves to the parking position and stops in the parking position, and thereby the vehicle propulsion control processing of the flowchart FA and the vehicle propulsion control processing of flowchart FB are completed. In the case where the vehicle S has stopped at the vehicle position, this fact is notified to the user by a predetermined method. The user who is outside the vehicle can leave the vicinity of the vehicle S by using the above-described dedicated remote controller and to turn off the engine and to lock the door.

Note that, in the first and second modes, the composite image data, the overhead image data, and the outside-of-vehicle image data that the information processing device 4 transmits to the mobile terminal 3 each correspond to the "imaging data based on the result of imaging of the camera provided in the vehicle S."

<Case Where the Vehicle S Should Perform the Exit>

Next, the case where the vehicle S should perform the exit will be described.

Figure 18:
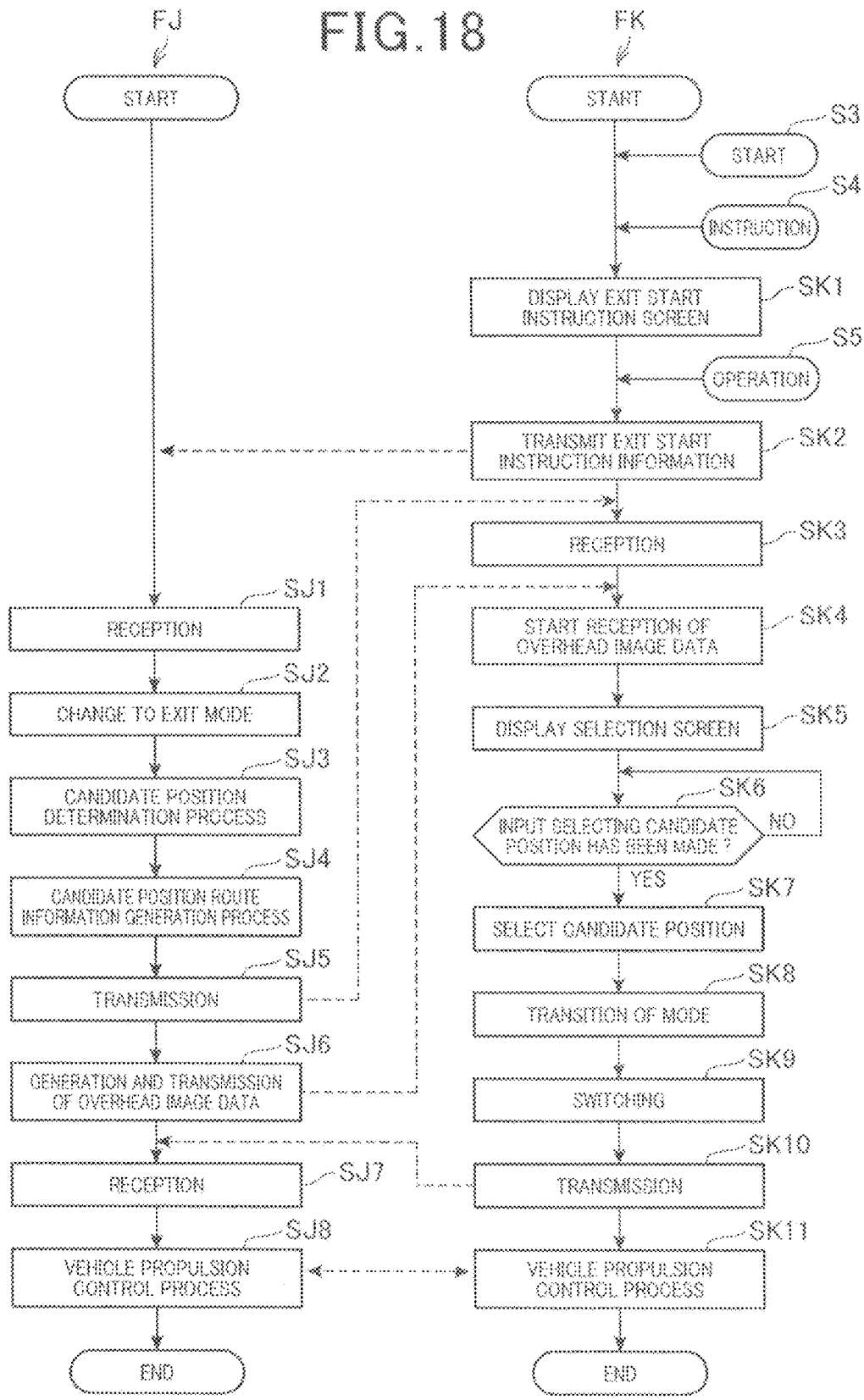
FIG. 18 a flowchart that illustrates the operation of the individual devices of the information processing system.

The flowchart FJ of FIG. 18 is a flowchart that illustrates the operation of the information processing device 4 and the flowchart FK is a flowchart that illustrates the operation of the mobile terminal 3. Hereinafter, the operations of the information processing device 4 and the mobile terminal 3 will be described by way of example based on a case where the vehicle S should perform the exit from the parking position corresponding to the one parking area of the parking space.

When performing the exit by the automatic vehicle movement, the user goes the vicinity of the parking position. Note that the user may be on board the vehicle S but, for the sake of explanation, in the following description, the explanations will be given on the assumption that the user gets off the vehicle S.

Subsequently, the user operates the above-described dedicated remote controller and operates the engine switch to turn on the engine of the vehicle S. In response to the operation of the engine switch to turn on the engine of the vehicle S, power is supplied from an accessory power supply to the information processing device 4, and the information processing device 4 is turned on.

Subsequently, the user operates the touch panel 9 of the mobile terminal 3 to start up the dedicated application AP (step S3). Note that the user, at the time of starting the dedicated application AP, places the orientation of the housing 8 of the mobile terminal 3 in the "portrait orientation."

The terminal control unit 20 of the mobile terminal 3 performs the processing of the flowchart FK by the function of the dedicated application AP that has been started up by the user in step S3.

Further, the user performs a predetermined operation on the touch panel 9 and issues an instruction to cause the touch panel 9 to display the exit start instruction screen (step S4).

As illustrated in the flowchart FK of FIG. 18, in response to the instruction of step S4, the terminal control unit 20 causes the touch panel 9 to display the exit start instruction screen (step SK1).

The exit start instruction screen is a screen on which an instruction to perform the exit by the automatic vehicle movement can be entered, and the touch operation button on which the touch operation is to be performed when the instruction is to be issued. In the case where the user performs the exit by the automatic vehicle movement, the user operates the touch operation button displayed on the exit start instruction screen (step S5).

When it has been detected that the touch operation button of the exit start instruction button was operated by the user, the terminal control unit 20 transmits the exit start instruction information to the information processing device 4 (step SK2).

As illustrated in the flowchart FJ of FIG. 18, the information processing device control unit 30 of the information processing device 4 receives the exit start instruction information (step SJ1).

Subsequently, the information processing device control unit 30 changes thy operation mode of the information processing device 4 to the exit mode in response to the reception of the exit start instruction information (step SJ2).

In response to the transition of the operation mode to the exit mode, the information processing device control unit 30 performs the candidate position determination process (step SJ3).

The candidate position determination process is a process of determining one or more positions in which the vehicle S moving from the parking position can stop. The one or more positions determined in the candidate position determination process are candidates of the positions in which the vehicle S upon the exit should be stopped. Hereinafter, each of the positions determined in the candidate position determination process will be expressed as a "candidate position."

In the candidate position determination process in step SJ3, the information processing device control unit 30 performs the same process as the above-described parking position determination process and determines the one or more candidate positions. In the candidate position determination process, the method of determining the candidate position may be any method.

After having determined the one or more candidate positions in step SJ3, the information processing device control unit 30 performs a candidate position route information generation process (step SJ4).

The candidate position route information generation process is a process of generating automatic driving route information that includes the path information indicative of the path from the parking position to the candidate position that has been determined in a step SJ3. Hereinafter, the automatic driving route information that includes the path information indicative of the path from the parking position to the candidate position is referred to as "candidate position route information." When the information processing device control unit 30 has determined the multiple candidate positions in the candidate position determination process in step SJ3, the information processing device control unit 30 generates, in step SJ4, a plurality of pieces of the candidate position route information that correspond to the multiple candidate positions.

Subsequently, the information processing device control unit 30 transmits each of the pieces of the candidate position route information generated in step SJ4 to the mobile terminal 3 (step SJ5).

Further, the information processing device control unit 30 generates the overhead image data based on the input from the overhead camera and starts the transmission of the overhead image data to the mobile terminal 3 (step SJ6). The information processing device control unit 30 performs, on the basis of the captured image data input from the overhead camera at a predetermined cycle, the generation and transmission of the overhead image data at a cycle corresponding to the predetermined cycle.

As illustrated in the flowchart FK of FIG. 18, the terminal control unit 20 of the mobile terminal 3 receives the one or more pieces of the candidate positon route information that have been transmitted by the information processing device 4 in step SJ5 (step SK3). Also, the terminal control unit 20 starts reception of the overhead image data (step SK4).

Subsequently, the terminal control unit 20 causes the touch panel 9 to display the selection screen GM3 on the basis of each of the pieces of the candidate position route information that have been received in step SK3 and the overhead image data reception of which has been started in step SK4 (step SK5).

After having displayed the selection screen GM3, the terminal control unit 20 monitors whether or not an input causing selection of the candidate position has been made on the selection screen GM3 (step SK6). Hereinafter, the content of the selection screen GM3 and the processing of step SK6 will be described in detail.

Figure 19:
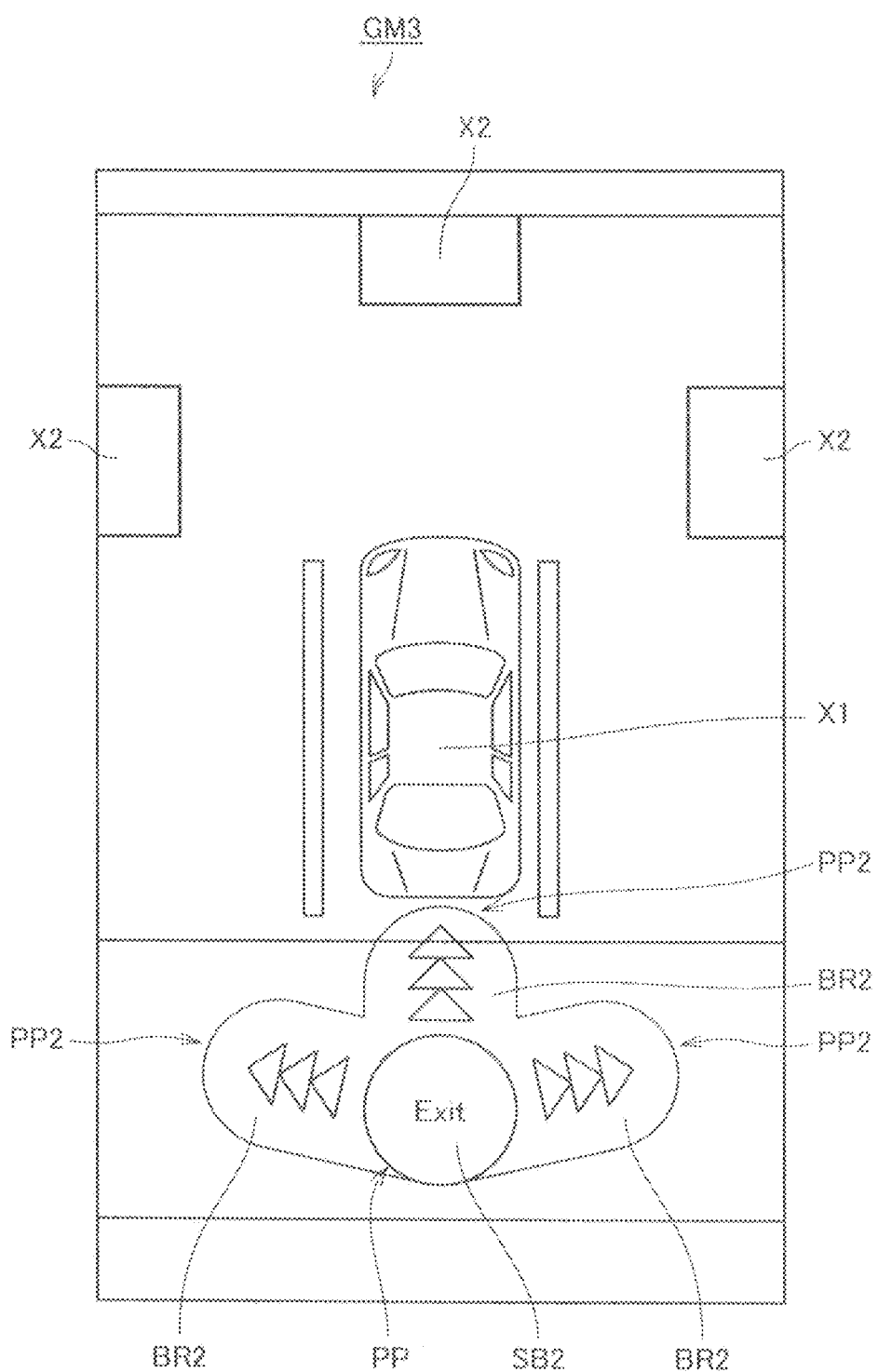
FIG. 19 is a diagram that illustrates a selection screen.

FIG. 19 is a diagram that illustrates an example of the selection screen GM3.

The selection screen GM3 is a screen for the user to perform the input causing selection of one candidate position from among the candidate positions. As illustrated in FIG. 19, the overhand image G1 is displayed on the selection screen GM3. The terminal control unit 20 displays the overhead image G1 on the basis of the overhead image data received from the information processing device 4. A current position image X1 indicative of the vehicle S is displayed at the central portion of the overhead image G1 displayed on the selection screen GM3. The current position image X1 is an image that indicates the current position of the vehicle S.

As illustrated in FIG. 19, a candidate position image X2 is displayed on the selection screen GM3. The candidate position image X2 is an image that indicates the candidate position (a candidate of a position in which the vehicle S upon the exit is to be stopped). A plurality of the candidate position images X2 will be displayed when a plurality of the candidate positions exist (when a plurality of pieces of the candidate position route information have been received).

On the selection screen GM3 illustrated by way of example in FIG. 19, the candidate position image X2 is an image of a rectangular frame. Note that the shape of the candidate position image X2 is not limited to the shape illustrated in FIG. 19.

The candidate position image X2 is displayed on the selection screen GM3 at a position that corresponds to the actual candidate position in the real space. Accordingly, the positional relationship between the current position image X1 on the selection screen GM3 and the candidate position image X2 will be in a state where it corresponds to the positional relationship between the current position of the vehicle S and the candidate position in the real space.

The terminal control unit 20 displays, on the basis of the candidate position route information, the one or more candidate position images X2 in a superposed manner on the overhead image G1. The user can accurately recognize the positional relationship between the vehicle S and the candidate position on the basis of the candidate position image X2 displayed on the selection screen GM3.

As illustrated in FIG. 19, on the selection screen GM3, a slide unit SU2 is displayed below the current position image X1. The slide unit SU2 has one or more slide bars BR2 and one slide button SB2.

The number of the slide bars BR2 displayed on the selection screen GM3 is identical with the number of the candidate position images X2. As illustrated in FIG. 19, each of the slide bars BR2 is a strip-like object that extends from the same proximal end PP1 as the starting point residing below the current position image X1 toward each of the candidate position images X2. For example, as illustrated by way of example in FIG. 19, it is assumed here that, three candidate position images X2, i.e., a first image, a second image, and a third image are displayed on the selection screen GM3, as the candidate position images X2.

In this case, "three" slide bars BR2 are displayed on the selection screen GM3. If the three slide bars BR2 are expressed as a first bar, a second bar, and a third bar, respectively, then the first bar is a strip-like object that extends from the proximal end PP1 toward the first image, the second bar is a strip-like object that extends from the proximal end PP1 toward the second image, and the third bar is a strip-like object that extends from the proximal end PP1 toward the third image.

The slide button SB2 is a touch operation button and can be moved along the slide bar BR2 (all the slide bars BR2 when a plurality of slide bars BR2 are displayed) in accordance with the swipe operation of the user. As illustrated in FIG. 19, when the touch operation is not being performed by the user, the slide button SB2 is maintained in a state where it is positioned at the proximal end PP1. The slide button SB2 is movable within the range from the proximal end PP1 to the distal end PP2 of the slide bar BR2.

Figure 20:
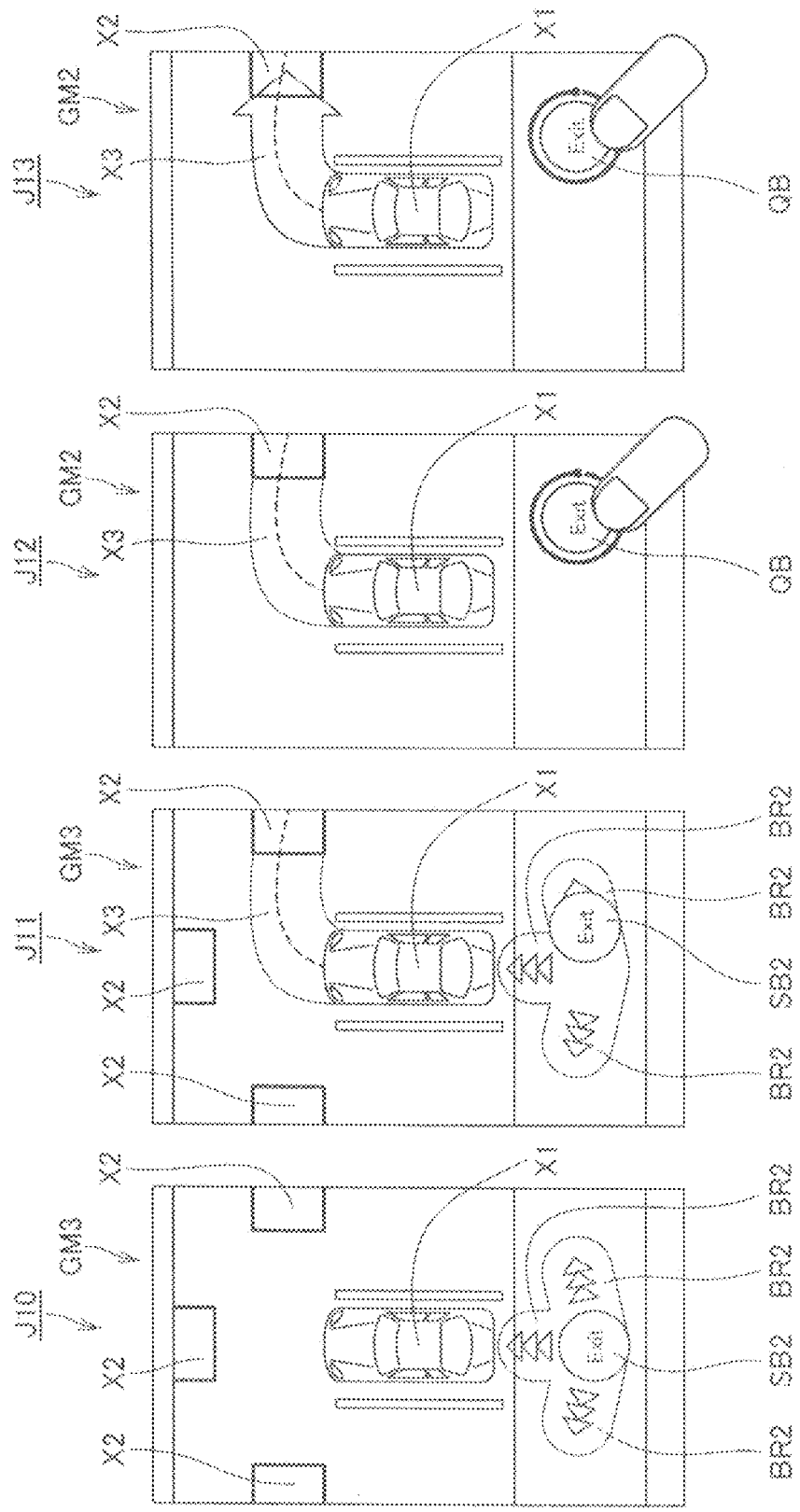
FIG. 20 is a diagram used in an explanation of a screen displayed on the touch panel.

FIG. 20 is a diagram that illustrates the transition of the screen displayed on the touch panel 9. In FIG. 20, a part of the finger operating the screen is illustrated, as appropriate, along with the screen displayed on the touch panel 9.

The state J10 of FIG. 20 illustrates the selection screen GM3 in a state where the user does not perform the touch operation. As described above, the selection screen GM3 is a screen on which the user performs the input causing the selection of one candidate position from the candidate positions. In the case where the input causing the selection of the candidate position should be performed, the user performs the touch operation by his/her finger on the slide button SB2 positioned at the proximal end PP1 on the selection screen GM3 in the state J10.

Subsequently, the user causes, by the swipe operation, the slide button SB2 to move along the slide bar BR2 extending toward the candidate position image X2 of the candidate position in which the user wants to stop the vehicle S upon the exit out of the slide bars BR2. In response to the swipe operation, the terminal control unit 20 causes the slide button SB2 to move along the slide bar BR2 following the position in contact with the finger. The state J11 of FIG. 20 illustrates the selection screen GM3 in a state where the slide button SB2 has been moved by the swipe operation along the slide bar BR2.

As illustrated in the state J11 of FIG. 20, in response to the swipe operation, the path image X3 indicative of the path through which the vehicle S passes when the vehicle S moves from the parking position to the candidate position is displayed on the selection screen GM3. The path image X3 is a strip-like image that interconnects the current position image X1 and the candidate position image X2 along the path when the vehicle S moves to the candidates position, and has a width that corresponds to the width of the vehicle S.

The terminal control unit 20 displays, on the basis of the candidate position route information, one or more path images X3 in a superposed manner on the overhead image G1. The user can accurately recognize the path (route) when the vehicle S moved to the candidate position by the automatic vehicle movement on the basis of the path image X3 displayed on the selection screen GM3.

The user who performs the swipe operation makes the slide button SB2 move to the distal end PP2 of the slide bar BR2 and maintained a state where the slide button SB2 is positioned at the distal end PP2 for a predetermined period of time (for example, three seconds). As a result, the input causing the selection of the candidate position is completed.

Note that, when the swipe operation in ended before the input causing the selection of the candidate position is completed, the terminal control unit 20 causes the slide button SB2 to move to the proximal end PP1 in response to the ending of the swipe operation.

In step SK6, the terminal control unit 20 monitors, on the basis of the input from the touch panel 9, whether or not the slide button SB2 has been positioned at the distal end PP2 of the slide bar BR2 for a predetermined period of time. In addition, when the slide button SB2 has been positioned at the distal end PP2 of the slide bar BR2 for the predetermined period end of time, the terminal control unit 20 determines that the input causing the selection of the candidate position has been made.

When it has been determined in step SK6 that the input causing the selection of the candidate position was made (YES in step SK6), the terminal control unit 20 determines the candidate position of the candidate position image X2 corresponding to the slide bar BR2 at the distal end PP2 of which the slide button SB2 was positioned for the predetermined period of time as the position in which the vehicle S is stopped after the exit (step SK7).

As has been described in the foregoing, in this embodiment, the user can determine the candidate position in which the user wants to stop the vehicle S after the exit from among the candidate positions by a simple task of moving the slide button SB2 along the desired slide bar BR2. As a result, the convenience for the user is high. In particular, since the configuration is such that each of the slide bars BR2 extends toward each of the candidate position images X2, the user can intuitively recognize which slide bar BR2 is in a correspondence relationship with which candidate position image X2.

Also, in this embodiment, the input is completed only after the slide button SB2 has been positioned at the distal end PP2 of the slide bar BR2 for the predetermined period of time. By virtue of this feature, the candidate position is prevented from being selected against the intention of the user because of the finger of the user accidentally touching the touch panel 9.

After having determined the position in which the vehicle S should be stopped in step SK7, the terminal control unit 20 causes the operation mode to make a transition to the vehicle propulsion control mode (step SK8).

In response to the transition of the operation mode, the terminal control unit 20 changes the screen displayed in the touch panel 9 from the selection screen GM3 to the vehicle control screen GM2 (step SK9).

The state J12 of FIG. 20 illustrates the vehicle control screen GM2 immediately after the screen displayed on the touch panel 9 has changed from the selection screen GM3 to the vehicle control screen GM2. Note that, immediately after the screen has changed to the vehicle control screen GM2, the orientation of the housing 8 of the mobile terminal 3 is in the "portrait orientation."

The vehicle control screen GM2 displayed at the time of the exit is the same as the vehicle control screen GM2 displayed at the time of the parking. When the screen should be changed from the selection screen GM3 to the vehicle control screen GM2, the terminal control unit 20 changes the slide button SB2 on the selection screen GM3 to the propulsion control button QB (operation button). Specifically, in accordance with the switching of the screens, the terminal control unit 20 causes the slide button SB2 positioned at the distal end PP2 of the slide bar BR2 to function as the propulsion control button QB in response to the change of the screen without changing the position instead of additionally displaying the propulsion control button QB as a button different than the slide button SB2. Accordingly, immediately after than screen has been changed, the propulsion control button QB is positioned at the distal end PP2 of the slide bar BR2 on selection screen GM3 and the propulsion control button QB is in a state where the touch operation is made thereon by the user.

Note that, in place of the state J12 of FIG. 20, the vehicle control screen GM2 illustrated in the state J13 of FIG. 20 may be displayed. On the vehicle control screen GM2 illustrated in the state J13, the path image X3 that extends from the parking position of the vehicle S toward the selected candidate position is in the form of an arrow explicitly indicating the direction of travel. By displaying the vehicle control screen GM2 in the manner illustrated in the state J13, the user can accurately recognize the direction of travel of the vehicle S after exit from the parking position.

In response to the transition to the vehicle propulsion control mode, the terminal control unit 20 transmits the information indicative of the candidate position determined in step SK7 to the information processing device 4 (step SK10). As illustrated in the flowchart FJ of FIG. 19, the information processing device control unit 30 of the information processing device 4 receives the information indicative of the candidate position (step SJ7).

As illustrated in the flowcharts FJ and FK of FIG. 18, after the operation mode of the mobile terminal 3 has made a transition to the vehicle propulsion control mode, the information processing device control unit 30 of the information processing device 4 and the terminal control unit 20 of the mobile terminal 3 performs the vehicle propulsion control processing in cooperation (steps SJ8 and SK11).

In the vehicle propulsion control processing at the time of the exit, the same processing as the vehicle propulsion control processing at the time of the parking is performed. Note that the information processing device control unit 30 outputs the automatic driving route information corresponding to the candidate position indicated by the information received in step SJ7 to the vehicle drive control device 5.

By the automatic vehicle driving, the vehicle S moves from the parking position to the selected candidate position (after-exit stop position) and stops at the selected candidate position, and thus the vehicle propulsion control processing of the flowchart FJ and the vehicle propulsion control processing of the flowchart FK are completed. When the vehicle S stops at the selected candidate position, the user is notified of this fact by a pre-determined method. The user who is outside of the vehicle can get on the vehicle S by using the above-described dedicated remote controller to unlock the door.

In the meantime, the exit pattern has multiple patterns depending on the state of the vehicle S to be parked in the parking position.

The terminal control unit 20 changes, in accordance with the exit pattern, the mode of display of the candidate position image X2 and the slide unit SU2 on the selection screen GM3. For example, the terminal control unit 20 changes the mode of display of the candidate position image X2 and the slide unit SU2 on the selection screen GM3 by the following method in accordance with the exit pattern. Specifically, in advance, the image data for displaying the candidate position image X2 and the slide unit SU2 is stored in the terminal storage unit 22 for each exit pattern in a mode corresponding to the exit pattern.

In addition, the terminal control unit 20 identifies the exit pattern at the time of causing the touch panel 9 to display the selection screen GM3, reads the image data corresponding to the exit pattern that has been identified from the terminal storage unit 22, subjects the image data to processing as required, and displays the selection screes GM3 using the image data that has been processed. According to this feature, since it is made possible to display the selection screen GM3 using the image data prepared in advance, the processing efficiency can be improved. As the exit pattern, for example, the following first to sixth patterns exist.

The first pattern is such a pattern that the vehicle S makes the exit by "moving forward" and three candidate positions in which the vehicle S can be stopped after the exit exist including the position on the front side of the vehicle S, the position on the front right side of the vehicle S, and the position on the front left side of the vehicle S. For example, the exit pattern when the vehicle S is in the state where it is parked in the parking position having a large space on the front side becomes the first pattern.

The selection screen GM3 illustrated by way of example in FIGS. 19 and 20 is the selection screen GM3 that corresponds to the first pattern.

The second pattern is such a pattern that the vehicle S makes the exit by "moving backward" and three candidate positions in which the vehicle S can be stopped after the exit exist including the position on the rear side of the vehicle S, the position on the rear right side of the vehicle S, and the position on the rear left side of the vehicle S. For example, the exit pattern when the vehicle S is in the state where it is parked in the parking position having a large space on the rear side becomes the second pattern.

Figure 21:
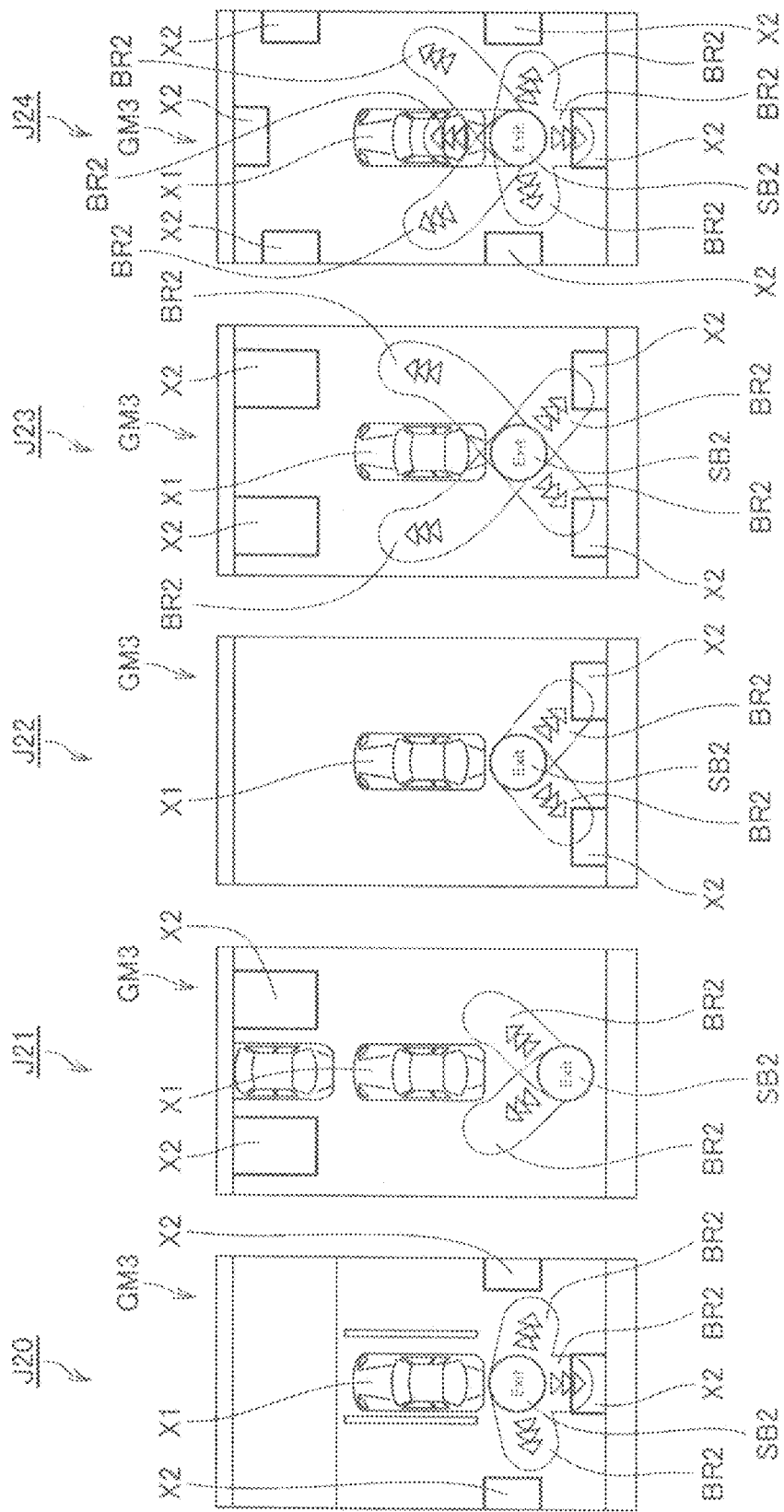
FIG. 21 is a diagram used in an explanation of a screen displayed on the touch panel.

The state J20 of FIG. 21 illustrates the selection screen GM3 that corresponds to the second pattern.

The third pattern is such a pattern that the vehicle S makes the exit by "moving forward" and two candidate positions in which the vehicle S can be stopped after the exit exists including the position on the front right side of the vehicle S and the position on the front left side of the vehicle S. For example, the exit pattern when the vehicle S makes parallel parking and there are spaces where the vehicle S can be stopped on the front right side and the front left side of the vehicle S becomes the third pattern.

The state J21 of FIG. 21 illustrates the selection screen GM3 that corresponds to the third pattern.

The fourth pattern is such a pattern that the vehicle S makes the exit by "moving backward" and two candidate positions in which the vehicle S can be stopped after the exit exists including the position on the rear right side of the vehicle S and the position on the rear left side of the vehicle S. For example, the exit pattern when the vehicle S makes parallel parking and these are spaces where the vehicle S can be stopped on the rear right side and the rear left side of the vehicle S becomes the fourth pattern.

The state J22 of FIG. 21 illustrates the selection screen GM3 that corresponds to the fourth pattern.

The fifth pattern is such a pattern that the vehicle S can perform the exit by "moving forward" or "moving backward" and four candidate positions in which the vehicle S can be stopped after the exit exist including the position on the front right side of the vehicle S, the position on the front left side of the vehicle S, the position on the rear right side of the vehicle S, and the position on the rear left side of the vehicle S. For example, the exit pattern when the vehicle S makes parallel parking and there are spaces where the vehicle S can be stopped on the front right side, the front left side, the rear right side, and the rear left side of the vehicle S becomes fifth pattern.

The state J23 of FIG. 21 illustrates the selection screen GM3 that corresponds to the fifth pattern.

The sixth pattern is such a pattern that the vehicle S can perform the exit by "moving forward" or "moving backward" and six candidate positions in which the vehicle S can be stopped after the exit exists including the position on the front side of the vehicle S, the position on the front right side of the vehicle S, the position on the front left side of the vehicle S, the position on the rear side of the vehicle S, the position on the rear right side of the vehicle S, and the position on the rear left side of the vehicle S. For example, the exit pattern when the vehicle S is in the state where it is parked in a parking position having large spaces on the front side and the rear side is the sixth pattern.

The state J24 of FIG. 21 illustrates the selection screen GM3 that corresponds to the sixth pattern.

In the meantime, when a plurality of candidate positions of the vehicle S exist, there may be a case where there is actually a candidate position of the vehicle S movement to which is prohibited due to presence of an obstacle and a regulation among the candidate positions.

In such a case, the terminal control unit 20 performs the following processing at the time of display of the selection screen GM3. Specifically, the terminal control unit 20 displays an image indicative of the fact that the movement to the candidate position is prohibited in the slide bar BR2 corresponding to a candidate position movement to which is prohibited, and prohibits the movement of the slide button SB2 along the slide bar BR2 corresponding to the candidate position movement to which is prohibited.

Figure 22:
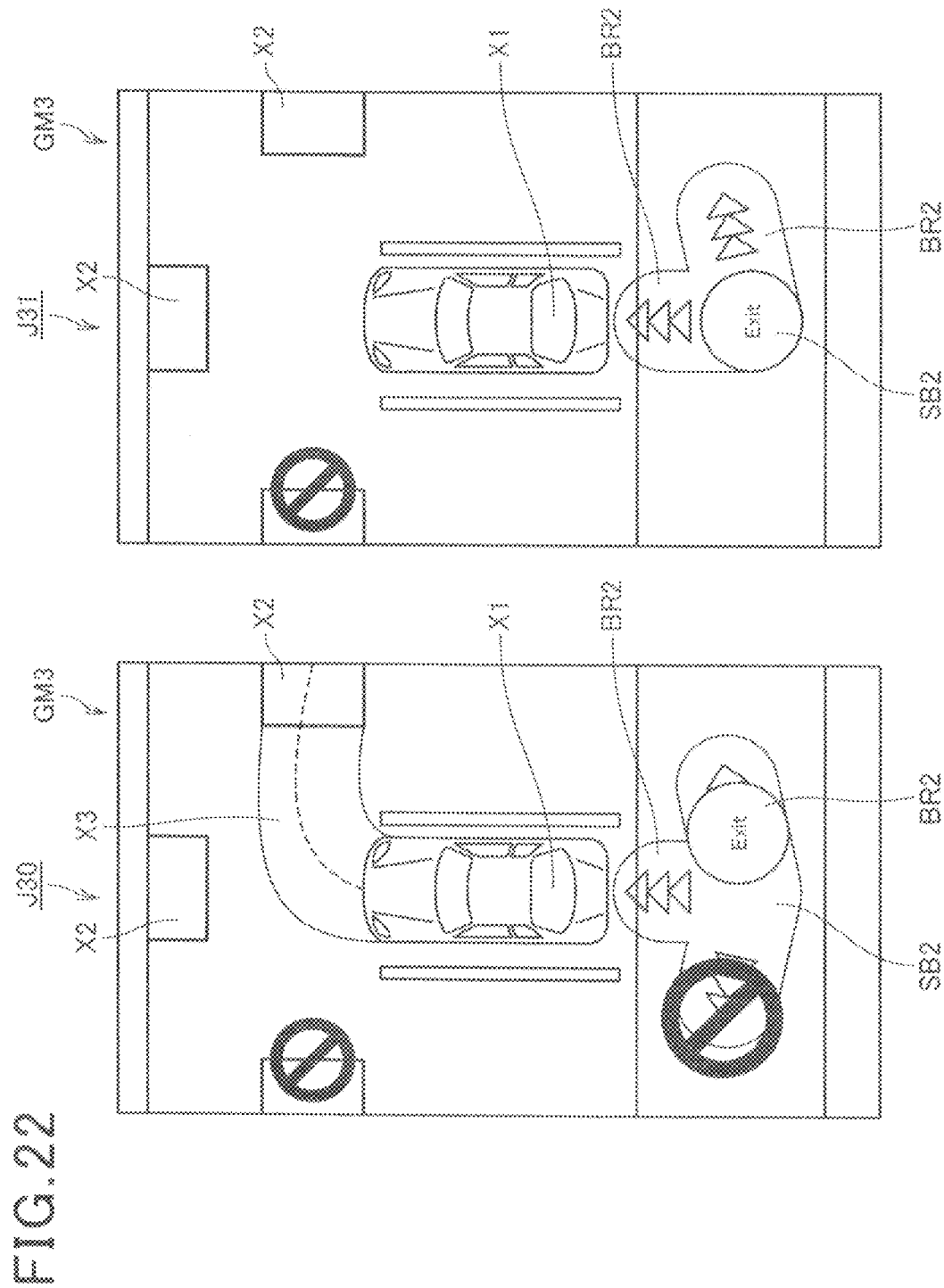
FIG. 22 is a diagram used in an explanation of a screen displayed on the touch panel.

The state J30 of FIG. 22 illustrates an example of the selection screen GM3 that the terminal control unit 20 displays when on the selection screen GM3 of FIG. 19, movement to the candidate position corresponding to the slide bar BR2 extending from the proximal end PP1 upward to the left side prohibited.

As illustrated in the state J30 of FIG. 22, on the selection screen GM3, an image indicative of the fact that the movement to the candidate position is prohibited is displayed in the slide bar BR2 corresponding to the candidate position movement to which is prohibited. Further, an image indicative of the fact that the movement is prohibited is also displayed in the candidate position image X2 corresponding to the candidate position movement to which is prohibited.

In the case where a candidate position movement to which is prohibited exists, by the above-described processing being performed, the user can accurately recognize the candidate position movement to which is prohibited. Also, it is possible to prevent the user from selecting the candidate position movement to which is prohibited.

Note that when a candidate position movement to which is prohibited exists, a configuration is possible according to which the terminal control unit 20 perform the following process in place of the above-described process. Specifically, the terminal control unit 20 prohibits display of the slide bar BR2 corresponding to the candidate position movement to which is prohibited.

The state J31 of FIG. 22 illustrates an example of the selection screen GM3 that the terminal control unit 20 displays when, on the selection screen GM3 of FIG. 19, the movement to the candidate position corresponding to the slide bar BR2 extending from the proximal end PP1 upward to the left side is prohibited.

As illustrated in the state J31 of FIG. 22, the slide bar BR2 corresponding to the candidate position movement to which is prohibited is not displayed on the selection screen GM3. As a result, it is possible to prevent the user from selecting the candidate position movement to which is prohibited.

First Modified Example

Next, the first modified example will be described.

In the above-described embodiment, the configuration has been such that, at the time of the exit, one candidate position is selected from the candidate positions by the slide unit SU2.

With regard to this configuration, the candidate position image X2 may be caused to function as the touch operation button so that the candidate position can be selected by performing the touch operation on the candidate position image X2.

In this case, if the configuration is defined such that the selection of the candidate position becomes final and binding when the touch operation has been consecutively made on the candidate position image X2 for a plurality of times (for example, twice), then it is possible to prevent the candidate position corresponding to the erroneously operated candidate position image X2 from being selected when the user erroneously performed the touch operation on the candidate position image X2.

Note that, when the touch operation was performed on the candidate position image X2 and the candidate position has been selected, the terminal control unit 20 may cause the operation mode to make a transition to the vehicle control mode and display the vehicle control screen GM2 in place of the selection screen GM3. Also, when the touch operation was performed on the candidate position image X2 and the candidate position has been selected, the terminal control unit 20 may display the lock screen GM1 in place of the selection screen without immediately causing the operation code to make a transition to the vehicle control mode, and may cause the operation mode to make a transition to the vehicle control mode when a predetermined input has been made on the lock screen GM1, and may display the vehicle control screen GM2 in place of the lock screen GM1.

Second Modified Example

Next, the second modified example will be described.

In the above-described embodiment, with regard to the processing at the time of the parking, the explanations have been given on the assumption that there is only one parking position. However, a configuration is also possible according to which one parking position is selected from a plurality of candidates for the parking position and the candidate for the parking position is determined as the position in which the vehicle S should be parked.

In this case, the terminal control unit 20 should cause the touch panel 9 to display a screen that is similar to the selection screen GM3 before causing the touch panel 9 to display the lock screen GM1 and determine the parking position on the basis of the operation performed on the touch panel 9.

As has been described in the foregoing, the mobile terminal 3 (terminal) according to this embodiment includes the housing 8, the touch panel 9 (display panel) provided in the housing 8, the housing state detection unit 23 that detects the state of the housing 8, and the terminal control unit 20. The terminal control unit 20 acquires the imaging data based on the result of imaging of the camera provided in the vehicle S, causes the touch panel 9 to display the image based on the imaging data that has been acquired, and changes the image to be displayed on the touch panel 9 according to the state of the housing 8 that has been detected by the housing state detection unit 23.

According to this feature, the user can change the image based on the captured image data displayed on the touch panel 9 by performing the simple task of changing the state of the housing 8 of the mobile terminal 3, and convenience for the user can be improved when the image based on the result of imaging of the camera provided in the vehicle S is displayed on the mobile terminal 3.

Also, in this embodiment, the terminal control unit 20 changes the image to be displayed on the touch panel 9 between the case where it has been detected by the housing state detection unit 23 that the orientation of the housing 8 was placed in the first orientation and the case where it has been detected that the orientation of the housing 8 was placed in the second orientation that is different than the first orientation.

According to this feature, the user can change the mage based on the captured image data displayed on the touch panel 9 by performing the simple task of changing the orientation of the housing of the mobile terminal 3 to the first orientation or the second orientation and convenience for the user can be improved when the image based on the result of imaging of the camera provided in the vehicle S is displayed on the mobile terminal 3.

Also, in this embodiment, the housing 8 is a plate-like member having a rectangular front face 8a. The touch panel 9 is provided on the front face 8a of the housing 8. The first orientation is an orientation by which the direction of the long side of the front face 8a of the housing 8 is placed in a state where it is in the vertical direction, and the second orientation is an orientation by which the direction of the long side of the front face 8a of the housing 8 is placed in a state where it is in the direction orthogonal to the vertical direction.

According to this feature, the user can change the image based on the capture image data displayed on the touch panel 9 by performing the simple task of changing the orientation of the housing 8 of the mobile terminal 3 to "the orientation by which the direction of the long side of the front face 8a of the housing 8 is placed in a state where it is in the vertical direction" or "the orientation by which the direction of the long side of the front side 8a of the housing 8 is placed in a state where it is in the direction orthogonal to the vertical direction" and convenience for the user can be improved when the image based on the result of imaging of the camera provided in the vehicle S is displayed on the mobile terminal 3.

Also, in this embodiment, when it has been detected by the housing state detection unit 23 that the orientation of the housing 8 was placed in the first orientation, the terminal control unit 20 causes the touch panel 9 to display, as the image based on the imaging data, the overhead image G1 which is an image of a bird's eye view of the vehicle S, and, when it has been detected by the housing state detection unit 23 that the orientation of the housing 8 was placed in the second orientation, the terminal control unit 20 causes the touch panel 9 to display, as the image based on the imaging data, the outside-of-vehicle image G2 which is an image of the outside of the vehicle imaged by the camera.

According to this feature, the user can change the image displayed on the touch panel 9 between the overhead image G1 and the outside-of-vehicle image G2 by performing the simple task of changing the orientation of the housing 8 of the mobile terminal 3.

Also, in this embodiment, a plurality of outside-of-vehicle imaging cameras that perform imaging of the outside of the vehicle are provided in the vehicle S. In the case where it has been detected by the housing state detection unit 23 that the orientation of the housing 8 was placed in the second orientation, the terminal control unit 20 selects one outside-of-vehicle imaging camera from the plurality of outside-of-vehicle imaging cameras in accordance with a predetermined order of priority according to the state of the vehicle S and causes the touch panel 9 to display the outside-of-vehicle image G2 based on the result of the imaging by the outside-of-vehicle imaging camera that has teen selected.

According to this feature, the outside-of-vehicle image G2 which is likely to be needed by the user can be displayed on the touch panel 9 and the convenience for the user is high.

Here, the predetermined order of priority is on order of priority according to which, for example, the outside-of-vehicle imaging camera that can perform imaging of the direction of travel of the vehicle S will occupy a higher place.

According to this feature, the outside-of-vehicle image G2 which is likely to be needed by the user can be displayed on the touch panel 9 and the convenience for the user is high.

Also, the predetermined order of priority is an order of priority according to which, for example, the outside-of-vehicle imaging camera that can perform imaging of the object close to the vehicle S will occupy a higher place.

According to this feature, the outside-of-vehicle image G2 which is likely to be needed by the user can be displayed on the touch panel 9 and the convenience for the user is high.

Also, in this embodiment, when it has been detected by the housing state detection unit 23 that the housing 3 made a predetermined motion after having caused the touch panel 9 to display the one outside-of-vehicle image G2 based on the result of imaging of the one outside-of-vehicle imaging camera, the terminal control unit 20 causes the touch panel 9 to display another outside-of-vehicle image G2 based on the result of imaging of another outside-of-vehicle imaging camera different than the one outside-of-vehicle imaging camera in place of the one outside-of-vehicle image G2.

According to this feature, the user can change the outside-of-vehicle image G2 displayed on the touch panel 9 by performing the simple task of causing the housing 8 to make a predetermined motion, and the convenience for the user is high.

Also, in this embodiment, the plurality of outside-of-vehicle imaging cameras each perform imaging of the outside of the vehicle in different directions. In addition, the predetermined motion is either of the first motion in which the state of the housing 8 changes in a first mode or the second motion by which the state of the housing 8 changes in a second mode that is different than the first mode. In the case where it has been detected by the housing state detection unit 23 that the housing 8 made the first motion, the terminal control unit 20 changes the outside-of-vehicle image G2 according to the first order corresponding to the direction in which the outside-of-vehicle imaging camera performs imaging. In the case where it has been detected by the housing state detection unit 23 that the housing 8 made the second motion, the terminal control unit 20 changes the outside-of-vehicle image G2 according to the second order which is an order in accordance with the directions in which the outside-of-vehicle imaging camera performs imaging and is different than the first order.

According to this feature, the user can switch images by the order he/she desires and the convenience for the user is high.

Also the terminal control unit 20 causes the touch panel 9 to display the image based on the imaging data and the propulsion control button QB on which the touch operation can be performed (operation button) n a superposed manner on the image based on the imaging data and also maintains the display of the propulsion control button QB when the image to be displayed on the touch panel 9 has been changed. The terminal control unit 20 transmits the propulsion instruction signal instructing the propulsion of the vehicle S to the information processing device 4 provided in the vehicle S while the touch operation is being performed on the propulsion control button QB.

According to this feature, the user can change the image to be displayed on the touch panel 9 while controlling the propulsion of the vehicle S by operating the propulsion control button QB.

Also, as has been described in the foregoing, the mobile terminal 3 according to this embodiment includes the touch panel 9 that displays an image and accepts the touch operation and the terminal control unit 20. The terminal control unit 20 causes the touch panel 9 to display the vehicle control screen GM2 on which the propulsion control button QB allowing the touch operation is displayed and, when the position on the touch operation has moved after the touch operation was performed on the propulsion control button QB displayed on the vehicle control screen GM2, the terminal control unit 20 causes the position of the propulsion control button QB to move following the movement of the position of the touch operation and maintains the state where the touch operation is performed on the propulsion control button QB. The terminal control unit 20 transmits the propulsion instruction signal instructing the propulsion of the vehicle S to the information processing device 4 provided in the vehicle S while the touch operation is performed on the propulsion control button QB displayed on the vehicle control screen GM2, and stops the transmission of the propulsion instruction signal in response to the ending of the touch operation on the propulsion control button QB.

According to this feature, the state where the touch operation is performed on the propulsion control button QB is maintained even when the position of the finger performing the touch operation in displaced after the user performed the touch operation on the propulsion control button QB. As a result, the user does not need to continue to perform the touch operation in pinpoint manner on a particular position when operating the propulsion control button QB. Accordingly, it is made possible for the user to accurately perform the operation when the user operates the touch panel 9 of the mobile terminal 3 and controls the propulsion of the vehicle S.

Also, in this embodiment, when the touch operation on the propulsion control button QB displayed on the vehicle control screen GM2 has been ended, the terminal control unit 20 continuously displays the propulsion control button QB at the position of the propulsion control button QB when the touch operation was ended.

According to this feature, since the propulsion control button QB resides at the position where the user can readily perform the touch operation when the user performs the touch operation again on the propulsion control button QB, convenience for the user can be improved.

Note that, in relation to the above-described feature, when the touch operation on the propulsion control button QB displayed on the vehicle control screen GM2 has been ended, the terminal control unit 20 may display the propulsion control button QB at a predetermined position on the vehicle control screen GM2.

According to this feature, since the propulsion control button QB resides at the position where the user can readily perform the touch operation when the user performs the touch operation again on the propulsion control button QB, convenience for the user can be improved.

Also, in this embodiment, the terminal control unit 20 causes the touch panel 9 to display the lock screen GM1 in which the slide bar BR1 and the slide button SB1 are displayed, slide button SB1 being positioned at an end of the slide bar BR1, moving along the slide bar BR1 in response to the swipe operation, and moving to the end of the slide bar BR1 in response to the ending of the swipe operation. When the slide button SB1 has been positioned at the other end of the slide bar BR1 by the swipe operation for the predetermined period of time, the terminal control unit 20 changes the screen to be displayed on the touch panel 9 from the lock screen GM1 to the vehicle control screen GM2, and changes the slide button SB1 positioned at the other end of the slide bar BR1 to the propulsion control button QB and causes it to function as the propulsion control button QB.

According to this feature, the user can change screen from the lock screen GM1 to the vehicle control screen GM2 by performing a simple task of making the swipe operation on the slide button SB1, and can simply perform the touch operation on the propulsion control button QB after the switching has been made to the vehicle control screen GM2.

Also, in this embodiment, the terminal control unit 20 changes the image indicative of the propulsion control button QB between when the propulsion control button QB is being operated and when the propulsion control button QB is not operated.

According to this feature, the user can accurately recognize in a simplified manner the fact that the touch operation is being performed on the propulsion control button QB and the fact that the touch operation is not performed thereon.

Also, in this embodiment, the terminal control unit 20 acquires the imaging data based on the result of imaging of the camera provided in the vehicle S while the vehicle control screen GM2 is being displayed, causes this touch panel 9 to display the image based on the imaging data that has been acquired, and causes the propulsion control button QB to be displayed in a superposed manner on the image based on the imaging data. The terminal control unit 20 changes the image to be displayed on the touch panel 9 in accordance with the state of the housing 8 that has been detected by the housing state detection unit 23 and, in the meantime, maintains the display of the propulsion control button QB also when the image to be displayed on the touch panel 9 has been changed.

According to this feature, the user can change, while controlling the propulsion of the vehicle S by operating the propulsion control button QB, the image to be displayed on the touch panel 9.

Also, in this embodiment, when it has been detected by the housing state detection unit 23 that the orientation of the housing 8 was placed in the first orientation, the terminal control unit 20 causes the touch panel 9 to display, as the image based on the imaging data, the overhead image G1 which is an image of a bird's eye view of the vehicle S and, when it has been detected by the housing state detection unit 23 that the orientation of the housing 8 was placed in the second orientation that is different than the first orientation, the terminal control unit 20 causes the touch panel 9 to display, as the image based on the imaging data, the outside-of-vehicle image G2 which is an image of the outside of the vehicle that has been imaged by the outside-of-vehicle imaging camera.

According to this feature, the user can change the image to be displayed on the touch panel 9 between the overhead image G1 and the outside-of-vehicle image G2 by performing the simple task of changing the orientation of the housing 8 of the mobile terminal 3.

Also, as has been described in the foregoing, the terminal control unit 20 of the mobile terminal 3 according to this embodiment displays the selection screen GM3 in which the current position image X1 indicative of the current position of the vehicle S; the one or more candidate position images X2 indicative of the candidate position which is the candidate of the position in which the vehicle S moving from the current position should be stopped; the slide bars BR2 that extend from the proximal end PP1 to each of the candidate position images X2; and the slide button SB2 that is positioned at the proximal end PP1 and moves along the slide bar BR2 in accordance with the swipe operation are displayed, and determines the position in which the vehicle S should be stopped from among the candidate positions on the basis of the movement of the slide button SB.

According to this feature, the user can accurately perform the operation to determine the position in which the vehicle S should be stopped.

Also, in this embodiment, when the slide button SB2 has positioned at the distal end of one slide bar BR2 for the predetermined period of time, the terminal control unit 20 determines the candidate position corresponding to the one slide bar BR2 as the position in which the vehicle S should be stopped.

According to this feature, it is possible to prevent the position in which the vehicle S should be stopped from being determined by an erroneous operation of the user.

Also, in this embodiment, the terminal control unit 20 displays the path image X3 indicative of the path from the current position of the vehicle S to the candidate position on the selection screen GM3.

According to thin feature, the user can accurately recognize the path from the current position of the vehicle S to the candidate position by referring to the selection screen GM3.

Also, in this embodiment, when the movement of the vehicle S to the candidate position is prohibited, the terminal control unit 20 displays the image indicative of the fact that the movement to the candidate position is prohibited on the slide bar BR2 corresponding to the candidate position movement to which in prohibited, and prohibits the movement of the slide button SB2 along the slide bar BR2 corresponding to the candidate position movement to which is prohibited.

According to this feature, it is possible to prevent the user from selecting the candidate position movement to which is prohibited.

In relation to the above-described feature, when the movement of the vehicle S to the candidate position is prohibited, the terminal control unit 20 may prohibit the display of the slide bar BR2 corresponding to the candidate position movement to which is prohibited.

According to this feature, it is possible to prevent the user from selecting the candidate position movement to which is prohibited.

Also, in this embodiment, when the position in which the vehicle S should be stopped has been determined, the terminal control unit 20 changes the screen to be displayed on the touch panel 9 from the selection screen GM3 to the vehicle control screen GM2, and changes the slide button SB into the operation button on which the touch operation can be performed. The terminal control unit 20 transmits the propulsion instruction signal instructing the propulsion of the vehicle S to the information processing device 4 provided in the vehicle S while the touch operation is performed on the propulsion control button QB displayed on the vehicle control screen GM2, and stops the transmission of the propulsion instruction signal in response to the ending of the touch operation on the propulsion control button QB.

According to this feature, the user can accurately control the propulsion of the vehicle S.

Also, in this embodiment, the terminal control unit 20 changes the image indicative of the propulsion control button QB between when the propulsion control button QB is being operated and when the propulsion control button QB is not operated.

According to this feature, the user can accurately recognize in a simplified manner the fact that the touch operation is performed on the propulsion control button QB and the fact that the touch operation is not made thereon.

Also, in this embodiment, the current position of the vehicle S is the parking position in which the vehicle S is currently parked and the candidate position is an after-exit stop position in which the vehicle S upon the exit from the parking position is stopped.

According to this feature, the user can select the after-exit stop position by performing an accurate operation at the time of the exit.

Also, as has been described in the modified examples, the terminal control unit 20 of the mobile terminal 3 may display the selection screen GM3 in which the current position image X1 indicative of the current position of the vehicle S and the one or more candidate position images X2 indicative of the candidate position which is a candidate of the position in which the vehicle S moving from the current position should be stopped are displayed, and may determine the position in which the vehicle S should be stopped from the candidate positions on the basis of the operation on the candidate position image X2.

According to this feature, the user can accurately perform the operation to determine the position in which the vehicle S should be stopped.

Also, as has been described in the foregoing, in the case of the first mode, the terminal control unit 20 of the mobile terminal 3 according to this embodiment receives, from the information processing device 4, the composite image data of the composite image which includes the overhead image G1 which is a bird's eye view of the vehicle S and the outside-of-vehicle image G2 that has been imaged by the camera provided in the vehicle S; when it has been detected by the housing state detection unit 23 that the orientation of the housing 8 was placed in the first orientation, the terminal control unit 20 causes the touch panel 9 to display the overhead image G1 on the basis of the composite image data; and when it has been detected by the housing state detection unit 23 that the orientation of the housing 8 was placed in the second orientation that is different than the first orientation, the terminal control unit 20 causes the touch panel 9 to display the outside-of-vehicle image G2 on the basis of the composite image data.

According to this feature, the mobile terminal 3 can display the image in an appropriate manner when displaying the image based on the result of imaging of the camera provided in the vehicle S, and convenience for the user can be improved.

Also, in this embodiment, in the case of the first mode, in the case where it has been detected by the housing state detection unit 23 that the orientation of the housing 8 was placed in the first orientation, the terminal control unit 20 extracts the overhead image data corresponding to the overhead image G1 from the composite image data and causes the touch panel 9 to display the overhead image G1 on the basis of the overhead image data that has been extracted. When it has been detected by the housing state detection unit 23 that the orientation of the housing 8 was placed in the second orientation, the terminal control unit 20 extracts the outside-of-vehicle image data corresponding to the outside-of-vehicle image G2 from the composite image data and causes the touch panel 9 to display the outside-of-vehicle image G2 on the basis of the outside-of-vehicle image data that has been extracted.

According to this feature, the terminal control unit 20 can display the overhead image G1 and the outside-of-vehicle image G2 appropriately on the basis of the composite image data received from the information processing device 4.

Also, in this embodiment, the housing 8 is a plate-like member having a rectangular front face 8a and the touch panel 9 is provided on the front face 8a of the housing 8, and the overhead image G1 is a rectangular image with the long side extending in the vertical direction when viewed from the front face 8a, and the outside-of-vehicle image G2 is a rectangular image with its long side extending in the transverse direction when viewed from the front face 8a, and the first orientation is the orientation by which the direction of the long side of the front face 8a of the housing 8 is placed in a state where it is in the vertical direction, and the second orientation is the orientation by which the direction of the long side of the front face 8a of the housing 8 is placed in a state where it is in the direction orthogonal to the vertical direction.

According to this feature, the terminal control unit 20 can display the appropriate image conforming to the orientation of the housing 8 in accordance with the orientation of the housing 8 with the shape of the housing 8 taken into account.

Also, in this embodiment, the information processing advice control unit 30 of the information processing device 4, in the second mode, acquires the information indicative of the state of the housing 8 of the mobile terminal 3; when it has been detected based an the information that has been acquired that the orientation of the housing 8 of the mobile terminal 3 was placed in the first orientation, the information processing device control unit 30 extracts the overhead image data corresponding to the overhead image G1 from the composite image data, and transmits the overhead image data that has been extracted to the mobile terminal 3; and, when it has been determined based on the information that has been acquired that the orientation of the housing 8 of the mobile terminal 3 was placed in the second orientation that is different than the first orientation, the information processing device control unit 30 extracts the outside-of-vehicle image data corresponding to the outside-of-vehicle image G2 from the composite image data and transmits the outside-of-vehicle image data that has been extracted to the mobile terminal 3.

According to this feature, the information processing device 4 can display the image on the mobile terminal 3 in an appropriate manner, and convenience for the user can be improved.

Note that the above-described embodiments merely illustrate a mode of the present invention and modifications and applications can be made thereto as appropriate within the scope of the present invention.

For example, with regard to the processing that has been described as the processing of the mobile terminal 3, a configuration is possible according to which the mobile terminal 3 performs it in cooperation with an external device (including the information processing device 4) that can communicate with the mobile terminal 3. Likewise, with regard to the processing that has been described as the processing of the information processing device 4, a configuration is possible according to which the information processing device 4 performs it in cooperation with an external device (including the mobile terminal 3) that can communicate with the information processing device 4.

For example, the functional blocks that have been described with reference to the drawings are a schematic diagram that classifies and illustrates the functional features of the individual devices in accordance with the main processing content in order to facilitate understanding of the present invention. The feature of the individual devices can also be classified into more constituent elements in accordance with the content of the processing. Also, one constituent element can also be classified so that it performs more processes. Also, the processing of each constituent element may be performed by one unit of hardware or may be performed by multiple units of hardware. Also, the processing of each constituent element may be implemented by one program or may be implemented by multiple programs.

Also, the processing units of the flowcharts illustrated in the drawings are those that have been divided in accordance with main processing content in order to facilitate the understanding of the processes of the individual devices. The present invention is not limited by the manner of division of the processing units or their names. The processes of the individual devices may also be divided into more processing units in accordance with the content of the processing. Also, one processing unit can also be divided such that it includes more processes. Also, the order of processing of the above-described flowcharts is not limited to the illustrated example as long as similar processing can be performed.

REFERENCE SIGNS LIST

1: information processing system
2: vehicle system
3: mobile terminal (terminal)
4: information processing device
5: vehicle drive control device
9: touch panel (display panel)
23: housing state detection unit
30: information processing device control unit
CA1: front imaging camera (camera)
CA2: front right-side imaging camera (camera)
CA3: lateral right-side imaging camera (camera)
CA4: rear right-side imaging camera (camera)
CA5: rear imaging camera (camera)
CA6: rear left-side imaging camera (camera)
CA7: lateral left-side imaging camera (camera)
CA8: front left-side imaging camera (camera)
G1: overhead image
G2: outside-of-vehicle image
G: composite image
GM1: the lock screen
GM2; vehicle control screen
GM3: screen

The invention claimed is:

1. A terminal comprising:
a processor; and
a touch panel that displays an image and accepts a touch operation,
wherein the processor
causes the touch panel to display a vehicle control screen on which an operation button allowing the touch operation is displayed, moves a position of the operation button following a movement of a position of the touch operation, and maintains a state where the touch operation is performed on the operation button when the position of the touch operation moves after the touch operation is performed on the operation button displayed on the vehicle control screen, and
transmits a propulsion instruction signal instructing propulsion of a vehicle to the vehicle while the touch operation is being performed on the operation button displayed on the vehicle control screen, and stops transmission of the propulsion instruction signal in response to ending of the touch operation on the operation button,
wherein the processor
causes the touch panel to display a lock screen on which a slide bar being a strip-shaped object and a slide button are displayed, the slide button being positioned at one end of the slide bar, moving along the slide bar in accordance with a swipe operation, which is an operation of moving the position with which a finger is in contact with while maintaining the state where the finger is in contact with the touch panel, and moving to the one end of the slide bar in response to ending of the swipe operation,
displays the lock screen in which the vehicle control screen is covered by a dark-colored mask image as a background, and makes the color of the mask screen covering the vehicle control screen lighter as the slide button moves from the one end to the other end of the slide bar, and
changes a screen to be displayed on the touch panel from the lock screen to the vehicle control screen when the slide button is positioned at another end of the slide bar by the swipe operation for a predetermined period of time and changes the slide button positioned at the other end of the slide bar to the operation button so as to cause the slide button to function as the operation button.

2. The terminal according to claim 1, wherein the processor displays the operation button at a position of the operation button at the time when the touch operation is ended and continues the display of the operation button until the touch operation is performed again when the touch operation on the operation button displayed on the vehicle control screen is ended.

3. The terminal according to claim 1, wherein the processor displays the operation button at a predetermined position on the vehicle control screen when the touch operation on the operation button displayed on the vehicle control screen is ended.

4. The terminal according to claim 1, wherein the processor changes an image indicative of the operation button between when the operation button is being operated and when the operation button is not operated.

5. A terminal comprising:
a processor;
a touch panel that displays an image and accepts a touch operation; and
a housing,
wherein the processor
causes the touch panel to display a vehicle control screen on which an operation button allowing the touch operation is displayed, moves a position of the operation button following a movement of a position of the touch operation, and maintains a state where the touch operation is performed on the operation button when the position of the touch operation moves after the touch operation is performed on the operation button displayed on the vehicle control screen, and
transmits a propulsion instruction signal instructing propulsion of a vehicle to the vehicle while the touch operation is being performed on the operation button displayed on the vehicle control screen, and stops transmission of the propulsion instruction signal in response to ending of the touch operation on the operation button, wherein the processor functions as a housing state detection circuit that detects a state of the housing, wherein the processor acquires imaging data that is based on a result of imaging of a camera provided in the vehicle while the vehicle control screen is being displayed, causes the touch panel to display an image based on the acquired imaging data, and displays the operation button in a superposed manner on the image based on the imaging data, changes the image to be displayed on the touch panel in accordance with a state of the housing detected by the housing state detection circuit and maintains display of the operation button even when the image to be displayed on the touch panel is changed, wherein the processor causes the touch panel to display an overhead image which is an image of a bird's eye view of the vehicle as the image based on the imaging data when the housing state detection circuit detects that an orientation of the housing is placed in a first orientation, and causes the touch panel to display an outside-of-vehicle image which is an image of an outside of the vehicle imaged by the camera as the image based on the imaging data when the housing state detection circuit detects that the orientation of the housing is placed in a second orientation that is different than the first orientation.

6. A method of controlling a terminal that includes a touch panel that displays an image and accepts a touch operation, the method comprising:

displaying, on the touch panel, a vehicle control screen on which an operation button allowing the touch operation is displayed and moving a position of the operation button following a movement of the position of the touch operation, and maintaining a state where the touch operation is performed on the operation button when the position of the touch operation moves after the touch operation is performed on the operation button displayed on the vehicle control screen;

transmitting a propulsion instruction signal instructing propulsion of a vehicle to the vehicle while the touch operation is being performed on the operation button displayed on the vehicle control screen and stopping transmission of the propulsion instruction signal in response to ending of the touch operation on the operation button;

causing the touch panel to display a lock screen on which a slide bar being a strip-shaped object and a slide button are displayed, the slide button being positioned at one end of the slide bar, moving along the slide bar in accordance with a swipe operation, which is an operation of moving the position with which a finger is in contact with while maintaining the state where the finger is in contact with the touch panel, and moving to the one end of the slide bar in response to ending of the swipe operation;

displaying the lock screen in which the vehicle control screen is covered by a dark-colored mask image as a background, and making the color of the mask screen covering the vehicle control screen lighter as the slide button moves from the one end to the other end of the slide bar; and changing a screen to be displayed on the touch panel from the lock screen to the vehicle control screen when the slide button is positioned at another end of the slide bar by the swipe operation for a predetermined period of time and changing the slide button positioned at the other end of the slide bar to the operation button so as to cause the slide button to function as the operation button.

* * * * *